(12) United States Patent
Kwon et al.

(10) Patent No.: US 10,031,653 B2
(45) Date of Patent: Jul. 24, 2018

(54) MOBILE TERMINAL AND CONTROLLING METHOD THEREOF

(71) Applicant: LG Electronics Inc., Seoul (KR)

(72) Inventors: Yunmi Kwon, Seoul (KR); Jungeun Shin, Seoul (KR); Songyi Baek, Seoul (KR); Soyeon Yim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/839,462

(22) Filed: Aug. 28, 2015

(65) Prior Publication Data
US 2016/0077718 A1    Mar. 17, 2016

(30) Foreign Application Priority Data

Sep. 15, 2014 (KR) .................. 10-2014-0122081
Dec. 5, 2014 (KR) .................. 10-2014-0174106

(51) Int. Cl.
*G06F 3/0484* (2013.01)
*G06F 3/0481* (2013.01)
(Continued)

(52) U.S. Cl.
CPC ........ *G06F 3/04845* (2013.01); *G06F 1/1694* (2013.01); *G06F 1/3228* (2013.01);
(Continued)

(58) Field of Classification Search
None
See application file for complete search history.

(56) References Cited

U.S. PATENT DOCUMENTS 9,015,641 B2 * 4/2015 Bocking ................. G06F 3/017
715/863
2009/0262078 A1 10/2009 Pizzi
(Continued)

FOREIGN PATENT DOCUMENTS

| EP | 2736226 A2 | 5/2014 |
| EP | 2 857 932 A1 | 4/2015 |
| KR | 10-2013-0124360 A | 11/2013 |
| KR | 10-2013-0139428 A | 12/2013 |
| KR | 10-2014-0044981 A | 4/2014 |
| KR | 10-1412448 B1 | 6/2014 |

(Continued)

*Primary Examiner* — Jennifer Mehmood
*Assistant Examiner* — Krishna Neupane
(74) *Attorney, Agent, or Firm* — Birch, Stewart, Kolasch & Birch, LLP

(57) ABSTRACT

A mobile terminal including a display unit configured to switching between an On state and an Off state, a touch sensor configured to sense touch on the display unit in the On or Off state, and a controller configured to switch at least a portion of the display unit to the On state when displacement of a drag input, dragging a pointer in a predetermined direction, in a first direction reaches a first reference value, output first information in a first area of the display unit when at least the portion of the display unit turns to the ON state, and switch the display unit to the Off state when the pointer, which has dragged in the predetermined direction, is released from the display unit after the display unit is switched to the On state. Further, the display unit is maintained in the On state after the display unit is switched to the On state in response to the drag input while the pointer, which has dragged in the predetermined direction, is touching the display unit.

15 Claims, 62 Drawing Sheets

(51) Int. Cl.
*G06F 3/0488* (2013.01)
*G06F 1/16* (2006.01)
*G06F 1/32* (2006.01)
*G06F 3/01* (2006.01)
*H04M 1/02* (2006.01)
*H04M 1/22* (2006.01)

(52) U.S. Cl.
CPC ............ *G06F 1/3265* (2013.01); *G06F 3/017* (2013.01); *G06F 3/0481* (2013.01); *G06F 3/04883* (2013.01); *G06F 3/04886* (2013.01); *H04M 1/0268* (2013.01); *G06F 2200/1637* (2013.01); *G06F 2203/04803* (2013.01); *H04M 1/22* (2013.01); *H04M 2250/22* (2013.01); *Y02B 60/1242* (2013.01); *Y02D 10/153* (2018.01)

(56) References Cited

U.S. PATENT DOCUMENTS

| | | | |
|---|---|---|---|
| 2013/0234924 | A1 | 9/2013 | Janefalkar et al. |
| 2014/0136867 | A1* | 5/2014 | Yamamoto ............ G06F 1/3262 713/320 |
| 2014/0141841 | A1* | 5/2014 | Yeo ..................... H04M 1/0202 455/566 |
| 2015/0022471 | A1* | 1/2015 | Kwak ................... G06F 1/3265 345/173 |
| 2015/0130737 | A1* | 5/2015 | Im ........................ G06F 1/3265 345/173 |
| 2015/0199102 | A1 | 7/2015 | Koh et al. |

FOREIGN PATENT DOCUMENTS

KR 10-1444091 B1 9/2014
WO WO 2012/128795 A1 9/2012

* cited by examiner

FIG. 3A
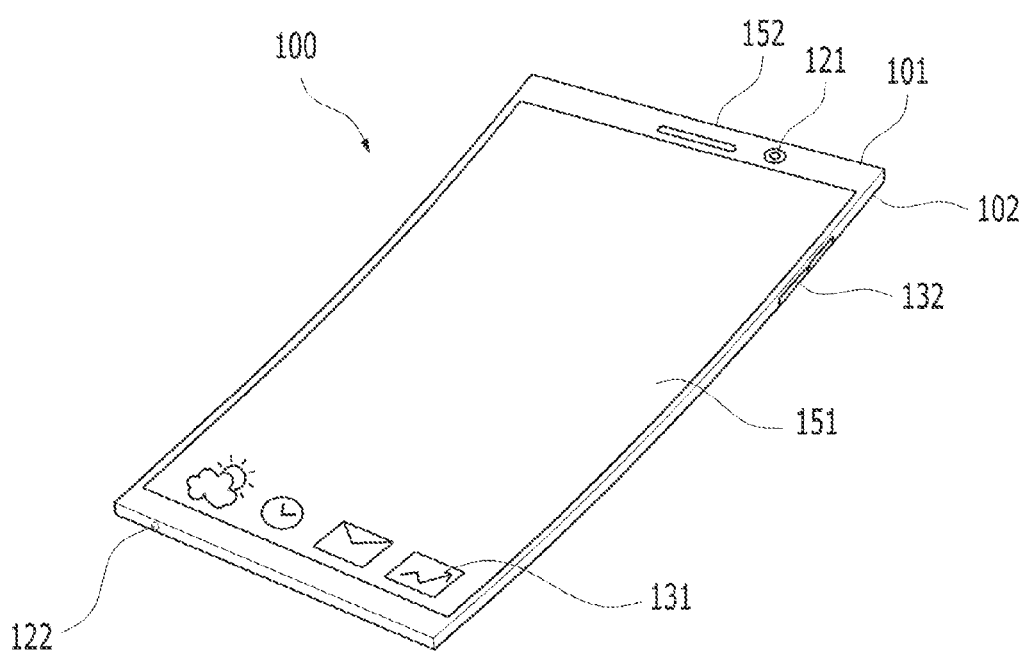
Perspective diagram of mobile terminal
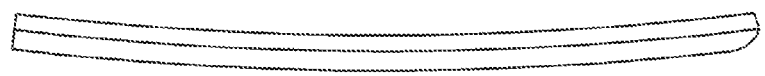
In lateral view of mobile terminal

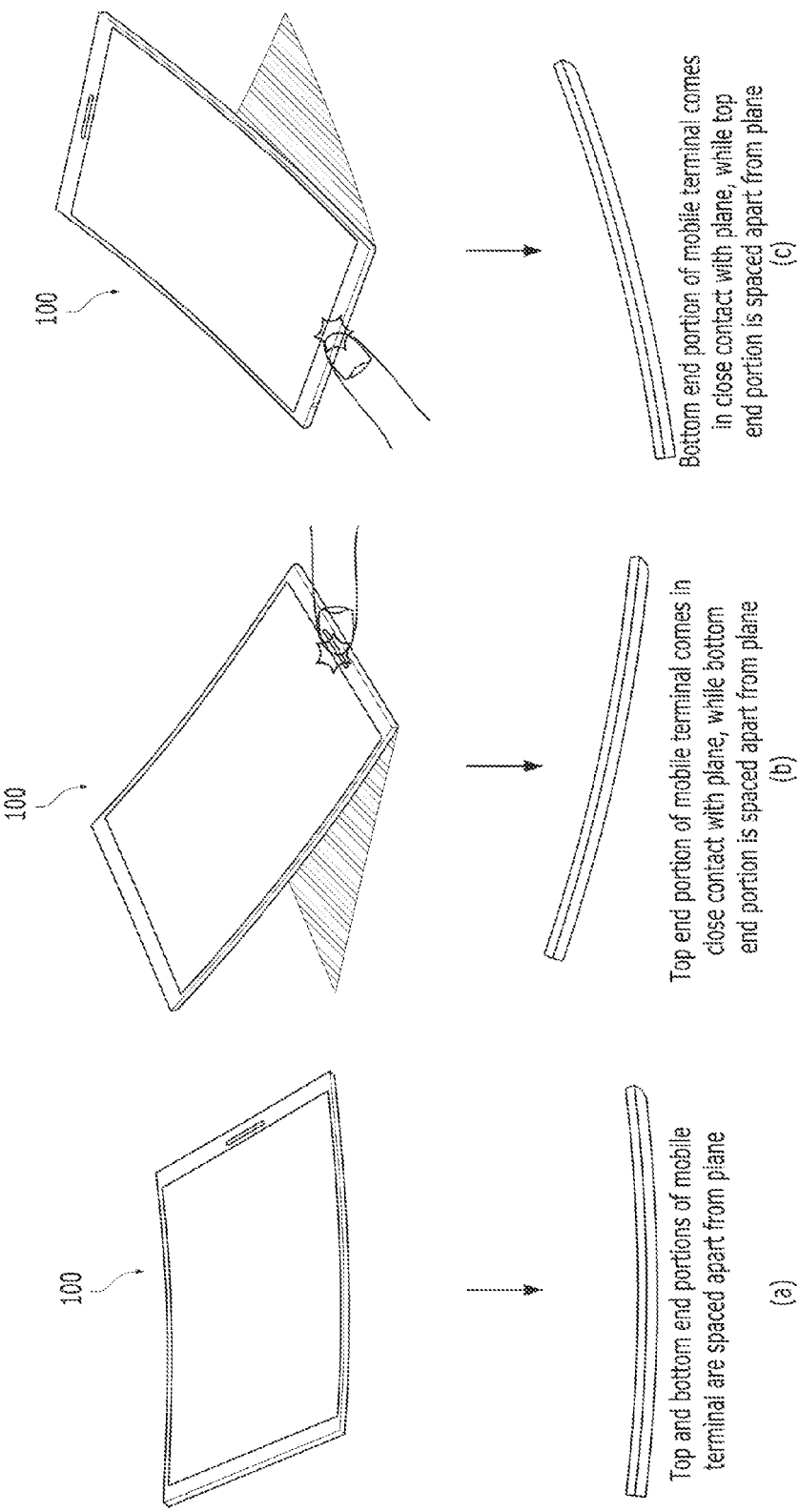

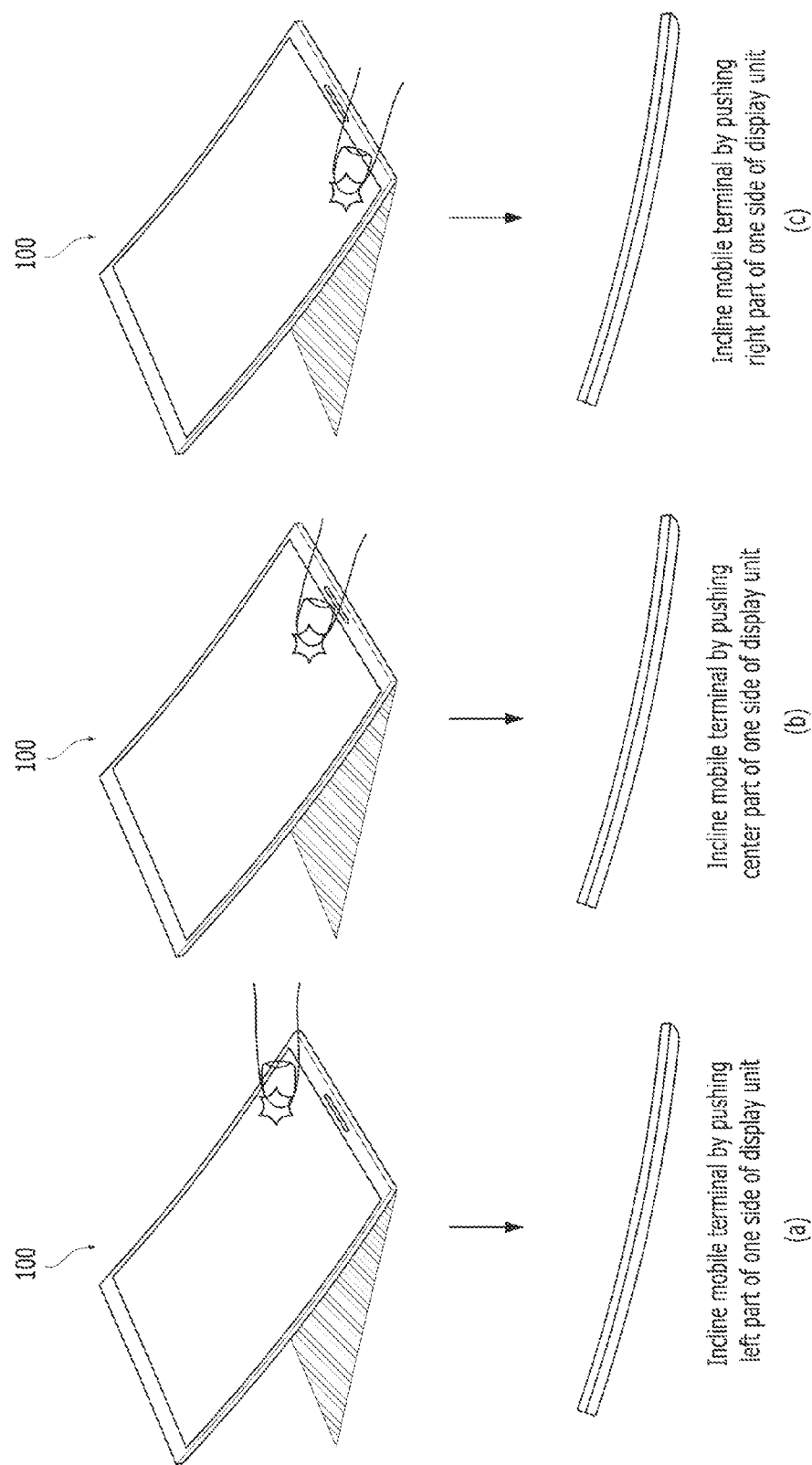

FIG. 6
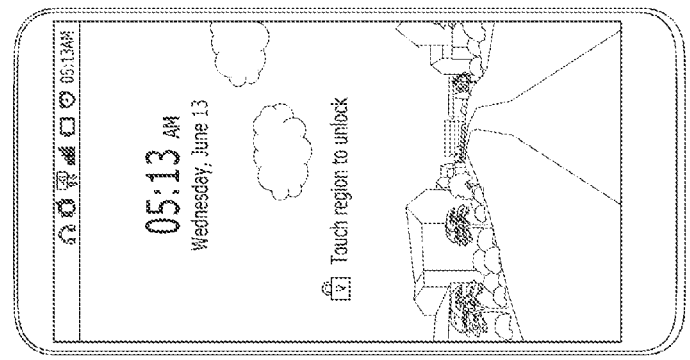
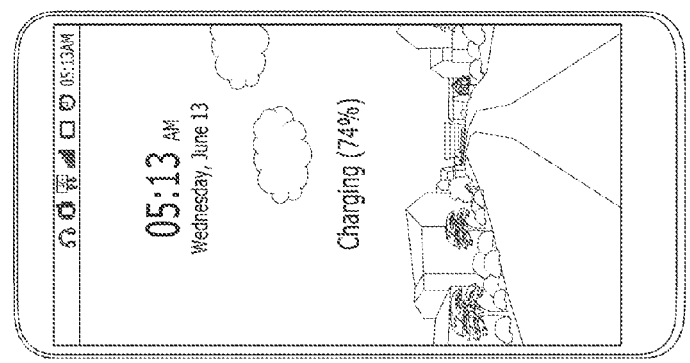
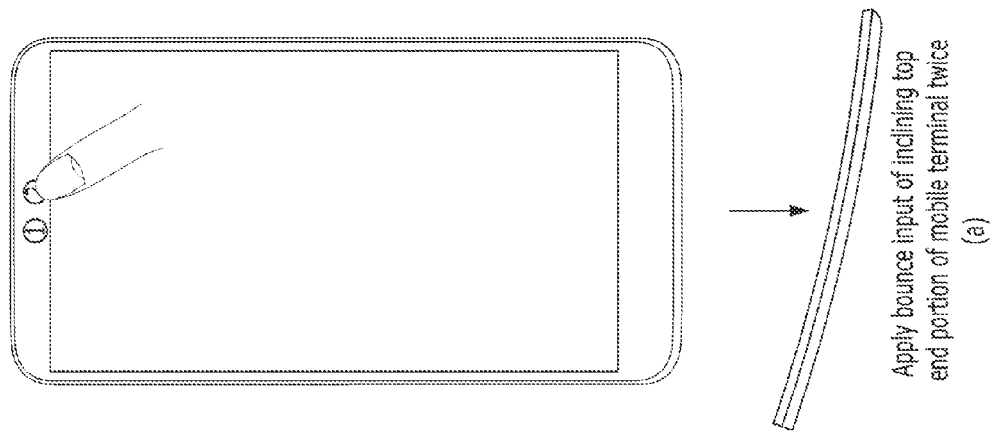

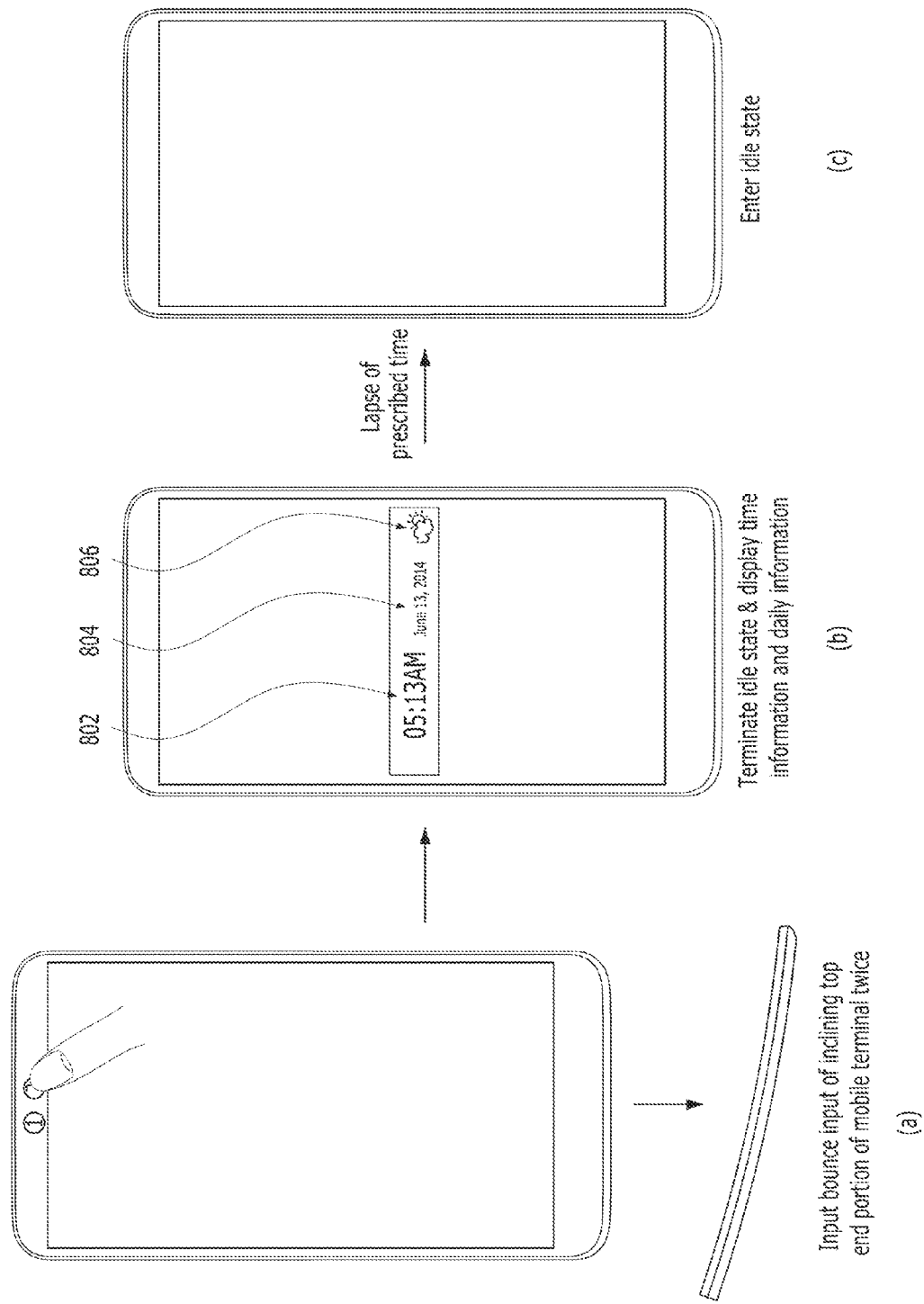

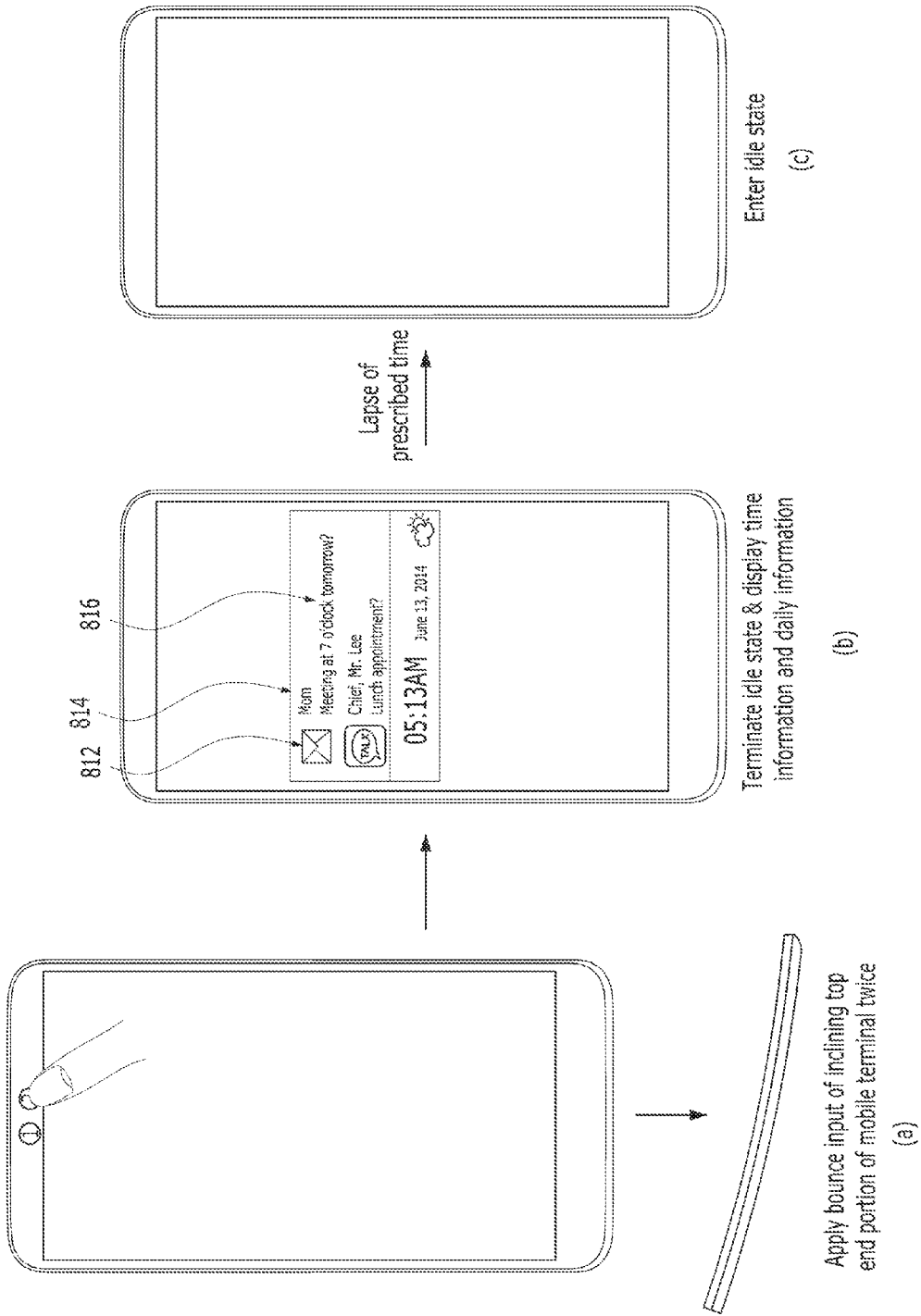

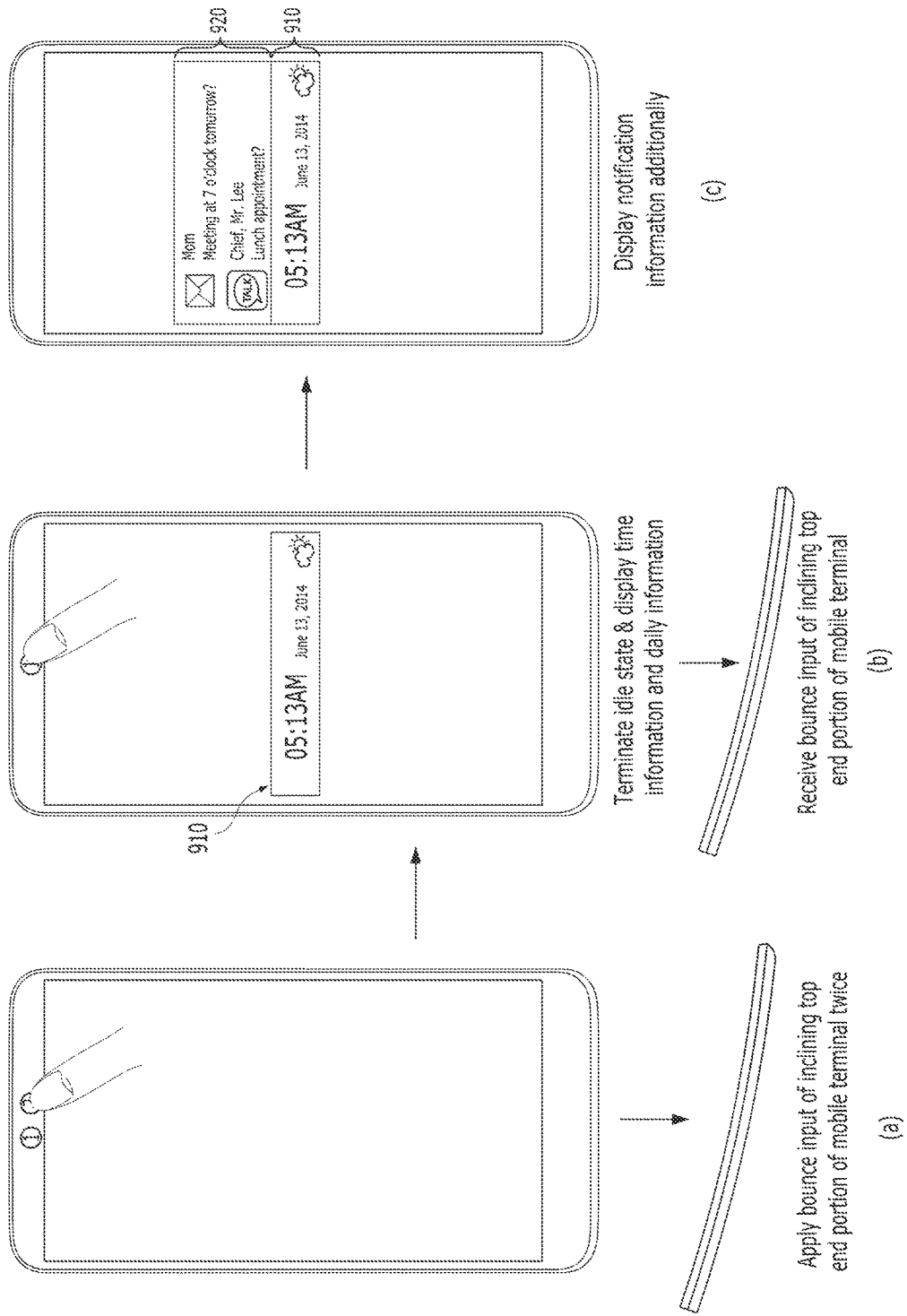

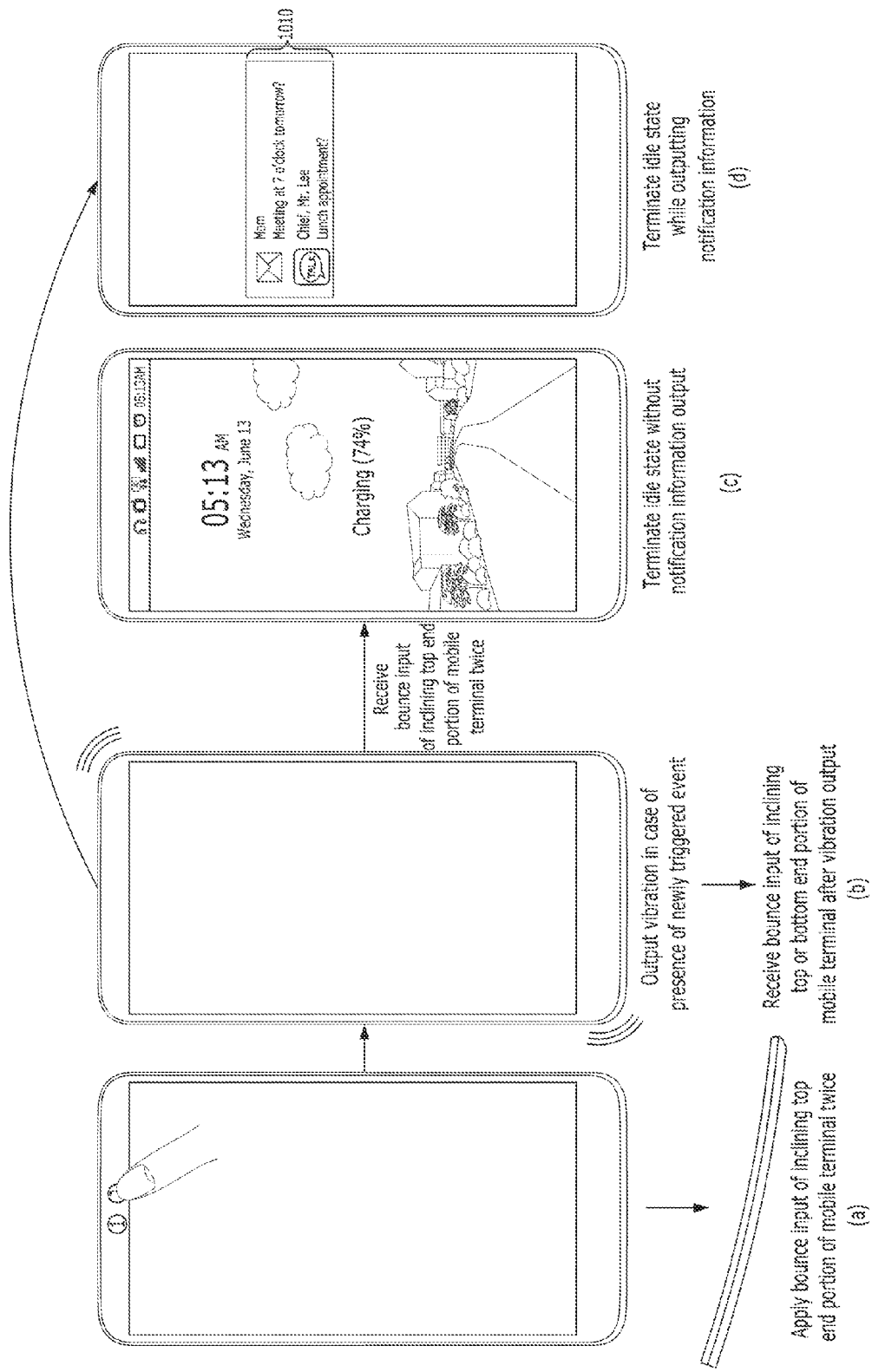

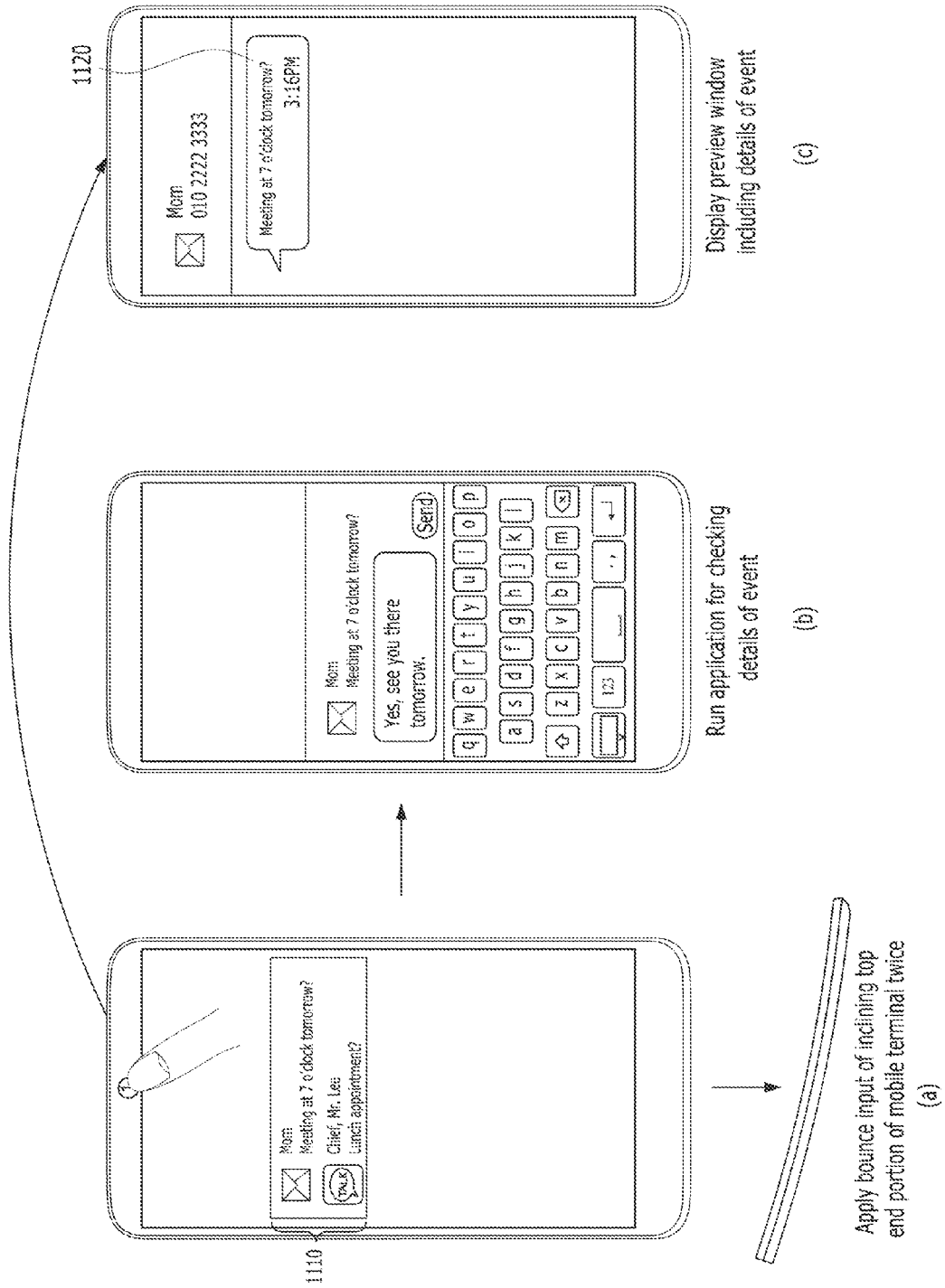

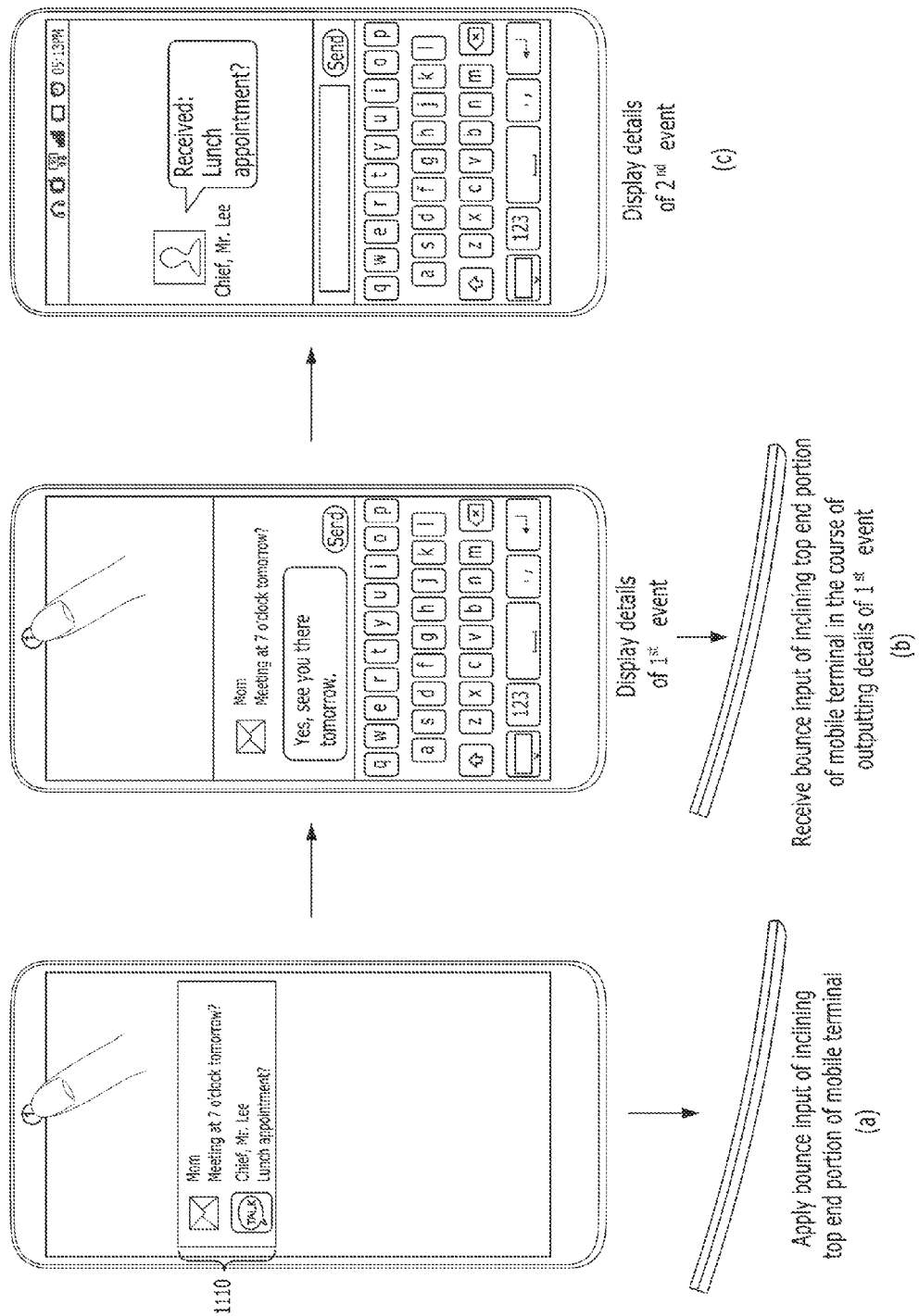

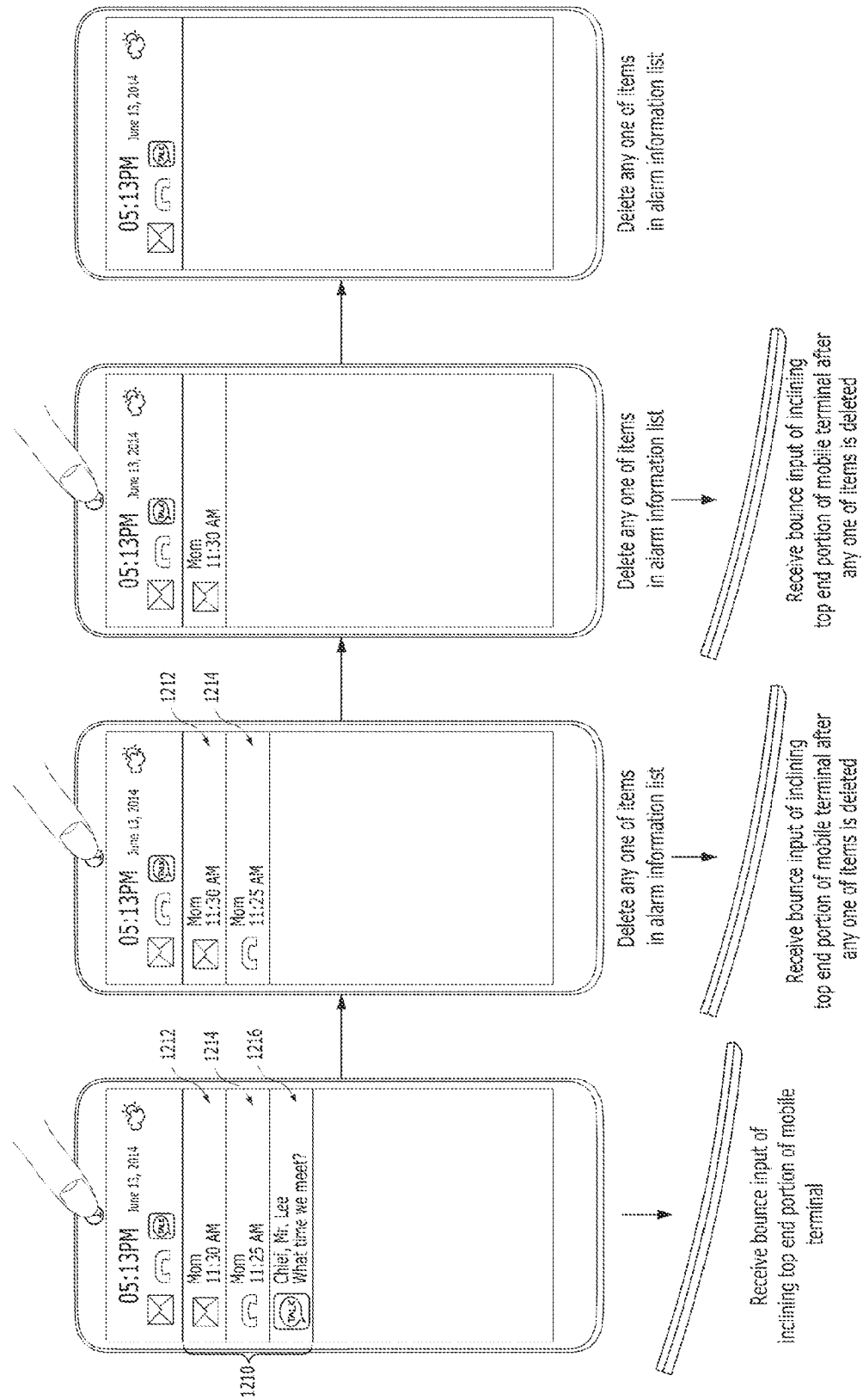

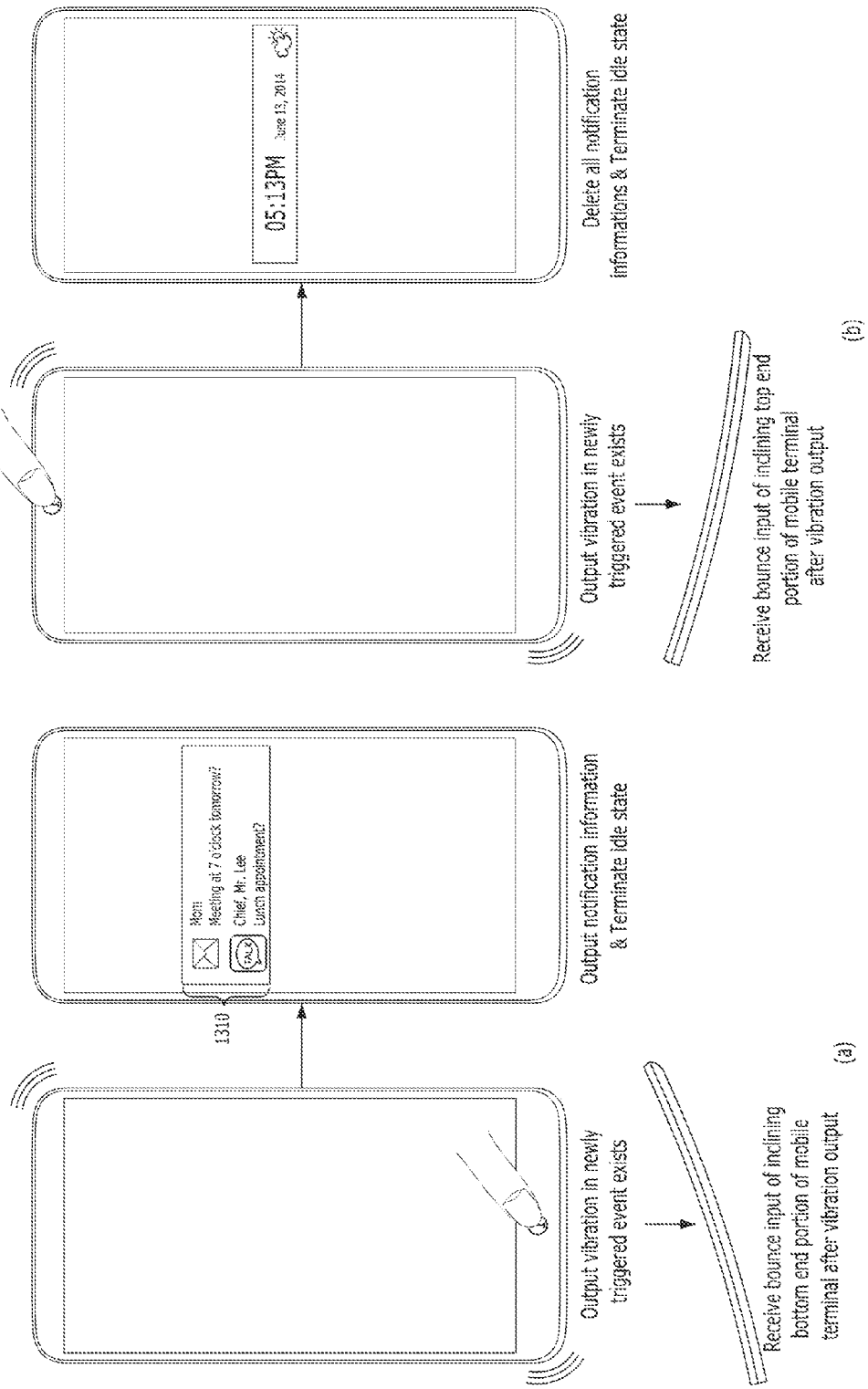

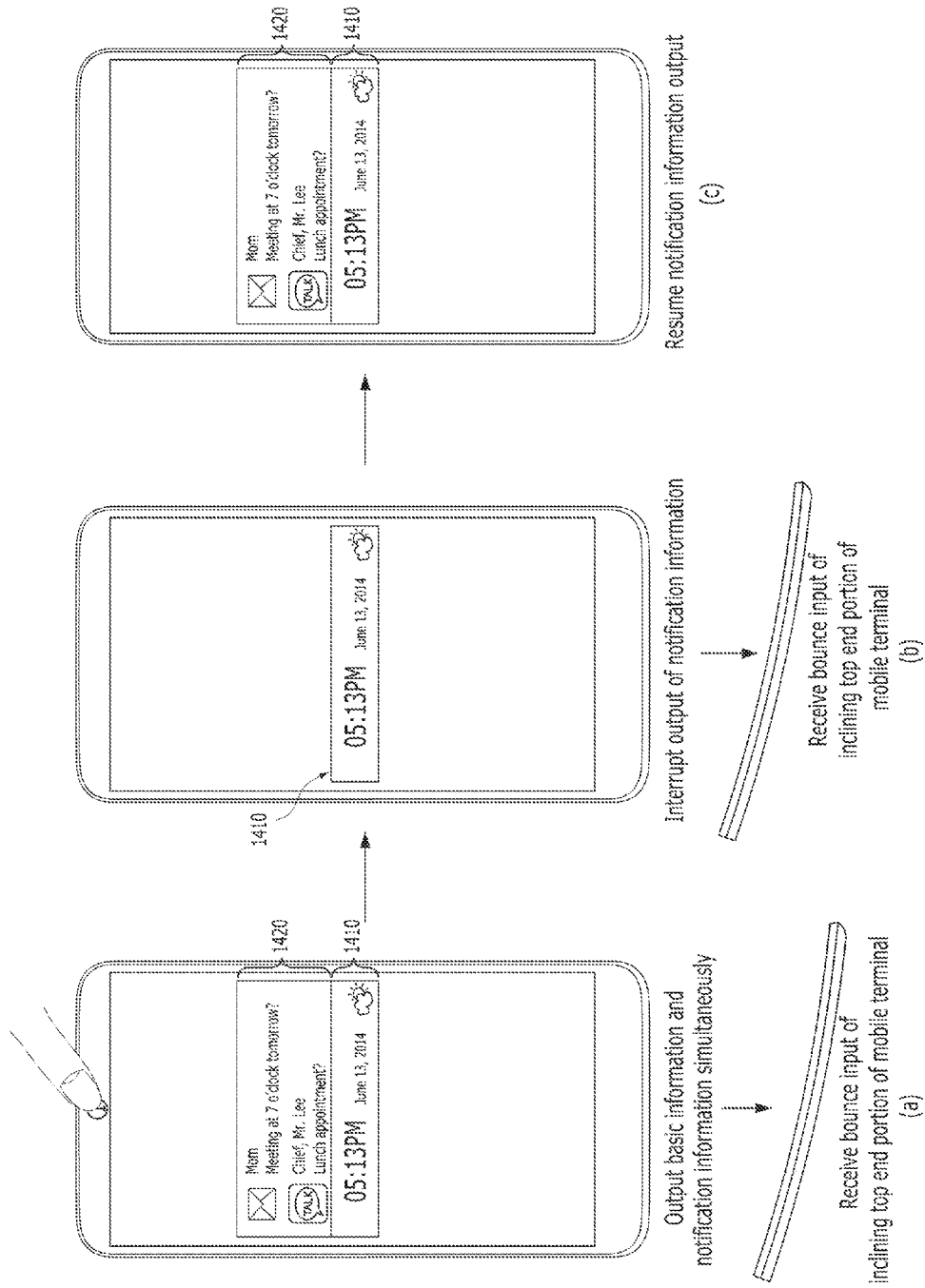

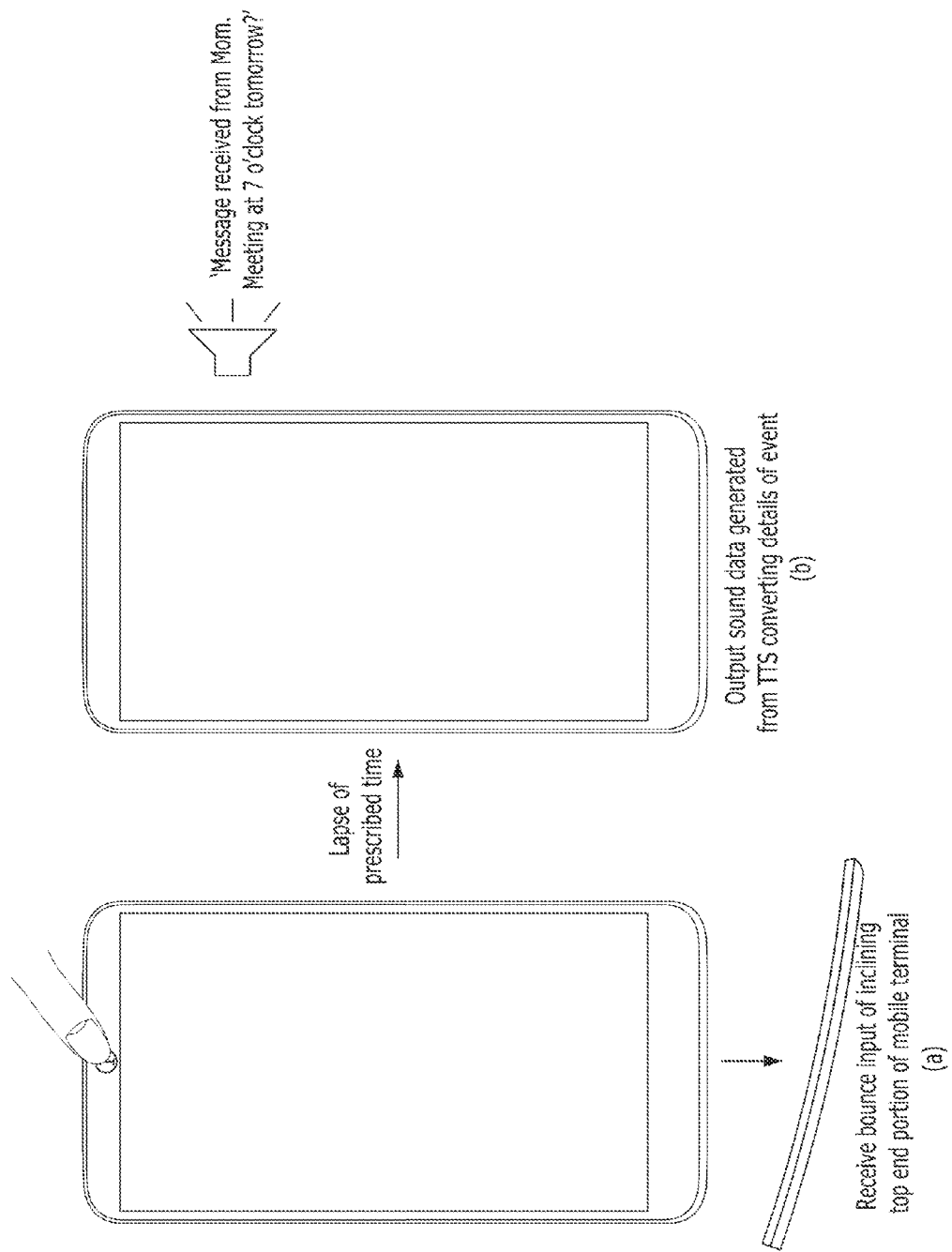

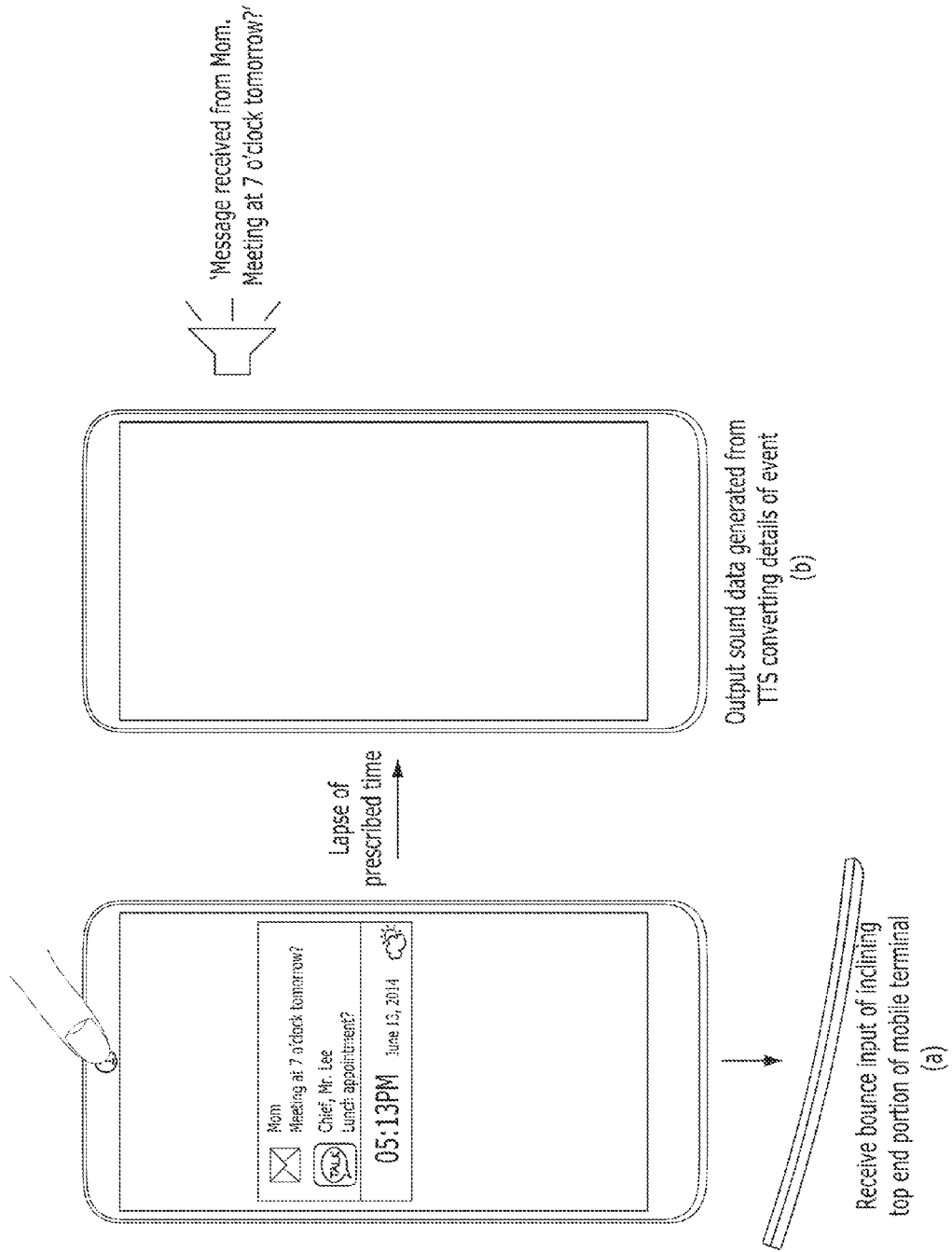

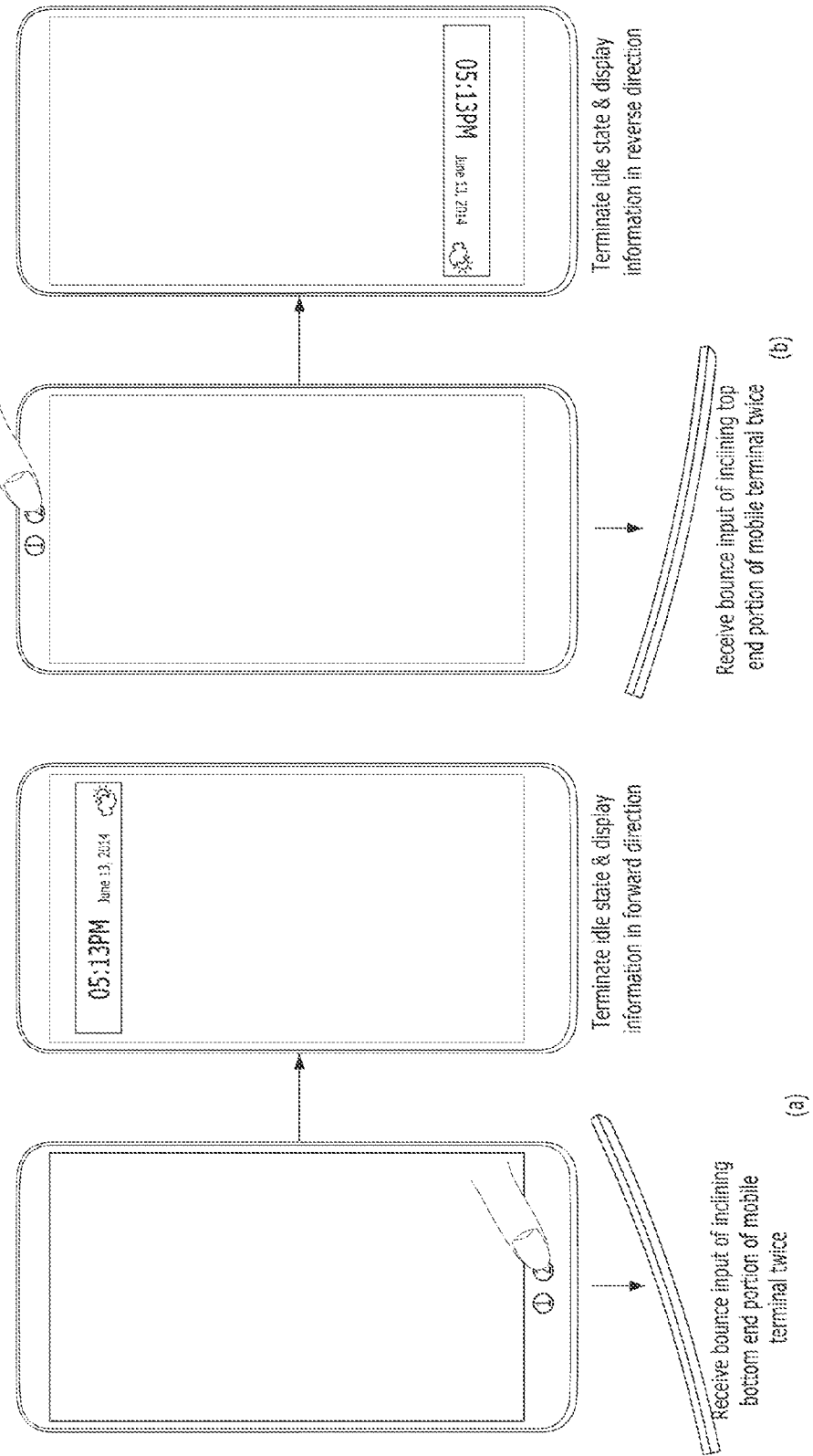

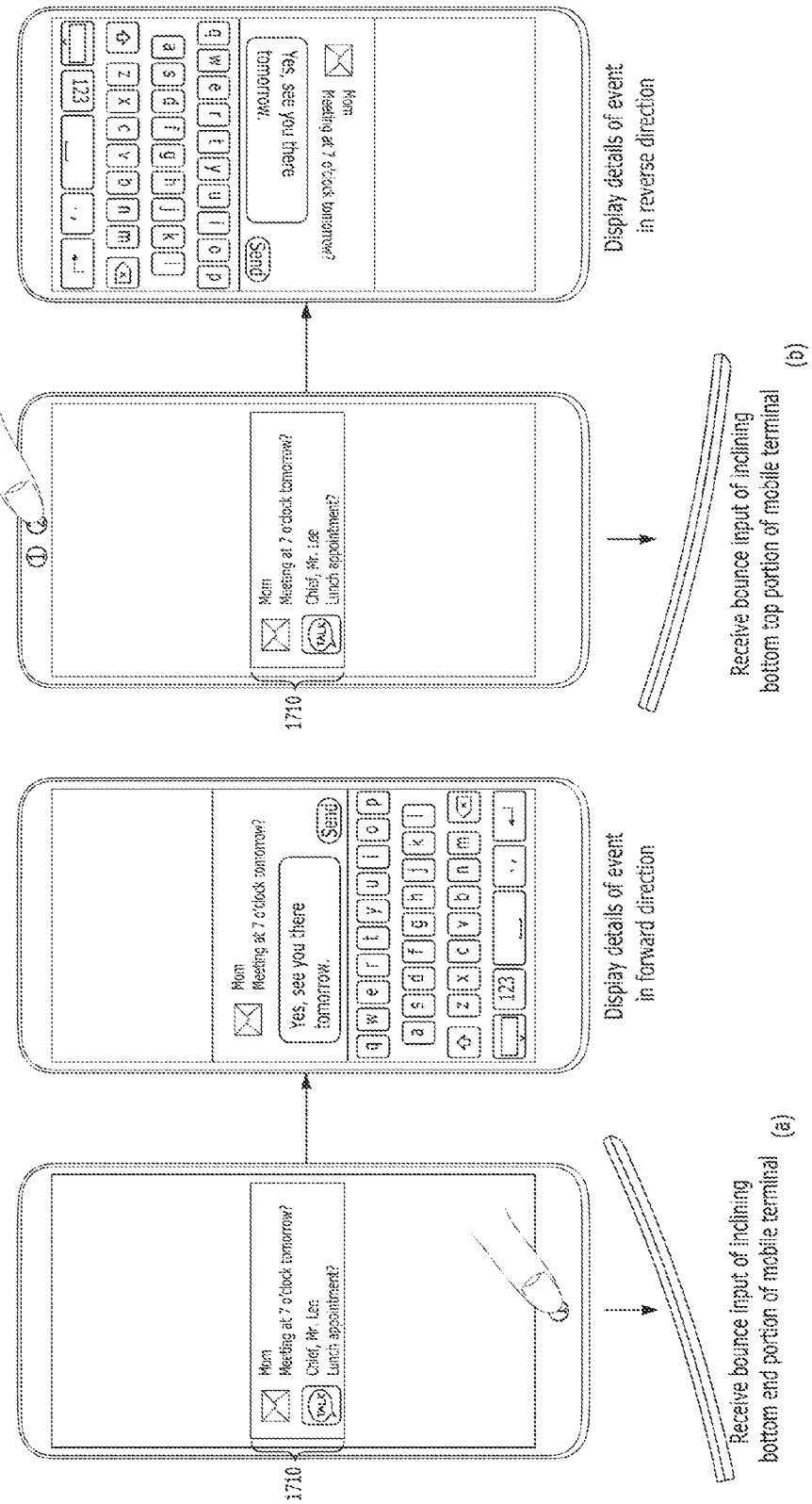

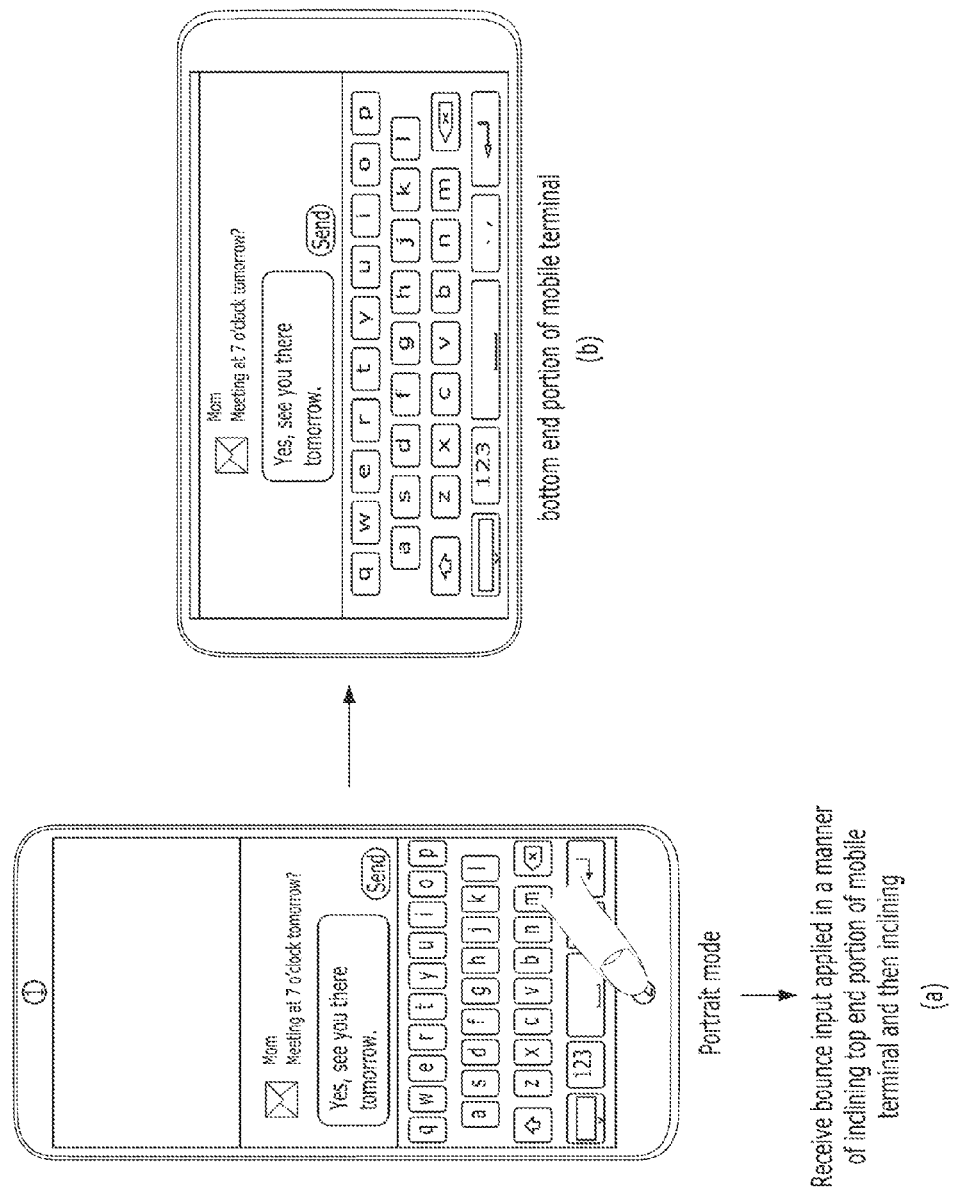

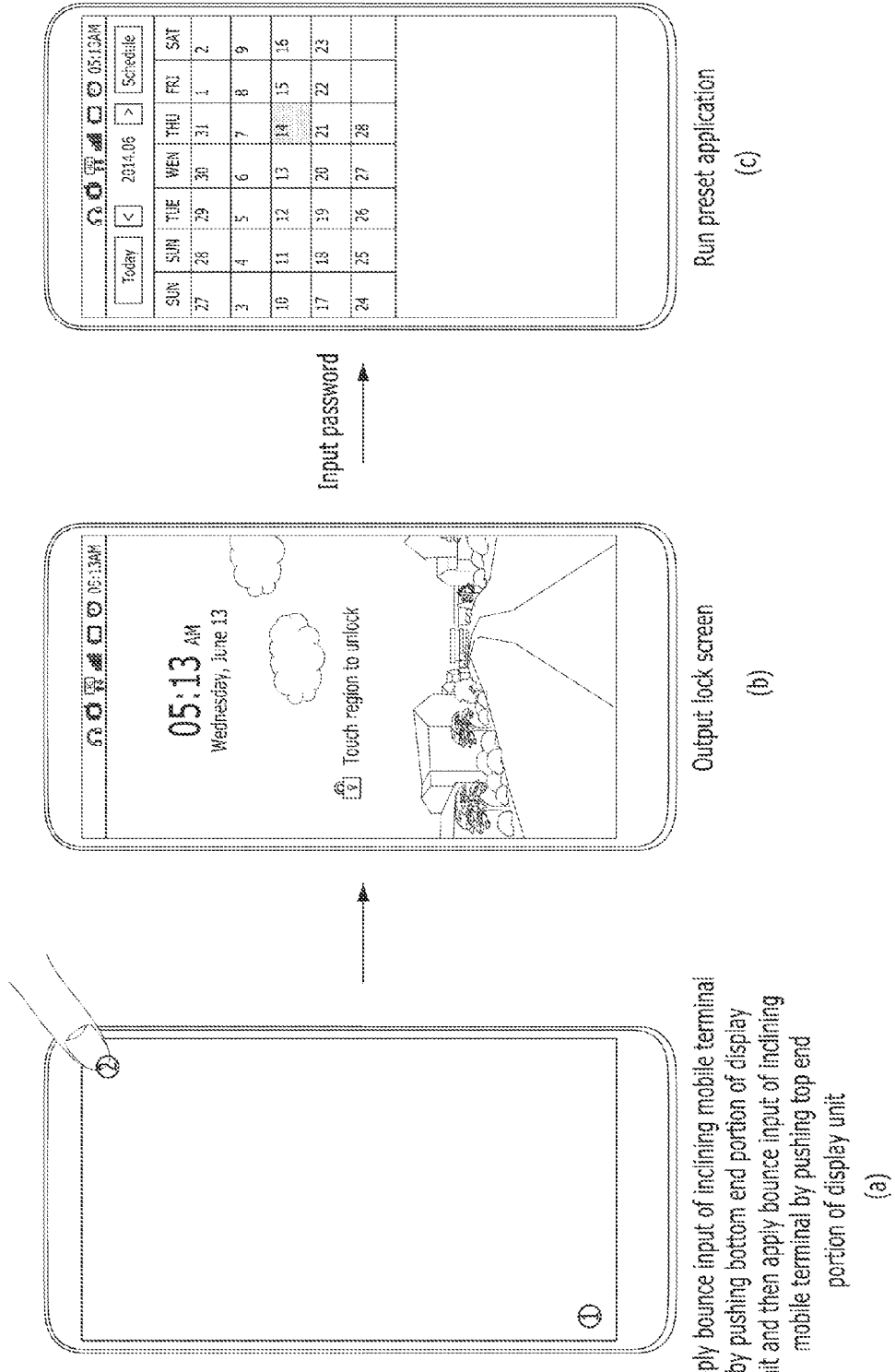

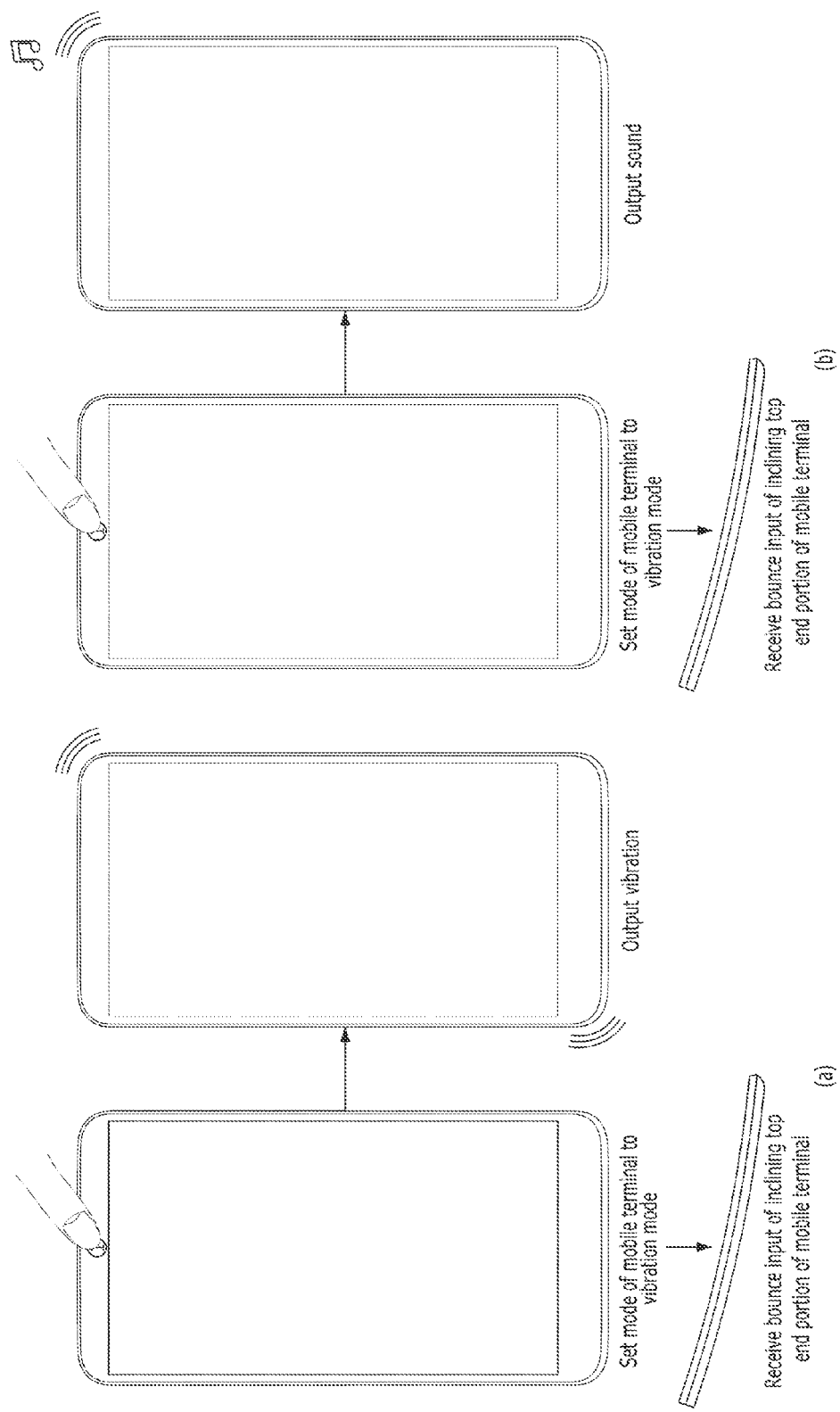

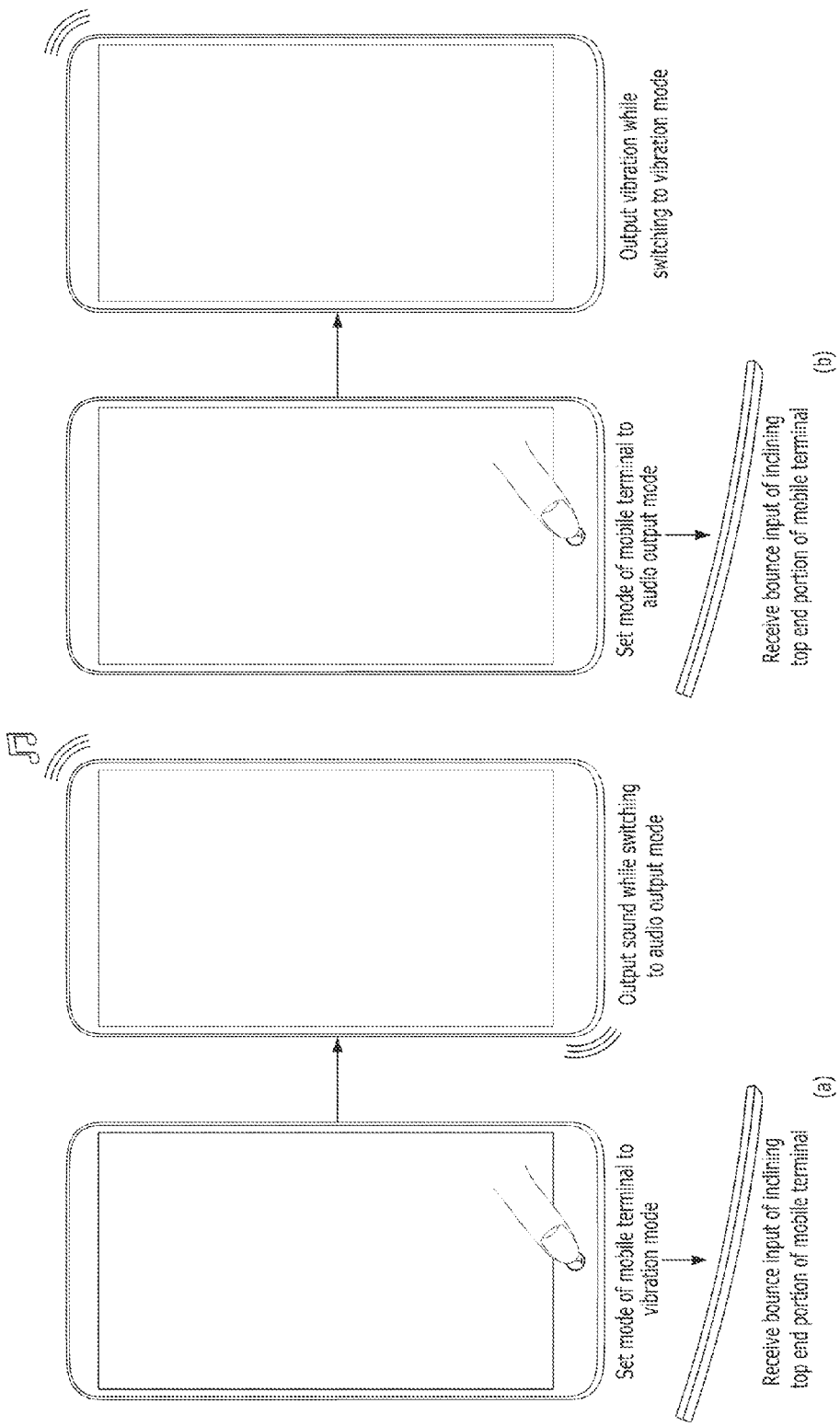

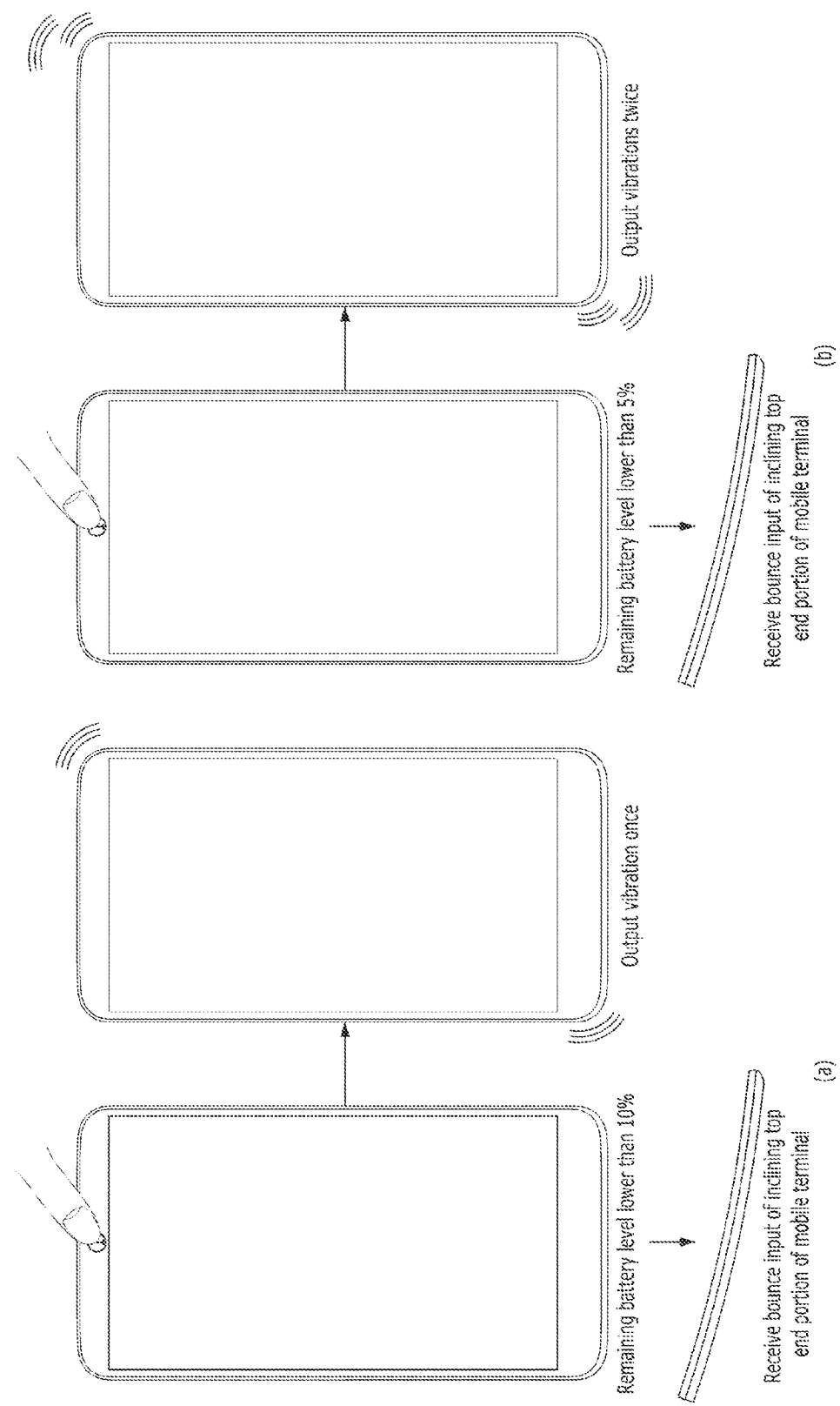

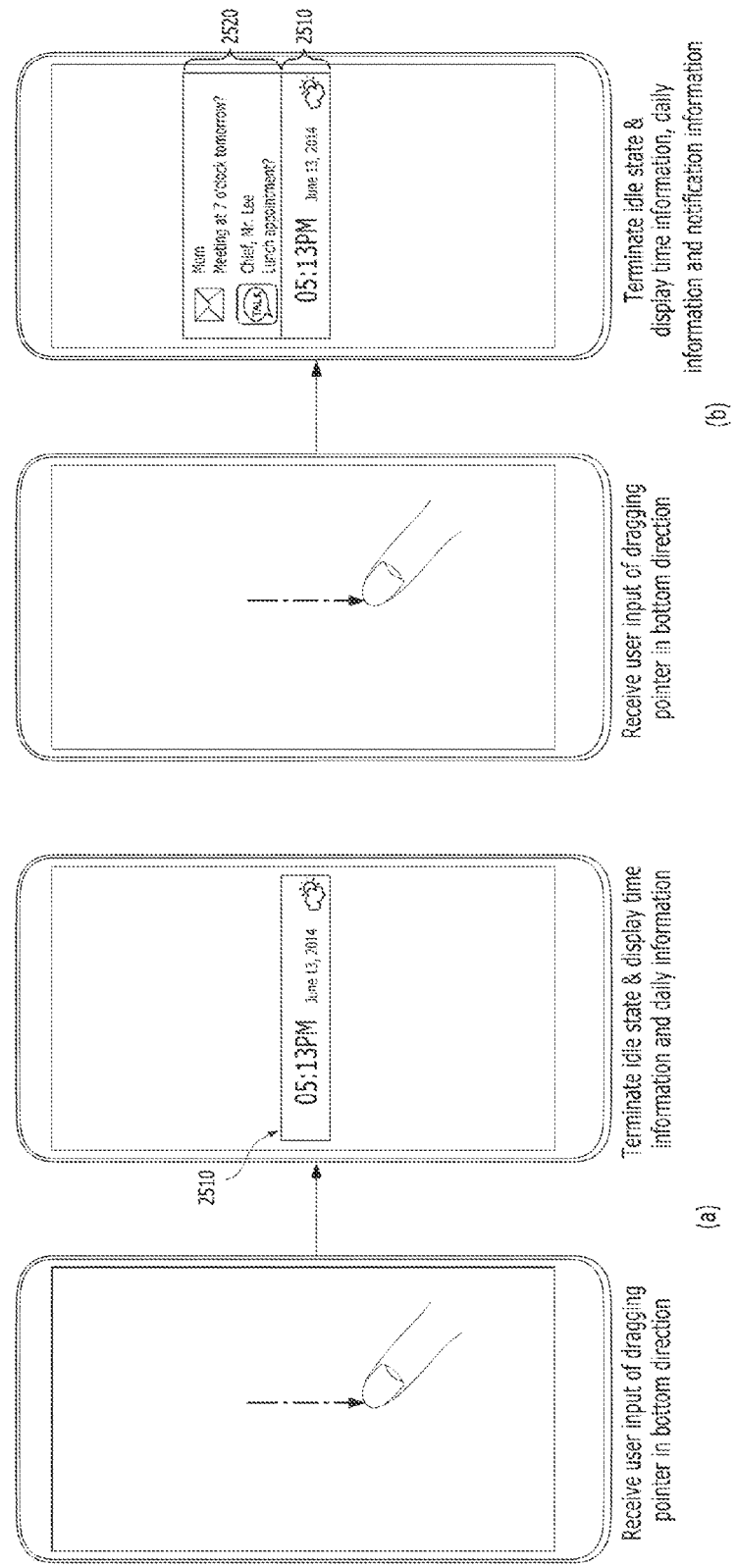

FIG. 28
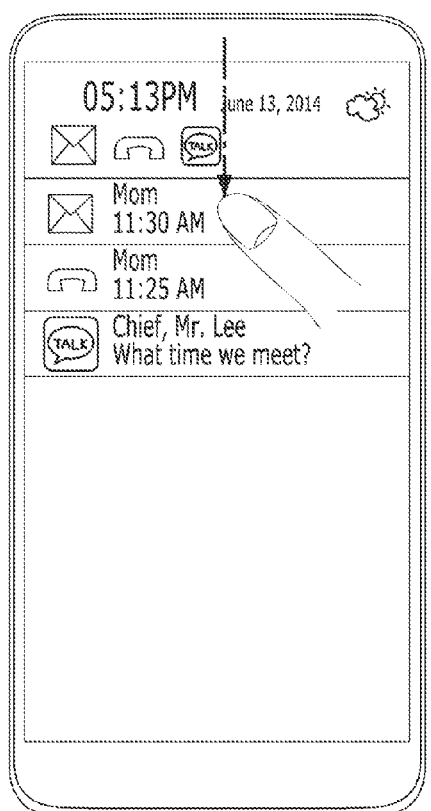
Select received text message
by dragging pointer to display
inside from bezel in the course
of displaying notification information
(a)
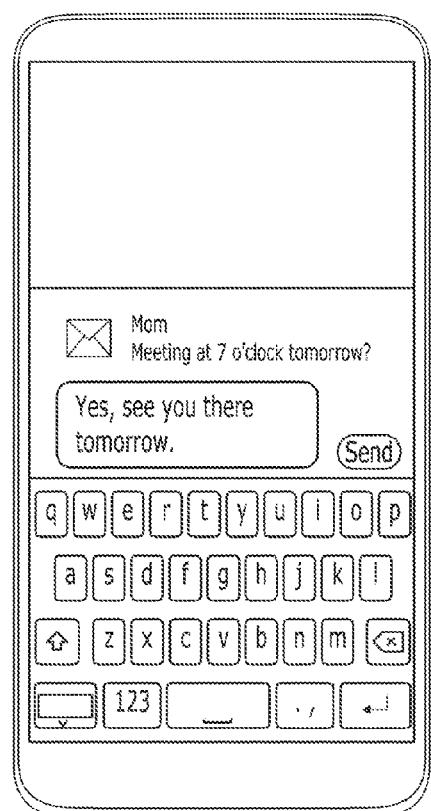
Display details of text message
(b)

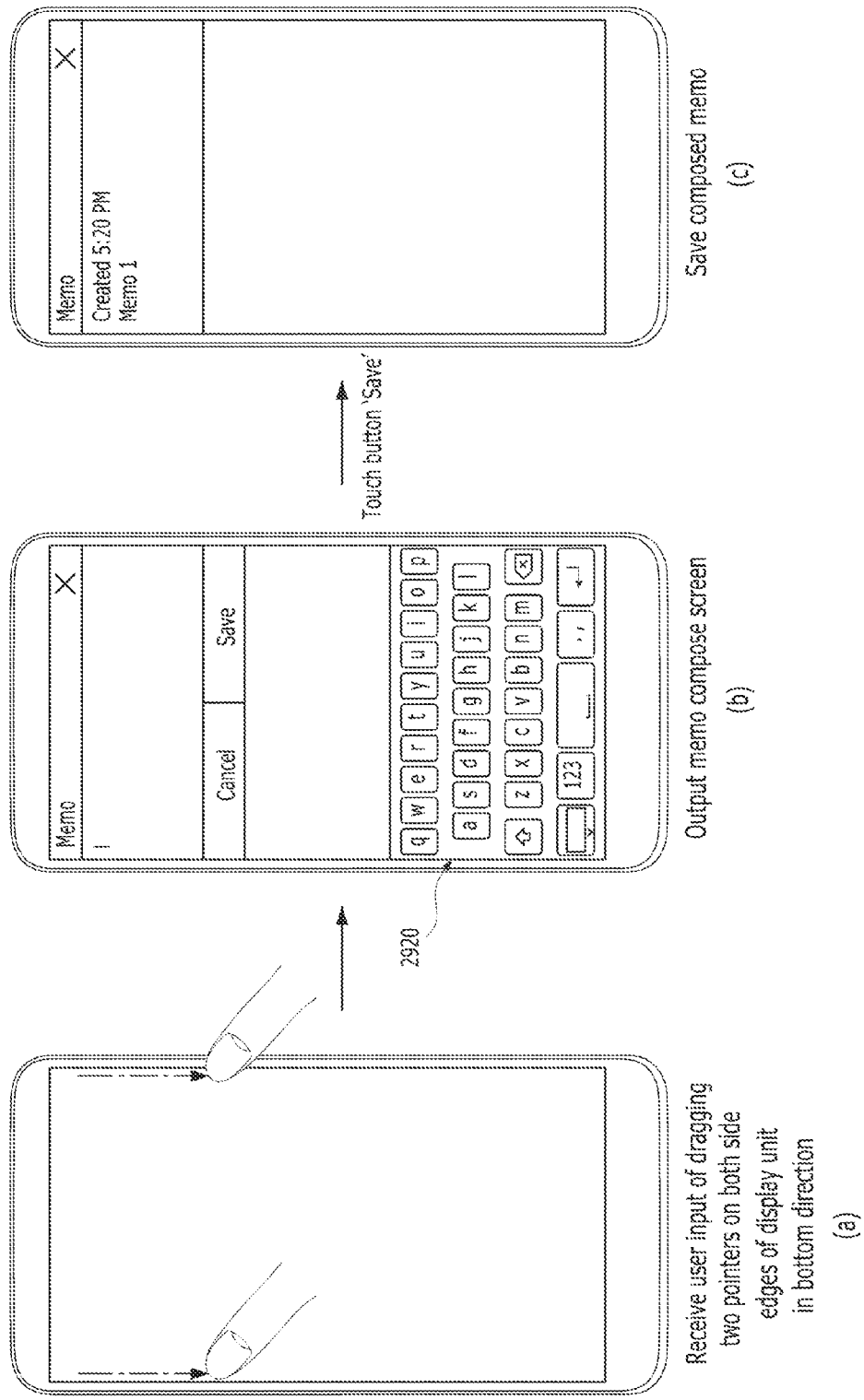

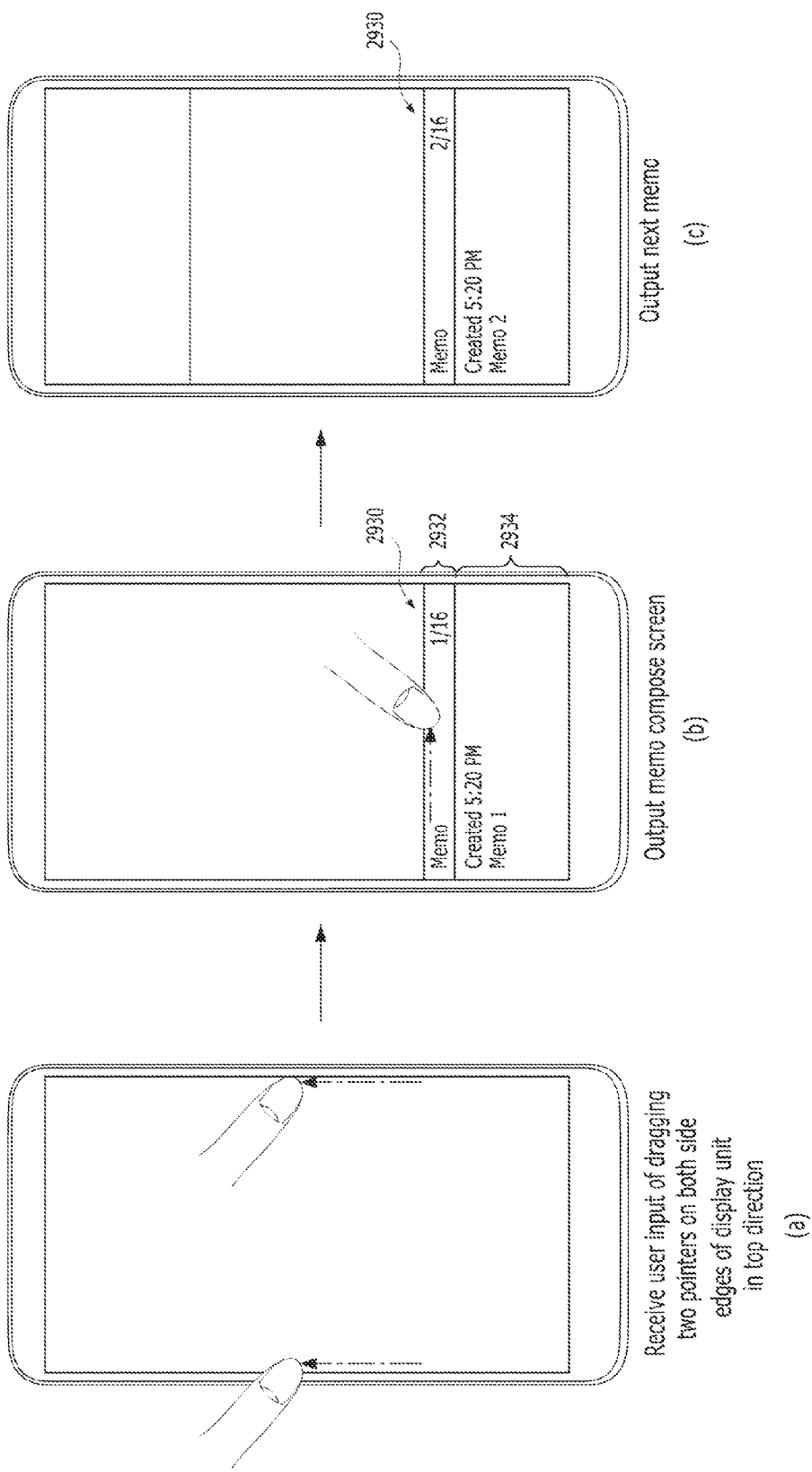

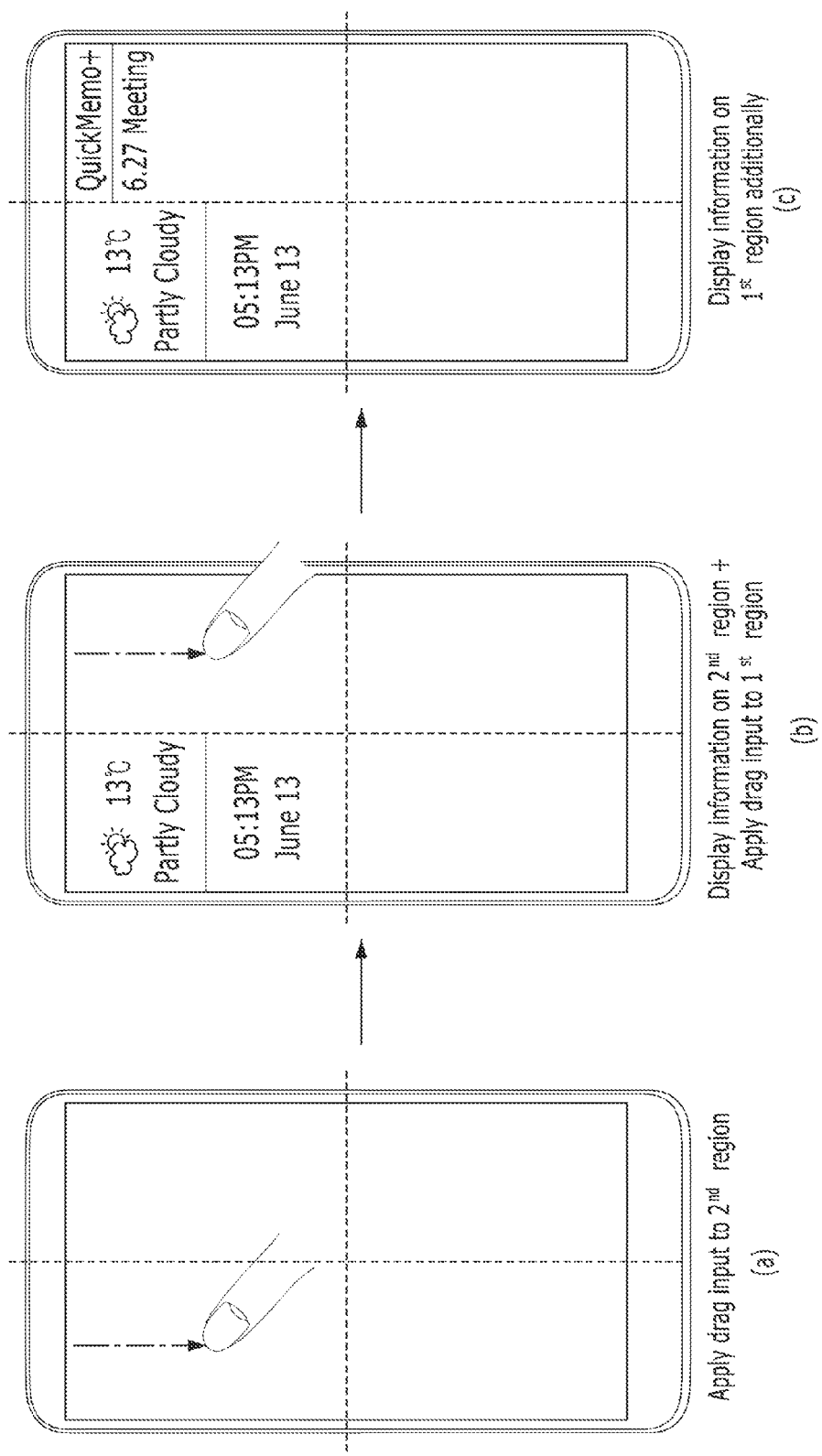

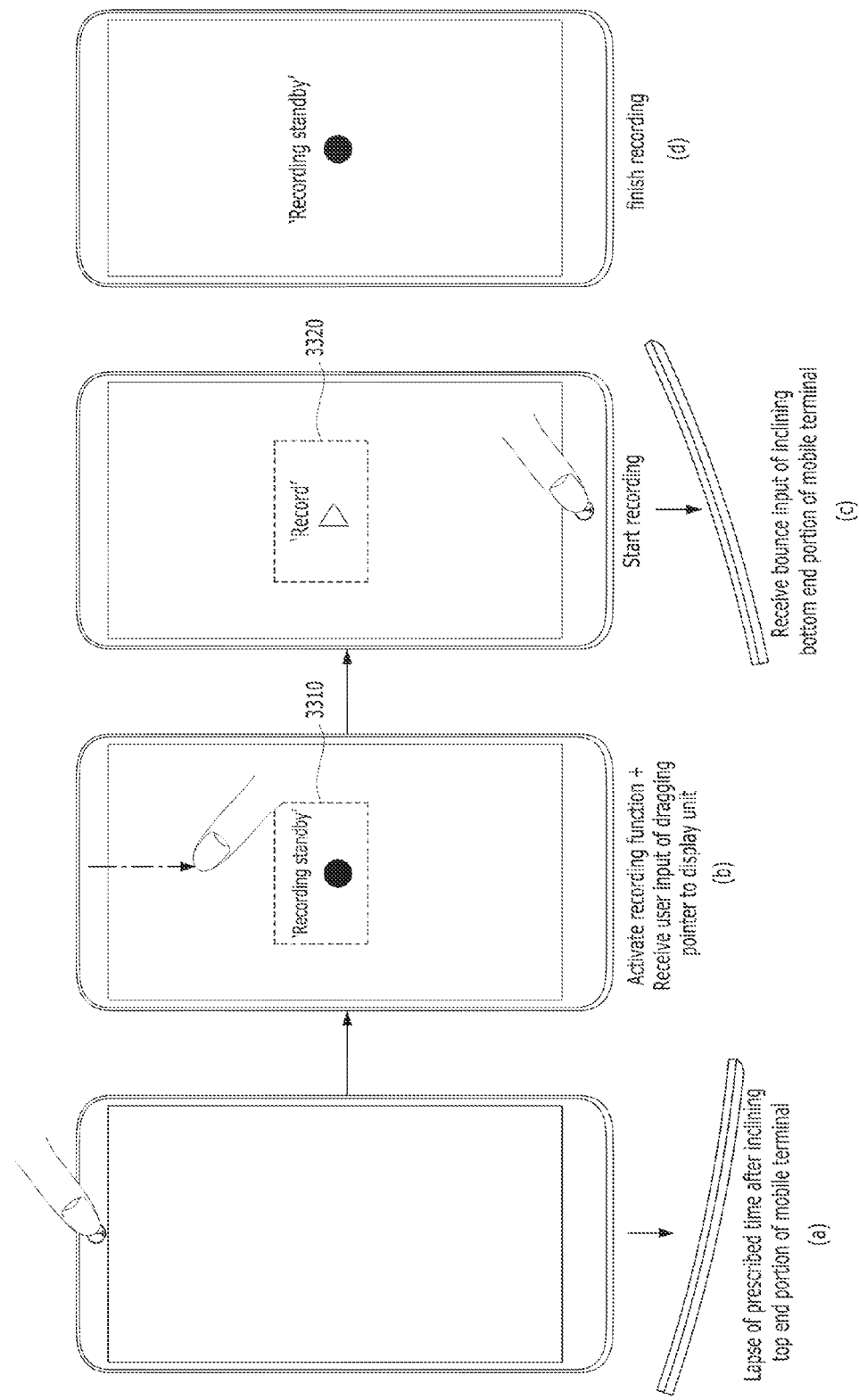

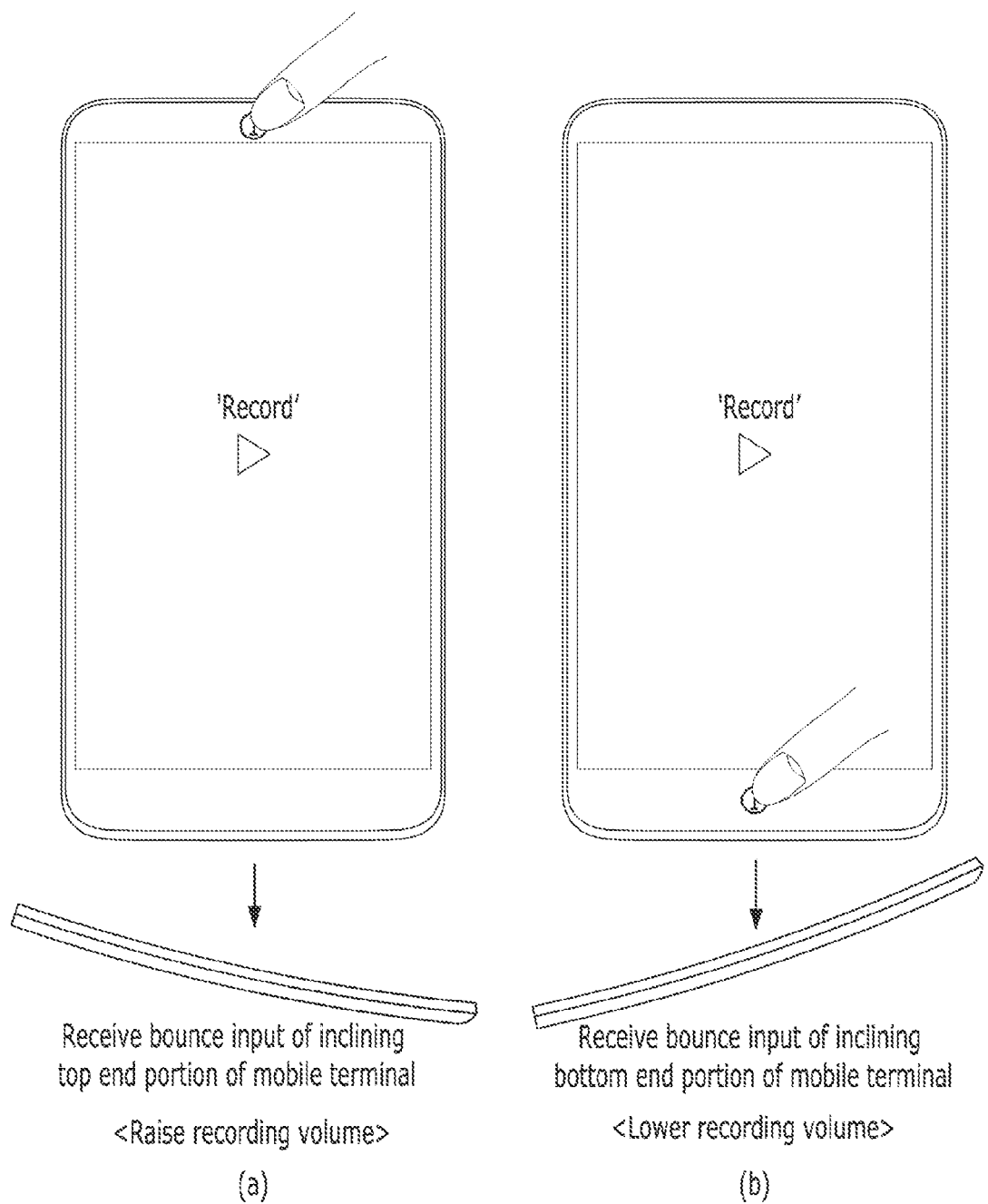

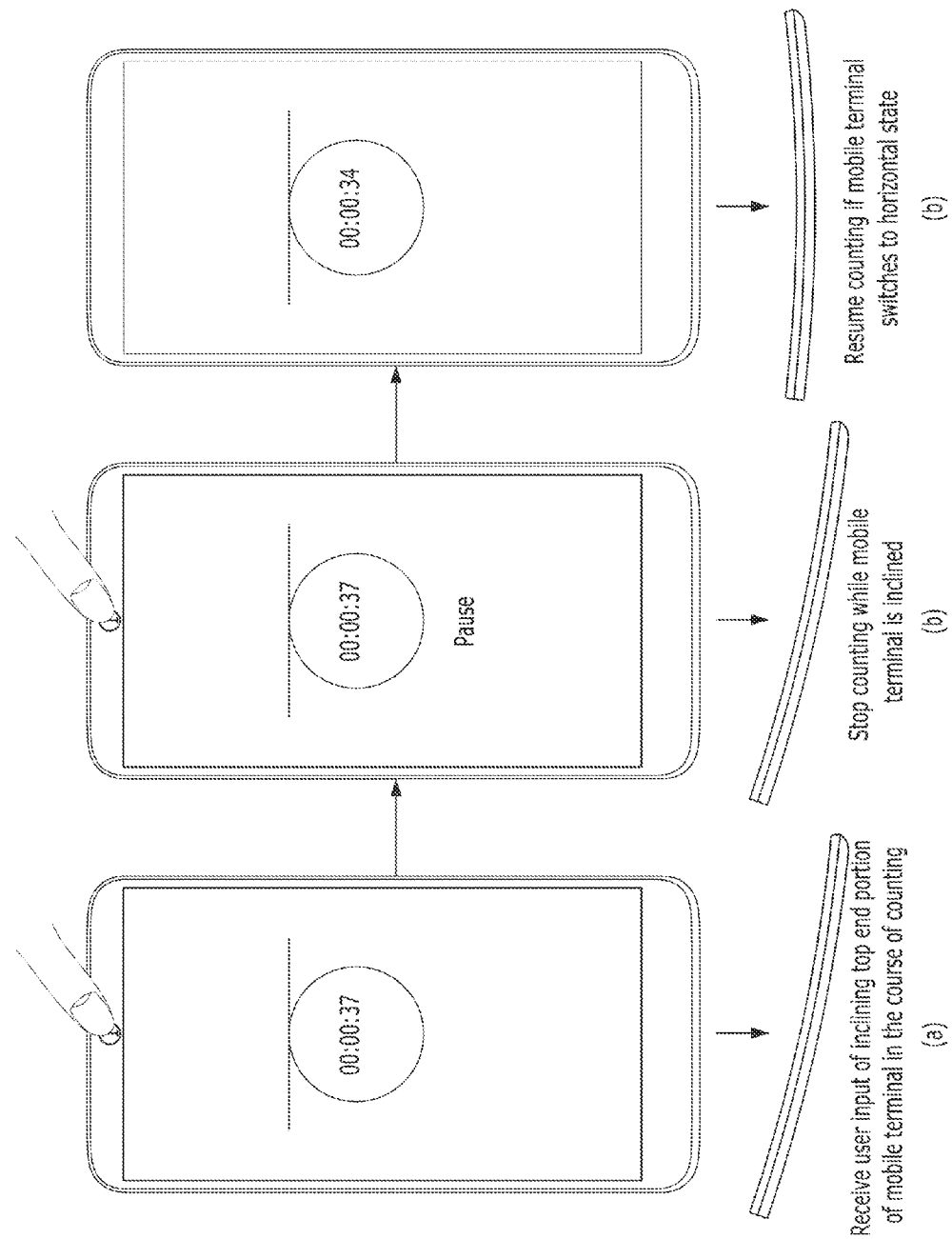

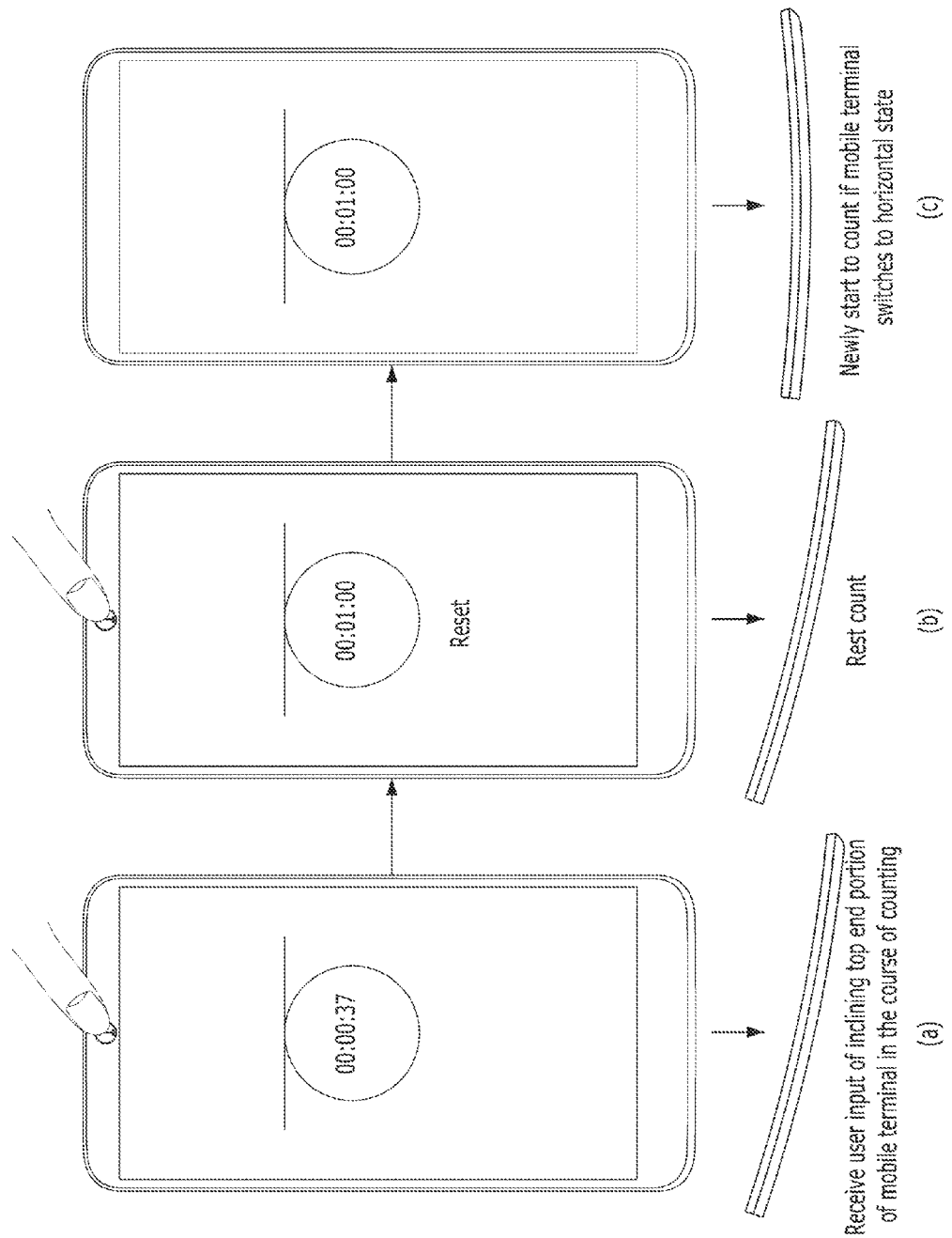

FIG. 45
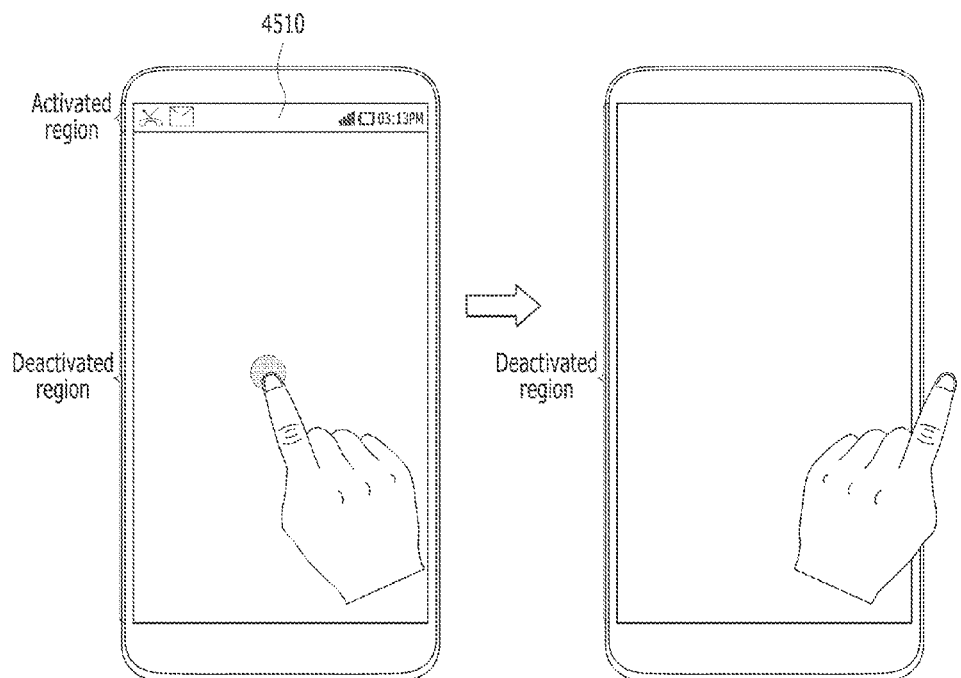
(a)
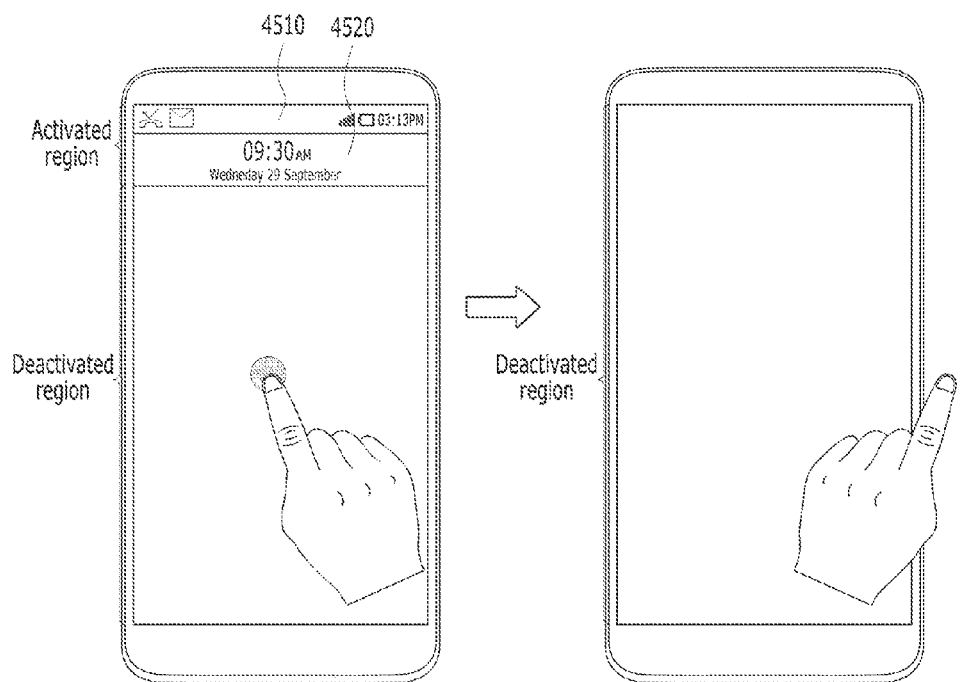
(b)

FIG. 46
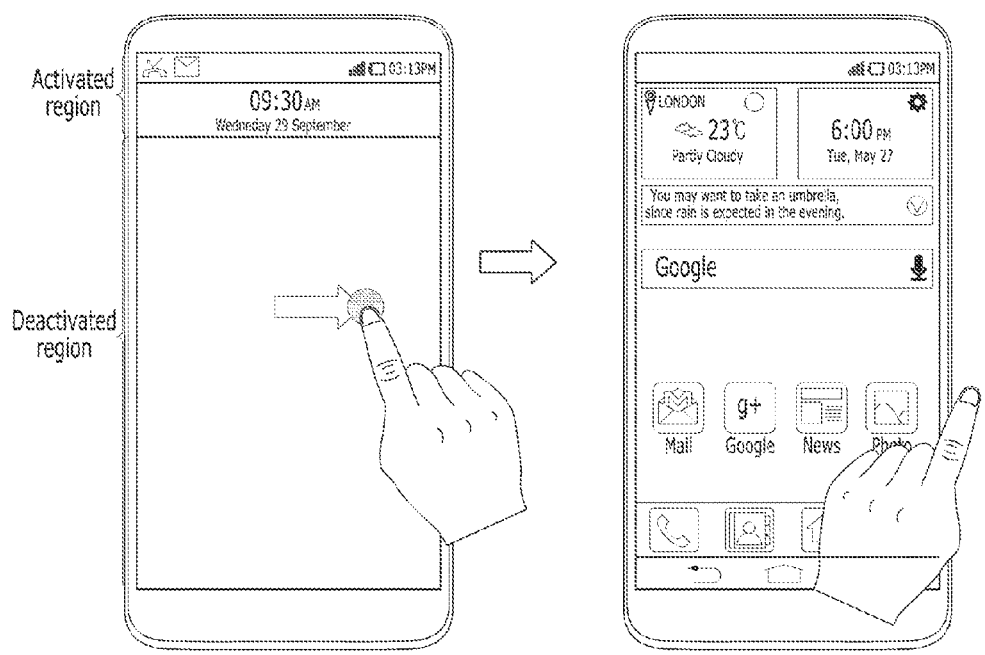
(a)
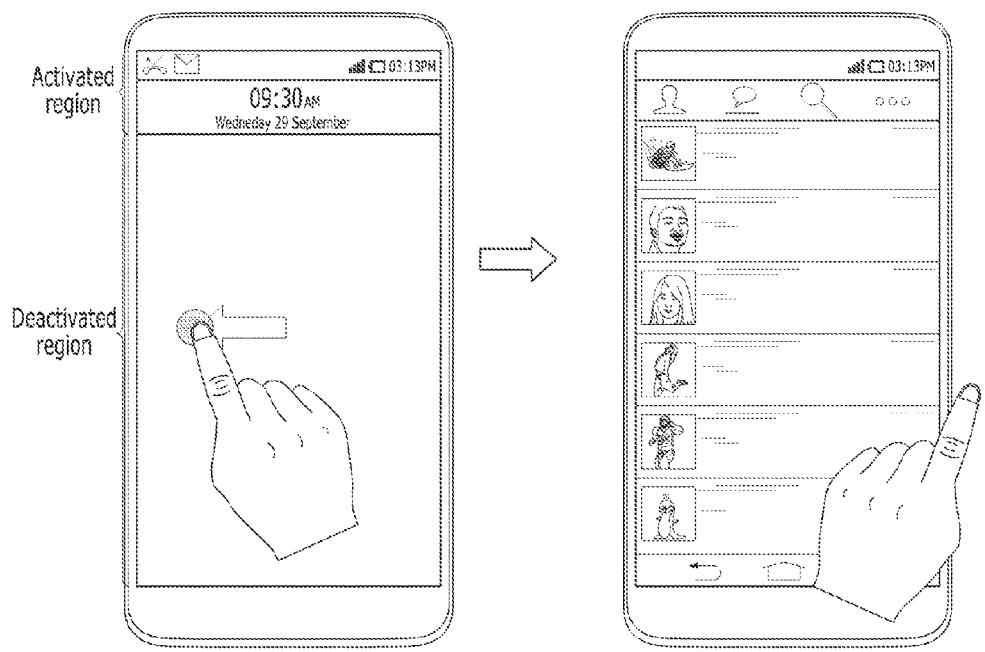
(b)

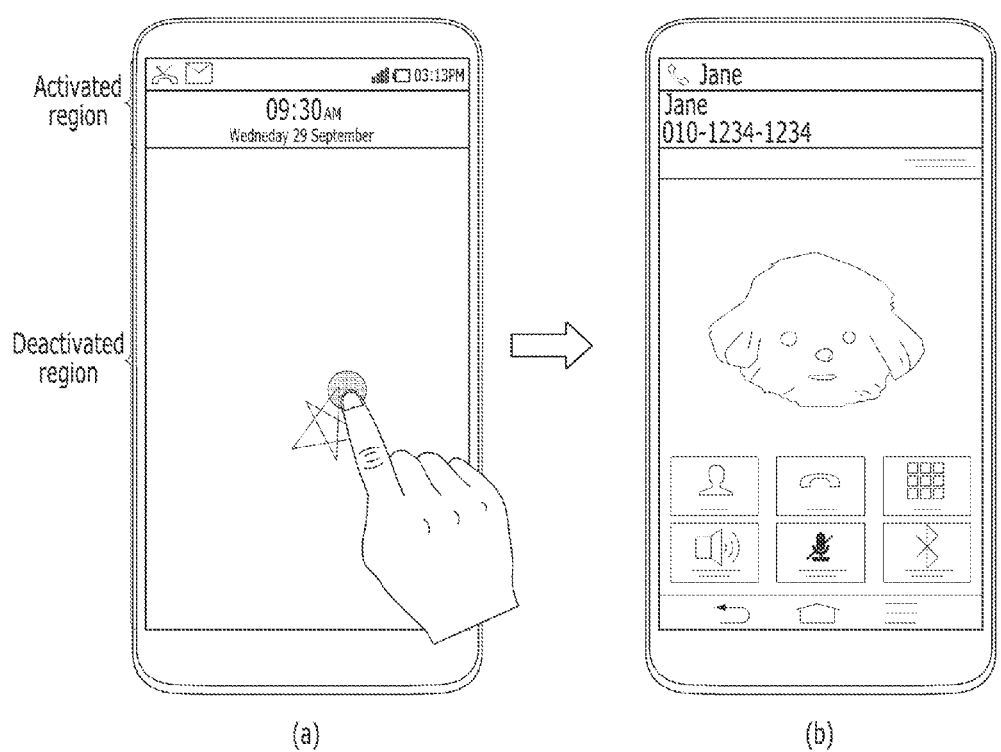

MOBILE TERMINAL AND CONTROLLING METHOD THEREOF

Pursuant to 35 U.S.C. § 119(a), this application claims the benefit of earlier filing date and right of priority to Korean Application No. 10-2014-0122081, filed on Sep. 15, 2014 and Korean Application No. 10-2014-0174106, filed on Dec. 5, 2014, the contents of which are hereby incorporated by reference herein in their entireties.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for terminating an idle state of the mobile terminal through a user input of inclining the mobile terminal.

Discussion of the Related Art

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Further, the shape of the mobile terminal tends to be diversified. For instance, when a mobile terminal employs a hard display unit, the related art mobile terminal usually has a rectangular shape. Recently, as a mobile terminal employs a flexible display, a shape of the mobile terminal can be diversified into a curved shape, a spherical shape and the like. However, the user input for the related art mobile terminal is insufficient for mobile terminals having a curved shape.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which an idle state of the mobile terminal can be terminated through a user input of inclining the mobile terminal.

Another object of the present invention is to provide a mobile terminal and controlling method thereof, by which a locked mobile terminal can be unlocked through a combination of user inputs of inclining the mobile terminal.

Additional advantages, objects, and features of the invention will be set forth in the invention herein as well as the accompanying drawings. Such aspects may also be appreciated by those skilled in the art based on the invention herein.

To achieve these objects and other advantages and in accordance with the purpose of the invention, as embodied and broadly described herein, a mobile terminal may include a display unit configured to switching between an On state and an Off state, a touch sensor configured to sense touch on the display unit in the On or Off state, and a controller configured to switch at least a portion of the display unit to the On state when displacement of a drag input, dragging a pointer in a predetermined direction, in a first direction reaches a first reference value, output first information in a first area of the display unit when at least the portion of the display unit turns to the ON state, and switch the display unit to the Off state when the pointer, which has dragged in the predetermined direction, is released from the display unit after the display unit is switched to the On state, wherein the display unit is maintained in the On state after the display unit is switched to the On state in response to the drag input while the pointer, which has dragged in the predetermined direction, is touching the display unit.

In another aspect of the present invention, a method of controlling a mobile terminal may include receiving a drag input of dragging a pointer in a predetermined direction on a display unit in an Off state, switching, when a displacement of the drag input in a first direction reaches a first reference value, at least a portion of the display unit to an On state, outputting first information in a first area of the display unit, and switching the display unit to the Off state when the pointer, which has dragged in the predetermined direction, is released from the display unit after the display unit is switched to the On state, wherein the display unit is maintained in the ON state after the display unit is switched to the On state in response to the drag input while the pointer, which is dragged in the predetermined direction, is touching the display unit.

According to the embodiments of the present invention mentioned in the above description, if the combination of the consecutive user inputs matches the password, the display unit may be turned on and the mobile terminal may be unlocked.

Moreover, if the combination of the consecutive user inputs fails to match the password, the mobile terminal may output such a feedback as a vibration, a sound and a light through LED.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 3A to 3C are diagrams of a mobile terminal having a curved shape;

FIG. 4 is a diagram illustrating one example of distinguishing a user input in response to a location of a display unit touched with a pointer when applying a user input of inclining a mobile terminal;

FIG. 6 is a diagram illustrating one example of outputting a lock screen in response to a bounce input;

FIG. 8A and FIG. 8B are diagrams illustrating examples of outputting a preset information on terminating an idle state of a mobile terminal;

FIG. 9 is a diagram illustrating one example of sequentially displaying a basic information and a notification information;

FIG. 10 is a diagram illustrating one example of outputting a notification information after outputting a feedback;

FIG. 11A and FIG. 11B are diagrams illustrating examples of outputting details of an event in response to a bounce input;

FIG. 12 is a diagram illustrating one example of deleting the respective items on an notification information list sequentially;

FIG. 13 is a diagram illustrating one example of deleting every notification information in response to a bounce input;

FIG. 14 is a diagram illustrating one example of interrupting or resuming an output of a notification information list;

FIG. 15A and FIG. 15B are diagrams illustrating examples of outputting sound data generated from converting notification information to audio;

FIG. 16 is a diagram illustrating one example of adjusting a display direction of information, which are output on terminating an idle state, in response to a direction of a bounce input;

FIG. 17 is a diagram illustrating one example of adjusting a direction for displaying details of an event;

FIG. 18 is a diagram illustrating one example of adjusting an output mode of a display unit based on a bounce input;

FIG. 20 is a diagram illustrating one example of outputting a lock screen before running a preset application;

FIG. 21A and FIG. 21B are diagrams illustrating examples of outputting an audio setting information of a mobile terminal in response to a bounce input;

FIG. 22A and FIG. 22B are diagrams illustrating examples of outputting a battery status information of a mobile terminal in response to a bounce input;

FIG. 25 is a diagram illustrating one example of outputting a basic information or a notification information in response to a bounce input received by a mobile terminal in idle state;

FIG. 28 is a diagram illustrating one example of outputting details of an event in response to a bounce input for selecting a notification information;

FIG. 29A and FIG. 29B are diagrams illustrating examples of outputting a memo compose screen or a memo in response to a preset touch input;

FIG. 32 is a diagram illustrating another example of adjusting a display location of an information in response to a user's touch input location;

FIGS. 33A to 33D are diagrams illustrating examples of activating a recording function in response to a bounce input;

FIGS. 34A to 34C are diagrams illustrating examples of activating a timer function in response to a bounce input;

FIG. 45 is a diagram illustrating one example for a mobile terminal to enter an idle state;

FIG. 46 is a diagram illustrating one example of an operation of a mobile terminal if a pointer is touched and dragged in a prescribed direction and then touch-released; and FIG. 47 is a diagram illustrating one example of an operation of a mobile terminal if a pointer draws a prescribed pattern.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
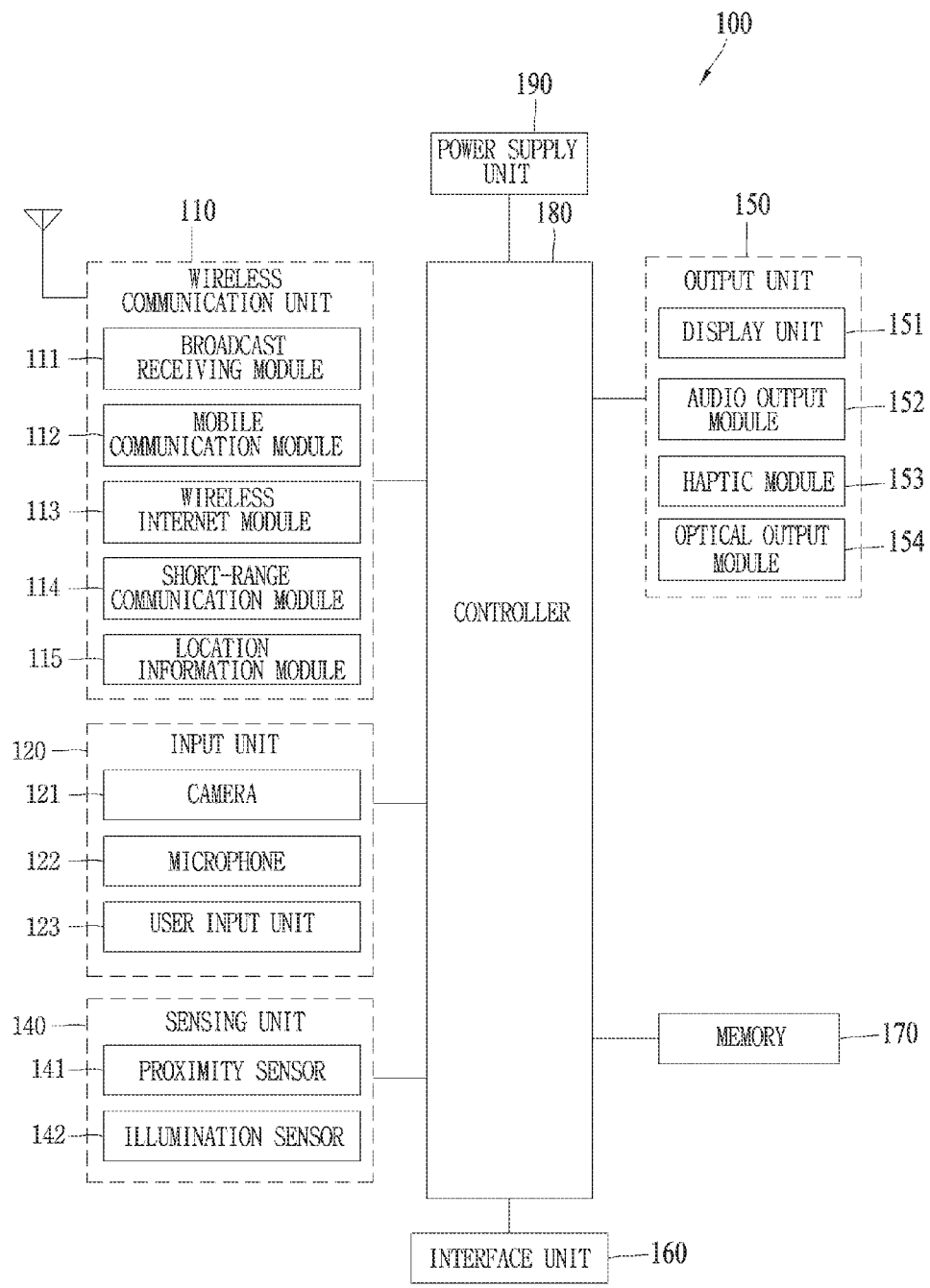
FIG. 1A is a block diagram of a mobile terminal in accordance with the present invention.
Figure 1B:
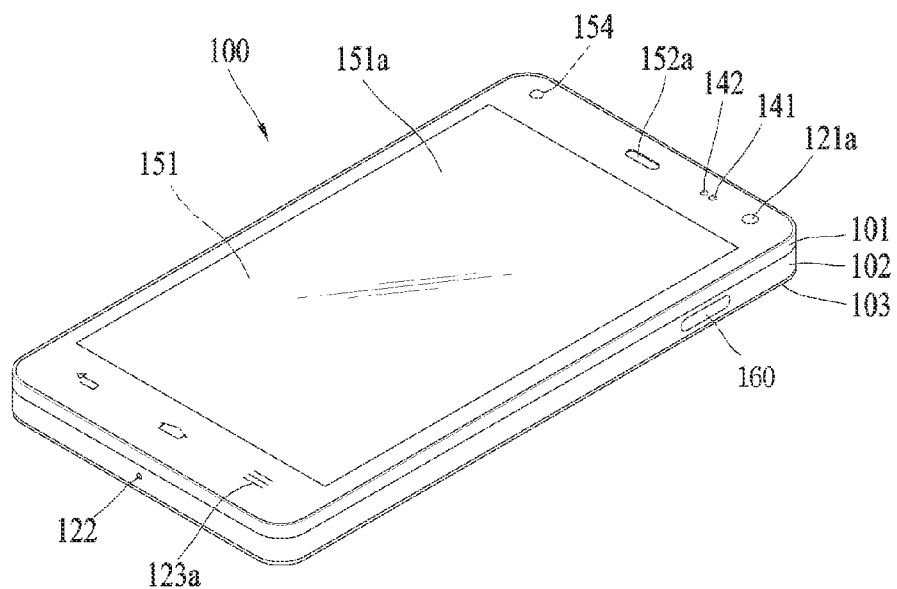
FIGS. 1B and 1C are conceptual views of one example of the mobile terminal, viewed from different directions.
Figure 1C:
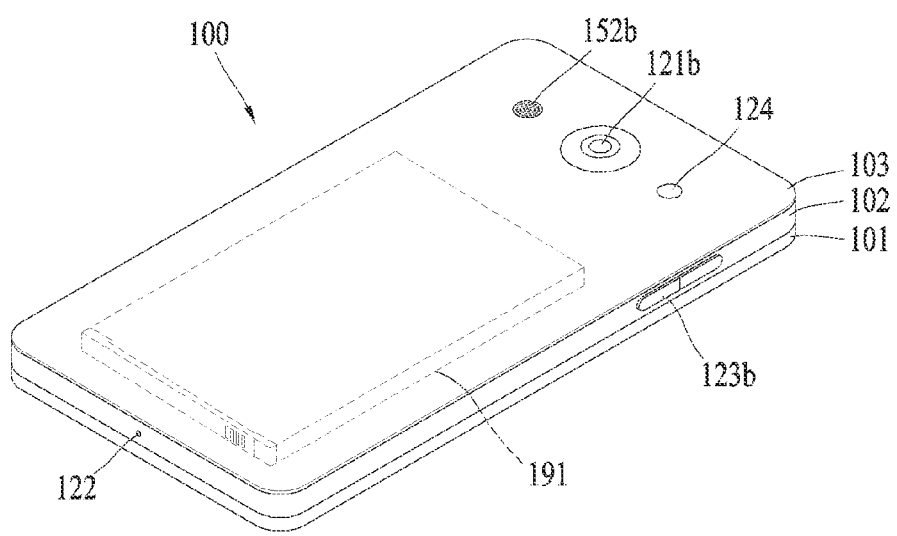

Reference is now made to FIGS. 1A-1C, where FIG. 1A is a block diagram of a mobile terminal according to an embodiment of the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some instances, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap)

touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
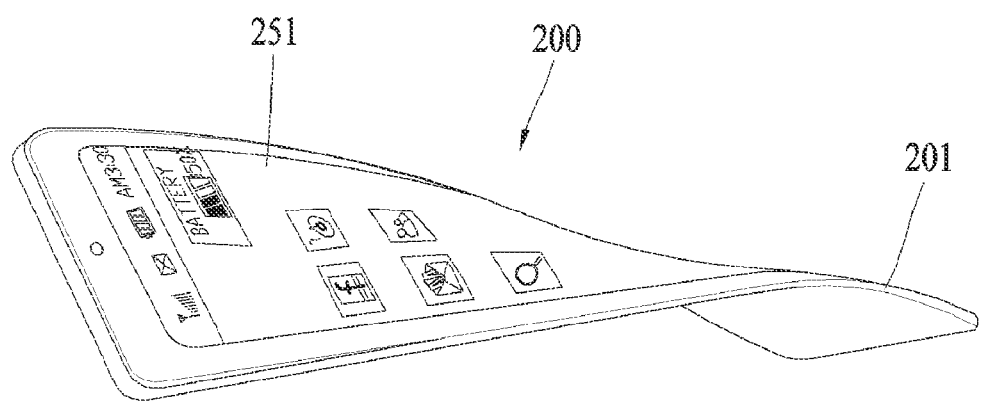
FIG. 2 is a conceptual view of a deformable mobile terminal according to an alternative embodiment of the present invention.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor. The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

A mobile terminal according to an embodiment of the present invention can be configured in a curved shape. In particular, when a backside part of the mobile terminal is placed to come in contact with a plane, both a top end portion and a bottom end portion of the mobile terminal are spaced apart from the plane to configure the curved shape or both a left side portion and a right side portion of the mobile terminal are spaced apart from a floor surface to configure the curved shape.

Figure 3C:
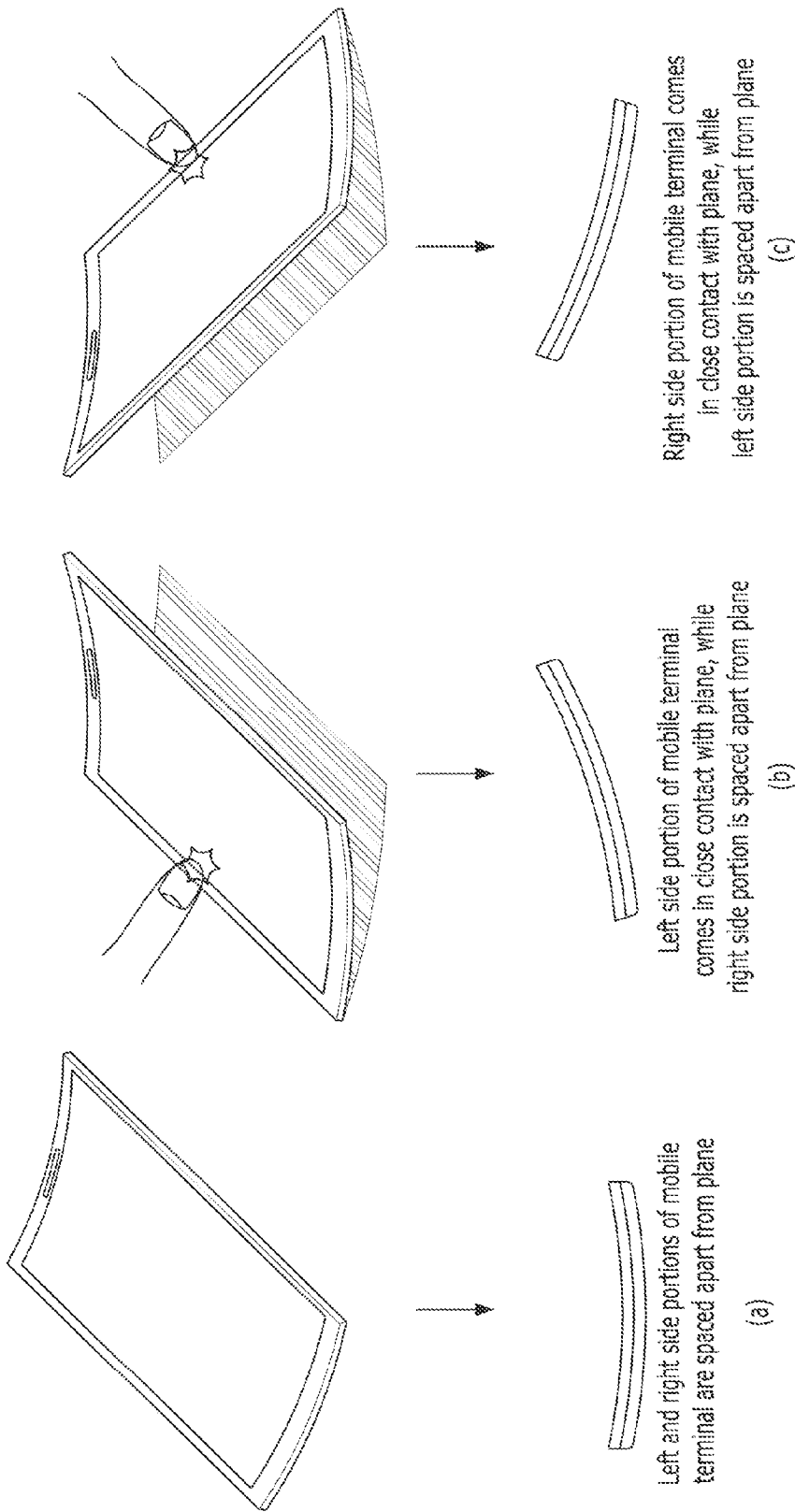

For instance, FIGS. 3A to 3C are diagrams of a mobile terminal having a curved shape. Referring to FIG. 3A, the mobile terminal 100 has a curved shape including a curved surface on its backside side and one side and the other side of the mobile terminal 100 are projected in a foreside direction and that a middle part of the mobile terminal 100 is projected in a backside direction. It may be unnecessary for the foreside and the backside to have curved surfaces equal to each other in curvature. For instance, the curved surface of the foreside may be configured flatter than that of the backside. In another instance, the foreside may be configured flat. When the mobile terminal 100 is put on a plane, the middle part of the backside comes in contact with a floor surface while one side and the other side may be spaced apart from the floor surface.

In particular, referring to FIG. 3B, when the mobile terminal 100 is put on the plane (e.g., a floor surface), the mobile terminal 100 can have a curved shape in a manner that top and bottom end portions of the mobile terminal 100 are spaced apart from the plane (FIG. 3B (a)). Further, the mobile terminal 100 may incline so that the top end portion of the mobile terminal 100 inclines to contact with or approach a corresponding floor surface (FIG. 3B (b)). Alternatively, the mobile terminal 100 may incline so that the bottom end portion of the mobile terminal 100 inclines to contact with or approach the corresponding floor surface (FIG. 3B (c)).

In another instance, referring to FIG. 3C, when the mobile terminal 100 is put on the plane (e.g., a floor surface), the mobile terminal 100 can have a curved shape in a manner that left and right side portions of the mobile terminal 100 are spaced apart from the plane (FIG. 3C (a)). Further, the mobile terminal 100 may incline so that the left side portion of the mobile terminal 100 inclines to contact with or approach a corresponding floor surface (FIG. 3C (b)). Alternatively, the mobile terminal 100 may incline so that the right side end portion of the mobile terminal 100 inclines to contact with or approach the corresponding floor surface (FIG. 3C (c)).

For clarity of the following description, when the mobile terminal 100 is put on a plane, if top and bottom end portions of the mobile terminal 100 are spaced apart from the plane, as shown in FIG. 3B (a), such a configuration shall be named a top-to-bottom curved shape. Further, when the mobile terminal 100 is put on a plane, if left and right side portions of the mobile terminal 100 are spaced apart from the plane, as shown in FIG. 3C (a), such a configuration shall be named a left-to-right curved shape. If the mobile terminal 100 has the top-to-bottom curved shape (FIG. 3B) or the left-to-right curved shape (FIG. 3C), as mentioned in the foregoing description with reference to FIG. 2, a flexible display may be applicable to the mobile terminal 100, by which the mobile terminal 100 is non-limited.

If the mobile terminal 100 has the top-to-bottom curved shape or the left-to-right curved shape, the mobile terminal 100 according to an embodiment of the present invention can receive a user input of inclining one side of the mobile terminal 100. For instance, referring to FIG. 3B (b) and FIG. 3B (c), an action of inclining the mobile terminal 100 in a top or bottom direction can be used as one example of the user input. In another instance, referring to FIG. 3C (b) and FIG. 3C (c), an action of inclining the mobile terminal 100 in a left or right direction can be used as one example of the user input. Based on a sensing signal from the sensing unit 140 (e.g., an acceleration sensor, a gyro sensor, etc.) configured to detect an inclination of the mobile terminal 100, the controller 180 can receive a user input of inclining the mobile terminal in a prescribed direction.

Like the examples shown in FIG. 3B and FIG. 3C, a user input of inclining the mobile terminal 100 in a prescribed direction can be distinguished in accordance with an inclined direction of the mobile terminal 100. In particular, a user input of inclining the mobile terminal 100 in a top direction can be regarded as different from a user input of inclining the mobile terminal 100 in a bottom direction. Besides, the controller 180 can distinguish a user input of inclining the mobile terminal 100 in a prescribed direction based on a location of a pointer that pushes a prescribed side of the mobile terminal 100.

For instance, FIG. 4 is a diagram illustrating one example of distinguishing a user input in response to a location of a display unit touched with a pointer when applying a user input of inclining a mobile terminal. Referring to FIGS. 4 (a) to 4 (c), a user can incline the mobile terminal 100 by pushing a left portion of one side of the display unit 151, a center portion of the corresponding side of the display unit 151, or a right portion of the corresponding side of the display unit 151. Thus, the controller 180 can handle the user input of inclining the mobile terminal 100 by pressing the left, center or right portion of one side of the display unit 151 as a user input of a different type.

Moreover, the controller 180 can distinguish a user input based on whether a user input of inclining a prescribed side of the mobile terminal 100 lasts over a prescribed time. For instance, a case that a prescribed time expires in a state of keeping inclining the mobile terminal 100 toward a prescribed side can be handled different from a case that the inclined mobile terminal 100 returns to a previous state before a lapse of the prescribed time by the controller 180.

For clarity of the description of the embodiments in the following, a user input of inclining a prescribed side of the mobile terminal 100 shall be named 'bounce input'. In particular, in description of the following embodiments, a user input of inclining the mobile terminal 100 toward a prescribed side can be called 'bounce input'. As a bounce input is applied, a direction in which the mobile terminal 100 is inclined shall be named 'bounce input direction'. If a bounce input is applied by touching the display unit 151 with a pointer, a location of the touched display unit 151 shall be named 'bounce input location'. Moreover, a time counted after an inclination of a prescribed side of the mobile terminal 100 shall be named 'bounce input lasting time'.

In FIG. 3A, FIG. 3B and FIG. 4, an action of inclining a top or bottom end portion of the mobile terminal 100 put on a floor is taken as one example of a bounce input. Although the mobile terminal 100 is not put on the floor, a bounce input of inclining the top or bottom end portion of the mobile terminal 100 can be received. For instance, while a user grips the mobile terminal 100 with one hand, if the user inclines the mobile terminal 100 in a prescribed side by pushing the top or bottom end portion of the mobile terminal 100 with the other hand, such an action can be regarded as a bounce input. In another instance, while the mobile terminal 100 is placed at a holder, an action of inclining the mobile terminal 100 in a prescribed side by pushing the top or bottom end portion of the mobile terminal 100 can be regarded as a bounce input. In particular, although the mobile terminal 100 is not put on a plane, any user input of inclining the top or bottom end portion of the mobile terminal 100 can be regarded as included in a bounce input.

In the following embodiments, assume that the mobile terminal 100 according to an embodiment of the present invention includes the display unit 151, the sensing unit 140 and the controller 180 among the components shown in FIGS. 1A to 1C. In addition, assume that the display unit 151 includes a touchscreen. Moreover, in the following drawings, the mobile terminal 100 is configured in the top-to-bottom curved shape like the example shown in FIG. 3A. Besides, the following embodiments are also applicable to the case that the mobile terminal 100 is curved in left-to-right direction like the example shown in FIG. 3B.

In order to prevent an incorrect operation due to an incorrect or unintended input and to protect data saved in the mobile terminal 100, the mobile terminal 100 can enter a locked state. When the mobile terminal 100 is in locked state, the controller can nullify any inputs except such a user input of a preset type as a user input for unlocking the locked mobile terminal 100, a user input for selecting an icon displayed on a lock screen and the like.

A password for unlocking the mobile terminal 100 may be set in the mobile terminal 100. In this instance, the password for unlocking the mobile terminal 100 may be configured with a combination of bounce input(s) applied at least once. For instance, when the mobile terminal 100 is curved in a top-to-bottom direction, if a password is set to a combination of a bounce input of inclining the mobile terminal 100 in a top direction and a bounce input of inclining the mobile terminal 100 in a bottom direction, the controller 180 can be able to confirm whether a combination of bounce inputs, which are consecutively applied plural times, matches the password based on a count of applied bounce inputs (i.e., like the password, whether bounce inputs are consecutively applied twice) and a mobile terminal inclining direction (i.e., like the password, whether the mobile terminal 100 inclines in the bottom direction after inclining in the top direction).

Moreover, the mobile terminal 100 according to an embodiment of the present invention can set up a password in further consideration of such a factor as a location of a bounce input, an applied count of bounce inputs, a lasting time of a bounce input and the like. For instance, if a bounce input of inclining the mobile terminal 100 in a top direction by pushing a left top end portion of the display unit 151 and a bounce input of inclining the mobile terminal 100 in a bottom direction by pushing a right bottom end portion of the display unit 151 are set as a password in order, the controller 180 can be able to confirm whether a combination of bounce inputs consecutively input plural time matches the password based on an applied count of bounce inputs, a direction of the mobile terminal 100 inclined by a bounce input, a touched location of the display unit 151 on occasion of a bounce input and the like. For clarity of the description of the following embodiments, a combination of bounce inputs consecutively applied plural times shall be named 'bounce code'.

Based on the foregoing description, the mobile terminal 100 according to an embodiment of the present invention is described in detail as follows.

Figure 5:
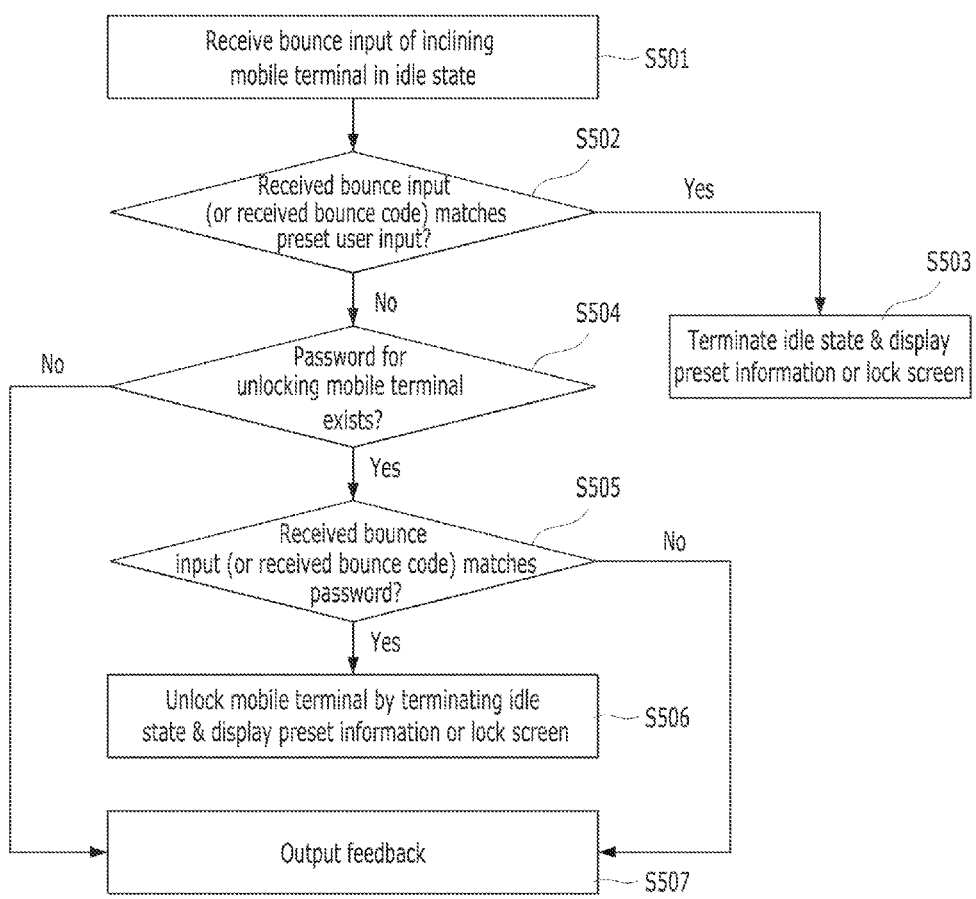
FIG. 5 is a flowchart illustrating an operation of a mobile terminal according to one embodiment of the present invention.

FIG. 5 is a flowchart illustrating an operation of a mobile terminal according to one embodiment of the present invention.

For clarity of the description, assume that the mobile terminal 100 according to an embodiment of the present invention is initially in idle state. In this instance, the idle state may indicate a state that the mobile terminal 100 reduces its power consumption owing to not being currently used by a user despite that its power is turned on. In the idle state, although a power of the mobile terminal 100 is turned on, the display unit may be in power-off state. In this case, the state that the display unit 151 is turned off means a state that an illumination for illuminating the display unit 151 is turned off. In the display unit turned-off state, any information or graphic image is not outputted through the display unit 151. On the other hand, the state that the display unit 151 is turned on (or activated) may mean a state that the illumination for illuminating the display unit 151 is turned on. In the display unit turned-on state, information or graphic image can be outputted under the control of the controller 180. The controller 180 can enter an idle state in one of a case that a user input is not applied to the mobile terminal 100 for a prescribed time, a case that a user input (e.g., a user input of tapping the display unit 151 twice, a bounce input of inclining the mobile terminal 100 in a prescribed direction twice (or at least twice), a user input of pushing a power button, etc.) for triggering an idle mode of the mobile terminal 100 is received, and the like.

As the mobile terminal 100 enters the idle mode, although the display unit 151 is turned off, the sensing unit 140 (e.g., a touch sensor of a layered structure with the display unit, an acceleration sensor, a gyro sensor, etc.) can maintain an enabled state. Hence, despite the mobile terminal 100 is in the idle state, the controller 180 can receive a touch input of touching the display unit 151, a bounce input of inclining the mobile terminal 100 in a prescribed direction, and the like.

Referring to FIG. 5, when the mobile terminal 100 is in idle state, a bounce input (or a bounce code) of inclining the mobile terminal 100 at least once can be received by the mobile terminal 100 (S501). If so, the controller 180 can determine whether the received bounce input (or the received bounce code) matches a preset user input for terminating the idle state of the mobile terminal 100 (S502). If the received bounce input (or the received bounce code) matches the preset user input for terminating the idle state of the mobile terminal 100, the controller 180 terminates the idle state of the mobile terminal 100 and can control the display unit 151 to be turned on (S503).

When the controller 180 turns on the display unit 151, the controller controls a preset information to be displayed through the display unit 151 or can control a lock screen for unlocking the mobile terminal 100 to be displayed through the display unit 151. Depending on a type of the received bounce input (or the received bounce code), the controller 180 terminates the idle state of the mobile terminal 100 and can also determine whether to output the preset information or the lock screen through the display unit 151. For instance, if a bounce input of a first type (or a bounce code of a first type) is received, the controller 180 terminates the idle state of the mobile terminal 100 and can also control the lock screen to be output. In another instance, if a bounce input of a second type (or a bounce code of a second type) is received, the controller 180 terminates the idle state of the mobile terminal 100 and can also control the preset information to be output.

FIG. 6 is a diagram illustrating one example of outputting a lock screen in response to a bounce input. Referring to FIG. 6, as the mobile terminal 100 is in idle state, while the display 151 is in off-state, if a preset bounce code is input (FIG. 6 (a)), the controller 180 can control a lock screen to be displayed by turning on the display unit 151 (FIG. 6 (b), FIG. 6 (c)).

Besides, if a preset bounce code is input, the controller 180 turns on the display unit 151 and can also control an unlocked screen to be directly output in accordance with a setting value. In this instance, a home screen, a running screen of an application, which was last run before the mobile terminal 100 switches to a locked state, or a content (e.g., photo, video, webpage, document, etc.), which was last output before the mobile terminal 100 switches to the locked state, may be output through the display unit 151.

For clarity, according to the example shown in FIG. 6 (a), the user input for terminating the idle state of the mobile terminal 100 includes an action of inclining a top end portion of the mobile terminal 100 twice, by which the present invention is non-limited. While the lock screen is output, if a user input for unlocking the mobile terminal is received, the controller 180 can unlock the mobile terminal 100. In this instance, the user input for unlocking the mobile terminal 100 may include a touch input of sliding on the display unit 151 depending on whether a password of the mobile terminal 100 is set, an input of a password, or the like. FIG. 6 (b) shows one example of a lock screen when a password is not set. FIG. 6 (c) shows one example of a lock screen when a password is set.

If the user input for unlocking the mobile terminal 100 is received, the controller 180 can unlock the mobile terminal 100. If the mobile terminal 100 is unlocked, the controller can output a home screen, a running screen of an application, which was last run before the mobile terminal 100 switches to a locked state, a content, which was last output before the mobile terminal 100 switches to the locked state, or the like.

In another instance, the controller 180 unlocks the mobile terminal 100 and can also run a pre-designated application. Hence, a running screen of the pre-designated application can be output through the display unit 151.

A plurality of passwords can be set for the mobile terminal 100 according to an embodiment of the present invention to be used to unlock the mobile terminal 100. In this instance, in accordance with a password input to unlock the mobile terminal 100, the controller 180 unlocks the mobile terminal 100 and can also determine whether to output a home screen or a screen (e.g., a running screen of a last run application, a last output content, etc.), which was last output before the mobile terminal 100 switches to an idle state, or whether to run a pre-designated application.

Figure 7:
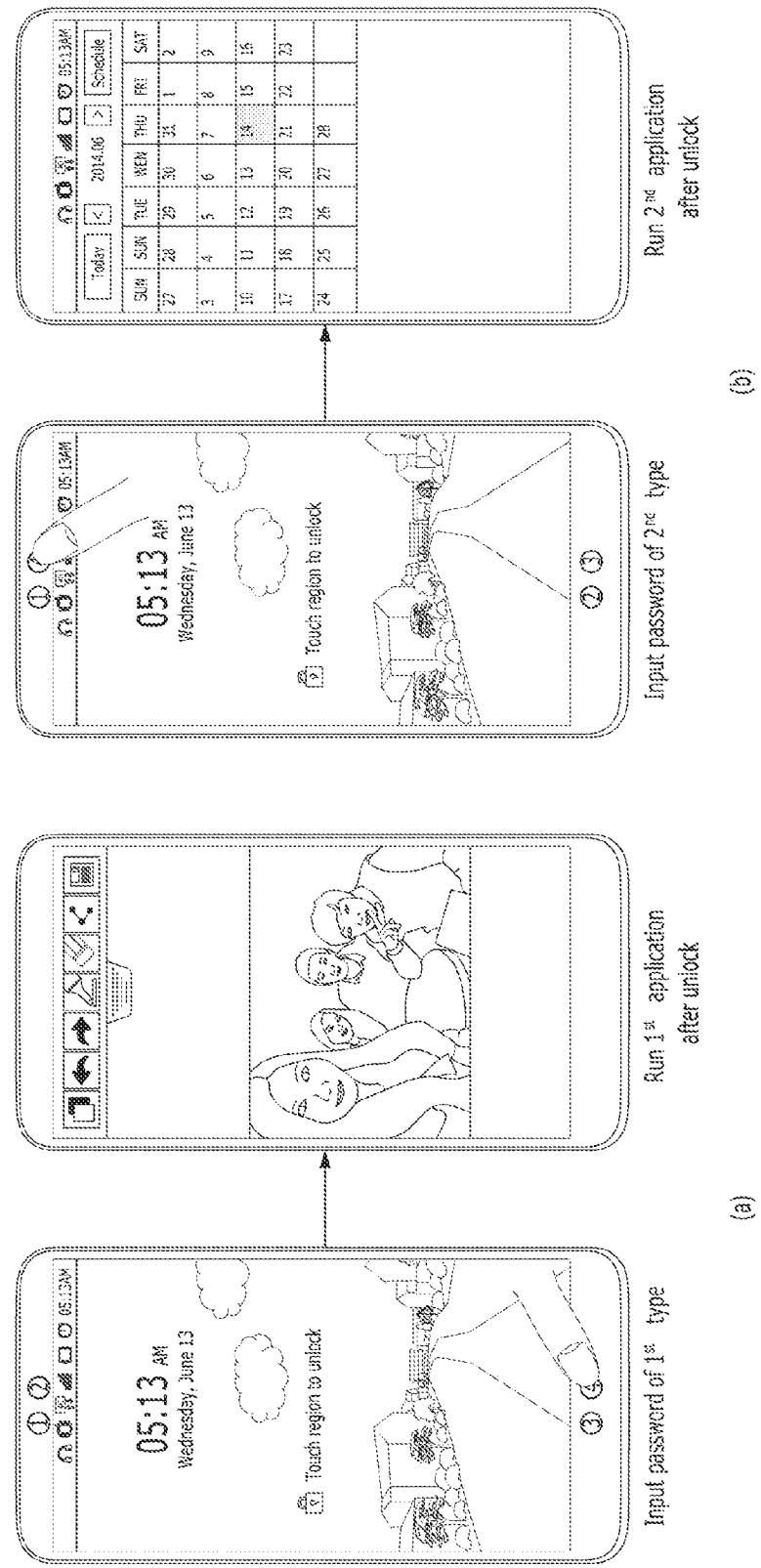
FIG. 7 is a diagram illustrating one example of varying an information output after unlocking a mobile terminal in accordance with an input password.

For instance, FIG. 7 is a diagram illustrating one example of varying an information output after unlocking the mobile terminal 100 in accordance with an input password. Referring to FIG. 7 (a), if a password of a first combination for unlocking the mobile terminal 100 is input, the controller 180 unlocks the mobile terminal 100 and can then control a home screen or a screen, which was last output before the mobile terminal 100 enters an idle state, to be output. In this instance, the home screen is a sort of a home page provided as default by the mobile terminal 100. Application icons, widgets and the like can be deployed on the home screen. After the mobile terminal 100 has been turned on, if the mobile terminal 100 is unlocked, the home screen can be output. Moreover, if a home button is pushed, the home screen can be output as well.

Further, referring to FIG. 7 (b), if a password of a second combination for unlocking the mobile terminal 100 is input, the controller 180 unlocks the mobile terminal 100, runs a preset application, and then controls a running screen of the preset application to be output through the display unit 151.

While the mobile terminal 100 is in the idle state, if the received bounce input (or the received bounce code) fails to match the preset user input for terminating the idle state of the mobile terminal 100 (S502) and a password for unlocking the mobile terminal 100 is set already (S504), the controller 180 can determine whether the received bounce input (or the received bounce code) matches the password for unlocking the mobile terminal 100 (S505). If the received bounce input (or the received bounce code) matches the password for unlocking the mobile terminal 100, the controller 180 releases the mobile terminal 100 from the idle state and controls the mobile terminal 100 to be unlocked (S506).

As the idle state of the mobile terminal 100 is terminated, if the mobile terminal 100 is unlocked, as mentioned in the foregoing description with reference to FIG. 7, the controller 180 controls a home screen to be displayed or can control a running screen of a preset application to be output. In particular, depending on a type of a password input in the off-state of the display unit 151, the controller 180 unlocks the mobile terminal 100 and can also determine whether to output a home screen or a screen (e.g., a running screen of a last run application, a last output content, etc.), which was last output before the mobile terminal 100 enters the idle state, or whether to run a pre-designated application.

If the received bounce input does not match the preset password (S505), the controller 180 can control a feedback, which indicates that the received bounce input does not match the preset password, to be output (S507). In this instance, the feedback may include one of a vibration output, a sound output, an output of light through LED and the like.

If the password is not set for the mobile terminal 100 (S504) and the received bounce input (or the received bounce code) fails to match the preset user input for terminating the idle state (S502), the controller 180 regards the received bounce input as a user's incorrect or unintended input and may not perform any operations. Alternatively, if the password is not set for the mobile terminal 100 (S504) and the received bounce input (or the received bounce code) fails to match the preset user input for terminating the idle state (S502), the controller 180 can output a feedback indicating that the received bounce input fails to match the preset user input (S507). In this instance, as mentioned in the foregoing description, the feedback may include one of a vibration, a sound, a light and the like.

According to the example shown in FIG. 6, if a preset user input is received, an idle state of the mobile terminal 100 is terminated and a lock screen is output through the display unit 151. In another instance, if a preset user input is received, the controller 180 terminates an idle state of the mobile terminal 100 and also controls a preset information to be output through the display unit 151. In this instance, the preset information may include at least one of a time information indicating a current hour, a weekday information indicating a date and a weekday, a weather information indicating today's weather, a notification information indicating an event newly occurred in the mobile terminal 100, a music player for controlling a music play, a memo, and the like.

In outputting a preset information through a display unit, the controller 180 may control a region, to which a preset information is outputted, in a whole region of the display unit 151 to maintain an on-state and may control a remaining region to maintain an off-state. Thus, if a portion of the display unit 151 is in the off-state and the rest is in the on-state, such a state may be named a semi activated state. By controlling the display unit 151 to maintain the off-state in a remaining region after outputting the preset information, it is able to reduce the power consumption of the mobile terminal 100.

For another instance, the controller 180 turns on a whole region of the display unit 151 but may control a region, which remains after outputting the preset information, to be processed into a blank. In this case, the blank processing may include a process for representing a corresponding region as single color such as black, white, or the like.

One example of outputting a preset information in accordance with a termination of an idle state of the mobile terminal 100 is described in detail with reference to the accompanying drawings as follows. First of all, according to the following embodiments, a user input for terminating an idle state of the mobile terminal 100 may include one of a bounce input of inclining the mobile terminal 100 in a top direction, a bounce input of inclining the mobile terminal 100 in a bottom direction, a bounce code of applying at least two bounce inputs consecutively, and the like. Yet, the bounce inputs and codes exemplarily shown in the corresponding drawings for the following description are provided for clarity of the description only, by which the present invention is non-limited. In particular, although a prescribed bounce input (or a prescribed bounce code) differing from the bounce input (or the bounce code) in type according to the following drawings is received, the following embodiments described with reference to the accompanying drawings are applicable thereto.

As mentioned in the foregoing description with reference to FIG. 3A, FIG. 3B and FIG. 4, a bounce input can have one of various configurations or types depending on a bounce input direction, a bounce input location, a bounce input lasting time and the like. Hence, although one of the following drawings shows that a specific function is executed through a bounce input of inclining a top end portion of the mobile terminal 100, the specific function can be executed by a bounce input of a different type or a bounce input combination of a different type. In this instance, the bounce input of the different type may include one of a bounce input of inclining a bottom end portion of the mobile terminal 100, a bounce input of inclining in a prescribed direction while pushing a specific location of the display unit 151, a bounce input lasting for prescribed duration while inclining the mobile terminal 100 in a prescribed direction, and the like. In addition, the bounce input combination of the different type may include one of a combination of a plurality of bounce inputs and the like.

Moreover, although one of the following drawings shows that a specific function is executed by a bounce code of inclining the top end portion of the mobile terminal 100 twice, the specific function may be executed by a bounce input of a different type or a bounce code of a different type such as a single bounce input, a bounce code corresponding to a combination of bounce inputs applied 3 times at least, a bounce code of inclining the bottom end portion of the mobile terminal 100 twice, a bounce code corresponding to a combination of a bounce input of inclining the top end portion of the mobile terminal 100 by pushing a right side (or a left side) of the top end portion of the display unit 151 and a bounce input of inclining the bottom end portion of the mobile terminal 100 by pushing a left side (or a right side) of the bottom end portion of the display unit 151, and the like.

FIG. 8A and FIG. 8B are diagrams illustrating examples of outputting a preset information on terminating an idle state of the mobile terminal 100. Referring to FIG. 8A, if a preset bounce code (or a preset bounce input) is received (FIG. 8A (a)), the controller 180 can control a basic information such as a daily information (e.g., a time information 802, a date 804, a weather 806, etc.) to be output. If a user input is not received despite a lapse of a prescribed time since the output of the basic information, the controller 180 can control the mobile terminal 100 to enter an idle state again. If the mobile terminal 100 enters the idle state, the display unit 151 may enter an off-state again (FIG. 8A (c)).

As the preset bounce code is received, when it is intended to terminate the idle state of the mobile terminal 100, if a newly occurred event exists in the mobile terminal 100, referring to FIG. 8B (b), the controller 180 terminates the idle state of the mobile terminal 100 and can also control a notification information, which indicates that the event has been occurred, to be output through the display unit 151. In this instance, the event may include one of a repletion of a message (e.g., an instant message, a text message, etc.), a reception of an email, an occurrence of a missed call, a reception of a push message through an application, and the like. Moreover, the newly occurred event may mean an event of which details are not checked by a user yet.

In order to notify the existence of the newly occurred event, the controller 180 can control a feedback to be output together with the notification information. In this instance, as mentioned in the foregoing description, the feedback may include one of a vibration output, a sound output, an output of light through LED and the like. When a plurality of events have occurred, the controller 180 can control a plurality of notification information to be output in order of occurred events or in accordance with attributes (or types) of events.

Referring to FIG. 8B (b), the controller 180 can control both a basic information (e.g., a time information, a daily information, etc.) and a notification information to be simultaneously output. Alternatively, the controller 180 can control the notification information to be independently output.

Referring to FIG. 8B (b), the notification information can include at least one of an icon 812 (e.g., an icon for identifying that a occurred event is a text message, an icon indicating that a occurred event is an instant message, etc.) for identifying an attribute of an event, an information 814 (e.g., a name of a character having sent a message, a counterpart's phone number of a missed incoming call, etc.) of a counterpart having occurred an event, a content 816 of an event (e.g., a content of a message, etc.) and the like.

If a user input is not received despite a lapse of a prescribed time since the out of the notification, the controller 180 can control the mobile terminal 100 to enter the idle state again. If the mobile terminal 100 enters the idle state again, referring to FIG. 8B (c), the display unit 151 may enter the off-state again.

According to the examples shown in FIG. 8A and FIG. 8B, whether to display a notification is determined depending on whether a newly occurred event exists in the mobile terminal 100. In another example, if a preset user input is received, the controller 180 outputs a basic information in the first place. Thereafter, while the basic information is displayed, the controller 180 can control a notification information not to be output until a bounce input is received.

For instance, FIG. 9 is a diagram illustrating one example of sequentially displaying a basic information and a notification information. Referring to FIG. 9, while the mobile terminal 100 is in idle state, if a preset bounce code (or a preset bounce input) is received (FIG. 9A (a)), the controller 180 terminates the idle state of the mobile terminal 100 and can also control a basic information 910 such as a daily information (e.g., time, date, weather, etc.) to be output (FIG. 9 (b)).

Further, if a newly occurred event exists in the mobile terminal 100, the controller 180 outputs the basic information 910 and can also control a feedback, which indicates the existence of the newly occurred event, to be output. In this instance, as mentioned in the foregoing description, the feedback may include one of a vibration output, a sound output, an output of light through LED and the like.

While the basic information 910 is output, if a bounce input of inclining the mobile terminal 100 is received, referring to FIG. 9 (*c*), the controller 180 can control a notification information 920 to be displayed. Once the bounce input is received, the controller 180 can output the feedback depending on whether the newly occurred event exists in the mobile terminal 100 prior to terminating the idle state of the mobile terminal 100. After the feedback has been output, if a bounce input is subsequently received within a prescribed time, the controller 180 can control the notification information 920 to be output.

For instance, FIG. 10 is a diagram illustrating one example of outputting a notification information after outputting a feedback. Referring to FIG. 10 (*a*), while the mobile terminal 100 is in idle state, if a preset bounce code (or a preset bounce input) is received), the controller 180 can determine whether to output a feedback depending on whether a newly occurred event exists in the mobile terminal 100. If the newly occurred event exists in the mobile terminal 100, referring to FIG. 10 (*b*), the controller 180 maintains the idle state and can also control the feedback to be output.

After the feedback has been output, if a bounce input of a first type is received within a prescribed time, referring to FIG. 10 (*c*), the controller 180 omits an output of a notification information and can also control the idle state of the mobile terminal 100 to be terminated. Further, after the feedback has been output, if a bounce input of a second type is received within a prescribed time, referring to FIG. 10 (*d*), the controller 180 terminates the idle state of the mobile terminal 100 and can also control a notification information 1010 to be output.

According to the embodiment described with reference to FIG. 10, whether an event exists is checked in response to a preset bounce code (or a preset bounce input) in idle state. In addition, the idle state of the mobile terminal 100 is terminated by an additionally applied bounce input. If a password is set for the mobile terminal 100, after a preset bounce code (or a preset bounce input) for checking a presence or non-presence of an event has been received, only if an additionally input bounce code matches the password, the idle state of the mobile terminal 100 can be terminated.

According to the descriptions with reference to FIGS. 8 to 10, if a newly occurred event exists in the mobile terminal 100, the controller 180 can output a feedback. According to the examples shown in the corresponding drawings, the controller 180 can determine whether to output a feedback or adjust an output type of the feedback in accordance with an attribute of the event or an attribute of a counterpart having occurred the event. In this instance, the feedback can have one of various output types based on an output count, an output length, an output color (when generating light through LED) and the like.

For instance, when a message reception or a missed call has occurred by a counterpart failing to be registered at a phonebook, the controller 180 skips an output of a feedback. On the contrary, when a message reception or a missed call has occurred by a counterpart registered at a phonebook, the controller 180 can control a feedback to be output. Moreover, when such an event as a message reception, a missed call and the like has occurred, the controller 180 output vibrations n times, where n is a natural number. When a message reception of a missed call has occurred by a counterpart registered at Favorites, the controller 180 can output vibrations m times, where m is a natural number different from n). In another instance, the controller 180 can control a feedback to be output only for an event occurred by a specific counterpart or a specific application. While a notification information is output, if a bounce input is received, the controller 180 can control details of an event to be output in response to the bounce input.

FIG. 11A and FIG. 11B are diagrams illustrating examples of outputting details of an event in response to a bounce input. Referring to FIG. 11A (*a*), while a notification information 1110 is displayed through the display unit 151, if a bounce input is received, the controller 180 can control details of an event, which is indicated by the notification information 1110, to be output. For instance, FIG. 11A (*b*) and FIG. 11A (*c*) show examples of outputting details of a received text message.

In order to check the details of the event, the controller 180 can run an application for checking the details of the event. For instance, the controller 180 can run a text message application in response to a text message reception. In another instance, the controller 180 can run a messenger application in response to an instant message reception. According to the example shown in FIG. 11A (*b*), as the text message application is run, a user interface (e.g., a keypad for inputting a reply content, an input window for displaying a content input through the keypad, etc.) for composing a reply to a counterpart having sent the text message is output together with the details of the received text message.

In another instance, instead of running the application for checking the details of the event, the controller 180 can control a preview window 1120, which is provided to check the details of the event, to be output. According to the example shown in FIG. 11A (*c*), the preview window 1120 including the details of the received text message is output.

Further, the controller 180 can output the preview window 1120 while the bounce input is maintained only. In particular, while the mobile terminal 100 maintains a state of inclining in a prescribed direction, the controller 180 outputs the preview window 1120. As a pointer pushing the mobile terminal 100 is detached from the mobile terminal 100, if the mobile terminal 100 enters a horizontal state, the controller 180 can stop displaying the preview window 1120.

When a plurality of events exist, the controller 180 can control details of an event, which is indicated by a prescribed notification information included in a notification information list, to be output in response to a bounce input. Further, the controller 180 can control details of an event, which has occurred most recently or last, to be output in order of event triggering. If the notification information list is sorted in the event occurred order, the controller 180 can output details of an event indicated by a notification information located at a top or bottom place of the notification information list. For instance, according to the example shown in FIG. 11A (*c*), in response to a bounce input received in the course of outputting a notification information list including text message receptions and instant message receptions, details of a text message located at the top place of the notification information list are output.

Referring to FIG. 11B (*a*), while details of a prescribed notification information included in the notification information list are displayed, if a bounce input is applied, the controller 180 can display details of a next event. For instance, referring to FIG. 11B (*b*), while details of the text message are output, if a bounce input is applied, the controller 180 can control details of a next event to be output. According to the example shown in FIG. 11B (*c*), in order to output details of an instant message, a chat window for a chat with a counterpart having sent the instant message is output.

If a bounce input is received, the controller 180 can delete each item on the notification information list. Through this, a user can delete a notification information, which is unnecessary to be checked, from the notification information list or may be able to set a notification information that is to be located at a top place on the notification information list. By adjusting a notification information supposed to be located at a top place of an event list, like the examples shown in FIG. 11A and FIG. 11B, it may be able to determine an event, of which details are intended to be checked, through a bounce input.

FIG. 12 is a diagram illustrating one example of deleting the respective items on an notification information list sequentially. Referring to FIG. 12, while a notification information list is displayed, if a bounce input is received, the controller 180 can delete a prescribed notification information from a notification information list. For instance, while a notification information list 1210 including 3 notification information 1212, 1214 and 1216 is displayed, if a bounce input of including the mobile terminal 100 in a prescribed direction is received (FIG. 12 (*a*)), the controller 180 can delete a prescribed event 1216 from the notification information list (FIG. 12 (*b*)).

Referring to FIG. 12 (*c*) and FIG. 12 (*d*), each time a bounce input of inclining the mobile terminal 100 in a prescribed direction is received, the controller 180 can delete the event 1214/1212 from the notification information list.

Further, the controller 180 can delete the notification information in order of an earlier time among occurred times of a plurality of events or in order of a later time among the occurred times of a plurality of the events. If the notification information list is sorted in order of an event occurred time, an item located at a top or bottom place of the notification information list can be deleted in response to the bounce input. According to the example shown in FIGS. 12 (*b*) to 12 (*d*), the item located at the bottom place of the notification information list is deleted in response to the bounce input.

The controller 180 can delete all notification information in response to a bounce input. If a user does not desire to check a newly occurred event in the mobile terminal 100 or desires to keep a notification information list in vacant state, the user can delete all notification information by applying a bounce input. For instance, FIG. 13 is a diagram illustrating one example of deleting all notification information in response to a bounce input. As mentioned in the foregoing description with reference to FIG. 10, while the mobile terminal 100 is in idle state, if a bounce input is received, a feedback can be output as a vibration, a sound or an LED light depending on whether a newly occurred event exists.

If a bounce input of a first type is received within a prescribed time since an output of a feedback, referring to FIG. 13 (*a*), the controller 180 can control a notification information 1310 to be output. Further, if a bounce input of a second type is received within a prescribed time since an output of a feedback, the controller 180 can delete all notification information. In response to the bounce input of the second type, like the example shown in FIG. 13 (*b*), the controller 180 deletes all notification information and can also control the mobile terminal 100 to be released from the idle state. According to the example shown in FIG. 13 (*b*), as the mobile terminal 100 is released from the idle state, such a basic information as a time information, a daily information and the like is output.

According to the example shown in FIG. 13 (*a*) and FIG. 13 (*b*), for clarity, the bounce input of the first type is an input of declining a bottom end portion of the mobile terminal 100 and the bounce input of the second type is an input of declining a top end portion of the mobile terminal 100, by which the present invention is non-limited. In particular, the embodiment described with reference to FIG. 13 is applicable using a bounce input of a prescribed type different from that of the bounce input of the first or second type.

In response to a received bounce input, the controller 180 can interrupt or resume an output of a notification information. This is described in detail with reference to FIG. 14 as follows. For instance, FIG. 14 is a diagram illustrating one example of interrupting or resuming an output of a notification information list.

Referring to FIG. 14, While a basic information 1410 such as a time information, a daily information and the like and a notification information 1420 are simultaneously output, if a bounce input is received (FIG. 14 (*a*)), the controller 180 can interrupt the output of the notification information (FIG. 14 (*b*)).

While the output of the notification information 1420 is interrupted, if a bounce input is received again, like the example shown in FIG. 14 (*c*), the controller 180 can resume the output of the notification information 1420. According to the example shown in FIG. 14, for clarity, a bounce input for interrupting or resuming an output of a notification information is an action of inclining a top end portion of the mobile terminal 100. Alternatively, the output of the notification information can be interrupted or resumed by a bounce input of a type different from that of the former bounce input shown in the drawing.

In response to a bounce input, the controller 180 can control a result from converting a notification information to an audio to be output. In particular, if a bounce input is received, the controller 180 converts details of an event indicated by a notification information by TTS (text to speech) conversion and can then control a sound data, which corresponds to a result of the conversion, to be output through the audio output unit.

FIG. 15A and FIG. 15B are diagrams illustrating examples of outputting sound data generated from converting notification information to audio. Referring to FIG. 15A, while the mobile terminal 100 is in idle state, if a bounce input is received, the controller 180 can control sound data, which is generated from TTS converting details of an event indicated by a notification information, to be output. Further, while the sound data is output, like the example shown in FIG. 15A (*b*), the controller 180 can control the idle state of the mobile terminal 100 to be maintained.

In another instance, in response to a bounce input received after the mobile terminal 100 has been released from the idle state, the controller 180 can control a sound data, which is generated from TTS converting details of an event indicated by a notification information, to be output. For example, while an event information is displayed, if a bounce input is received (FIG. 15B (*a*)), the controller 180 can control a sound data, which is generated from TTS converting details of an event indicated by a notification information, to be output (FIG. 15B (*b*)). Once the sound data generated from TTS converting the details of the event is output (i.e., a case that an output of the sound data is completed), like the example shown in FIG. 15B (*b*), the controller 180 can control the notification information of the corresponding event to be deleted.

When a plurality of newly occurred events exist in the mobile terminal 100, the controller 180 can control a sound data of a prescribed one of a plurality of the events to be output. For instance, the controller 180 can control a sound data of an event, of which occurred order is earliest or latest among a plurality of the events, to be output. If an output of a sound data of a prescribed event is completed, the controller 180 can control a sound data of a next or previous event to be output. Further, while a sound data of a prescribed event is output, if a bounce input of inclining the mobile terminal 100 in a prescribed direction is received, the controller 180 can control a sound data of a next or previous event to be output in response to the bounce input.

Further, one of a bounce input of inclining a top end portion of the mobile terminal 100 and a bounce input of inclining a bottom end portion of the mobile terminal 100 may be a user input for outputting a sound data of an event in next order and the other may be a user input for outputting a sound data of an event in previous order.

For instance, while a sound data of a prescribed event is output, if a bounce input of inclining the top end portion of the mobile terminal 100 is received, the controller 180 can control a sound data of an event in next order to be output. On the contrary, if a bounce input of inclining the bottom end portion of the mobile terminal 100 is received, the controller 180 can control a sound data of an event in previous order to be output.

According to the examples shown in FIG. 15A and FIG. 15B, for clarity, a user input for outputting a sound data generated from TTS converting details of an event is a bounce input of inclining a top end portion of the mobile terminal 100, by which the present invention is non-limited. In addition, a sound data generated from TTS converting events of an event can be output by a bounce input of a type different from that of the former bounce input shown in the drawings.

As mentioned in the foregoing description with reference to FIGS. 8 to 15, if a bounce input is applied, the controller 180 terminates an idle state of the mobile terminal 100 and can also display a time information, a daily information, a notification information and the like. Further, the controller 180 can adjust a display direction of each information to output in response to a direction of the bounce input while terminating the idle state.

For instance, FIG. 16 is a diagram illustrating one example of adjusting a display direction of information, which is output on terminating an idle state, in response to a direction of a bounce input. Referring to FIG. 16 (*a*), if a bounce input is applied to a bottom end portion of the mobile terminal 100 twice (i.e., the mobile terminal 100 is inclined by the bounce input so that the bottom end portion of the mobile terminal 100 can get closer to a floor), the controller 180 can set a display direction of information in order for a bottom part of a letter to face the bottom end portion of the mobile terminal 100.

Further, referring to FIG. 16 (*b*), if a bounce input is applied to a top end portion of the mobile terminal 100 twice (i.e., the mobile terminal 100 is inclined by the bounce input so that the top end portion of the mobile terminal 100 can get closer to a floor), the controller 180 can set a display direction of information in order for a bottom part of a letter to face the top end portion of the mobile terminal 100.

In particular, when a bottom end portion of the mobile terminal is inclined by a bounce input (or a bounce code), the controller 180 controls information to be displayed in a forward direction. When a top end portion of the mobile terminal is inclined by a bounce input (or a bounce code), the controller 180 can control the information to be displayed in a reverse direction (i.e., the information are rotated by 180 degrees).

While a notification is output, if a bounce input is received, details of an event indicated by the notification information can be displayed. Further, the controller 180 can adjust a display direction of the details of the event in response to a direction of the bounce input.

For instance, FIG. 17 is a diagram illustrating one example of adjusting a direction for displaying details of an event. Referring to FIG. 17 (*a*), while a notification information 1710 is output, if a bounce input is applied to a bottom end portion of the mobile terminal 100, the controller 180 can display details of an event indicated by the notification information 1710 in a manner that a bottom part of a letter can face the bottom end portion of the mobile terminal 100.

Further, referring to FIG. 17 (*b*), while a notification information 1710 is output, if a bounce input is applied to a top end portion of the mobile terminal 100, the controller 180 can display details of an event indicated by the notification information 1710 in a manner that a bottom part of a letter can face the top end portion of the mobile terminal 100.

According to the examples shown in FIG. 16 and FIG. 17, if a bounce input of pushing a bottom end portion of the mobile terminal 100 is applied, information are displayed in a forward direction. If a bounce input of pushing a top end portion of the mobile terminal 100 is applied, information is displayed in a reverse direction. Unlike the examples shown in the drawings, if a bounce input of pushing a top end portion of the mobile terminal 100 is applied, information can be displayed in a forward direction. If a bounce input of pushing a bottom end portion of the mobile terminal 100 is applied, information can be displayed in a reverse direction.

For clarity, according to the example shown in FIG. 16, a user input for terminating an idle state of the mobile terminal 100 includes an action of applying a bounce input of inclining a bottom or top end portion of the mobile terminal 100 twice, by which the present invention is non-limited. For clarity, according to the example shown in FIG. 17, a user input for outputting details of an event includes an action of applying a bounce input of inclining a top or bottom end portion of the mobile terminal 100, by which the present invention is non-limited. In addition, an idle state of the mobile terminal 100 can be terminated by a prescribed bounce input of a type different from that of the former bounce input shown in the drawing. Moreover, details of an event can be output by a prescribed bounce input of a type different from that of the former bounce input shown in the drawing.

The controller 180 can adjust an output mode of the display unit 151 based on a bounce input. In this instance, the output mode of the display unit 151 may include a portrait mode and a landscape mode.

FIG. 18 is a diagram illustrating one example of adjusting an output mode of the display unit 151 based on a bounce input. Referring to FIG. 18 (*a*), if the display unit 151 operates in portrait mode, the controller 180 can control information to be displayed by being aligned with reference to a bottom end portion (or a top end portion) of the display unit 151 (i.e., arranging the information in a manner that a bottom part of a letter faces the bottom or top end portion of the mobile terminal 100).

If a preset bounce input (or a preset bounce code) is received, referring to FIG. 18 (*b*), the controller 180 can control an output mode of the display unit 151 to be switched to a landscape mode. If the output mode of the display unit 151 is switched to the landscape mode, like the example shown in FIG. 18 (*b*), the controller 180 can control information to be displayed by being aligned with reference to a left side (or a right side) of the display unit 151 (i.e., arranging the information in a manner that a bottom part of a letter faces the left or right side of the mobile terminal 100).

Besides, while the display unit 151 operates in the landscape mode, if a preset bounce input (or a preset bounce code) is received, the controller 180 can control the output mode of the display unit 151 to be switched to a portrait mode.

For clarity, according the example shown in FIG. 18, a user input for switching an output mode of the display unit 151 to a landscape mode from a portrait mode is a bounce input applied by inclining the mobile terminal 100 in a top direction once and then including the mobile terminal 100 in a bottom direction once. In addition, the output mode of the display unit 151 can be switched to the landscape mode from the portrait mode by a prescribed bounce input of a type different from that of the former bounce input shown in the drawing.

While the mobile terminal 100 is in idle state, if a preset bounce input (or a preset bounce code) is received, the controller 180 releases the mobile terminal 100 from the idle state and can also run a preset application. In this instance, the preset application may include one of an application most recently run by a user, an application most frequently used by a user and an application selected in advance by a user.

Figure 19:
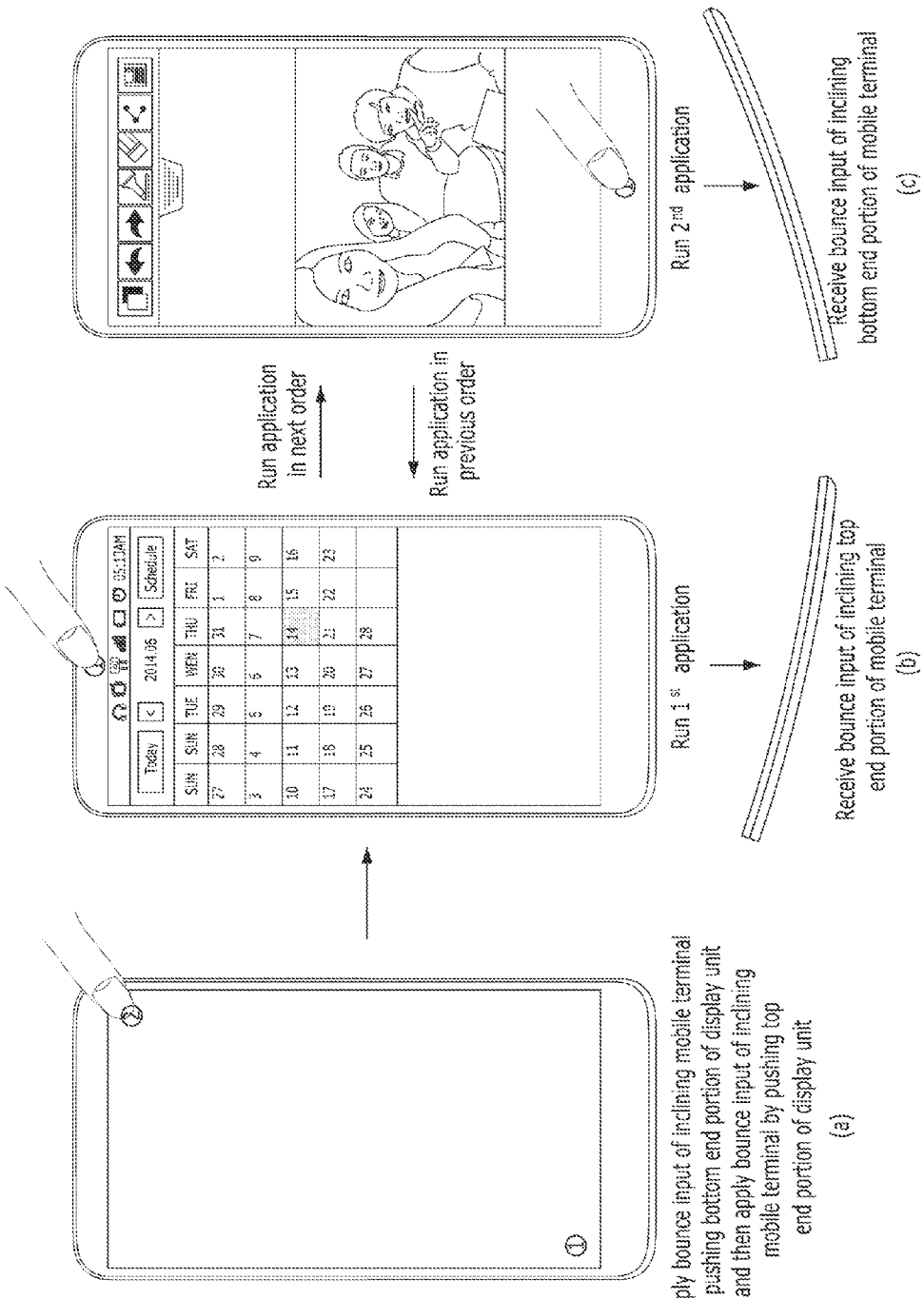
FIG. 19 is a diagram illustrating one example of running a preset application in response to a bounce input.

For instance, FIG. 19 is diagram illustrating examples of running a preset application in response to a bounce input. While the mobile terminal 100 is in idle state, if a preset bounce input (or a preset bounce code) is received, as shown in the drawing, the controller 180 terminates the idle state and can also run a preset application. Hence, like the example shown in FIG. 19 (*b*), a running screen of the preset application can be output through the display unit 151.

While the preset application is running, if a bounce input is received, the controller 180 can control an application in next or previous order to be run in response to the received bounce input. For instance, if a user sets a plurality of applications as applications supposed to be run in response to a bounce input or a plurality of applications are recorded in a running list of recently run applications, the controller 180 can control an application in next or previous order to be run in response to the received bounce input. In this instance, the application run order may include an order designated by a user or an order run by the mobile terminal 100.

In this instance, one of a bounce input of inclining a top end portion of the mobile terminal 100 and a bounce input of inclining a bottom end portion of the mobile terminal 100 may be a user input for running an application in next order, while the other is a user input for running an application in previous order.

For instance, if the bounce input of inclining the top end portion of the mobile terminal 100 is received (FIG. 19 (*b*)), the controller 180 can control the application in next order to be run (FIG. 19 (*c*)). Further, if the bounce input of inclining the bottom end portion of the mobile terminal 100 is received (FIG. 19 (*c*)), the controller 180 can control the application in previous order to be run (FIG. 19 (*b*)).

Assuming that a most recently run application is set to be run in response to a bounce input, if any applications are not run after turning on the mobile terminal 100 or a user deletes an application run history, it may be unable to discover the most recently run application despite that a bounce input is applied. Thus, although the bounce input for running the most recently run application is applied, if it is unable to discover the most recently run application, the controller 180 controls an idle state of the mobile terminal 100 to be maintained and can also output a feedback indicating that no applications will be run.

Depending on a type of a bounce input, the controller 180 terminates an idle state of the mobile terminal 100 and can then adjust an application to run. For instance, if a bounce input of inclining a top end portion of the mobile terminal 100 once and a bounce input of inclining a bottom end portion of the mobile terminal 100 once are sequentially received, the controller 180 terminates an idle state of the mobile terminal 100 and can then run a first application. In another instance, if a bounce input of inclining a bottom end portion of the mobile terminal 100 once and a bounce input of inclining a top end portion of the mobile terminal 100 once are sequentially received, the controller 180 terminates an idle state of the mobile terminal 100 and can then run a second application.

Although a bounce input for running a preset application is applied, if a password for unlocking the mobile terminal 100 is set already, the controller 180 can control a lock screen, which is provided to unlock the mobile terminal 100, to be output before running the preset application.

For instance, FIG. 20 is a diagram illustrating one example of outputting a lock screen before running a preset application. Referring to FIG. 20 (*a*), while the mobile terminal 100 is in idle state, a preset bounce input (or a preset bounce code) for running a preset application can be received. In this instance, if a password for unlocking the mobile terminal 100 is set already, referring to FIG. 20 (*b*), the controller 180 can control a lock screen, which is provided to unlock the mobile terminal 100, to be output before running the preset application.

Thereafter, if the password for unlocking the mobile terminal 100 is input, the controller 180 unlocks the mobile terminal 100 and can run the preset application. If so, referring to FIG. 20 (*c*), a running screen of the preset application can be displayed through the display unit 151.

While the mobile terminal 100 is in idle state, if a bounce input is received, the controller 180 can control an audio setting information or a battery status information of the mobile terminal 100 to be output in response to the received bounce input. In this instance, the audio setting information indicates whether a mode of the mobile terminal 100 is set to an audio output mode or a vibration mode. In addition, the battery status information can indicate whether a remaining level of a battery is equal to or lower than a preset level.

For instance, FIG. 21A and FIG. 21B are diagrams illustrating examples of outputting an audio setting information of the mobile terminal 100 in response to a bounce input. While the mobile terminal 100 is in idle state, if a preset bounce input (or a preset bounce code) is received, the controller 180 can output vibration and/or sound data in accordance with an audio setting state of the mobile terminal 100. For instance, if a mode of the mobile terminal 100 is set to a vibration mode, like the example shown in FIG. 21A (*a*), the controller 180 can control a vibration to be output in response to the bounce input. In another instance, if a mode of the mobile terminal 100 is set to an audio output mode, like the example shown in FIG. 21A (*b*), the controller 180 can control sound data to be output in response to the bounce input.

The controller 180 can change an audio setting of the mobile terminal 100 in response to a bounce input. For instance, while the mobile terminal 100 is in vibration mode, if a preset bounce input (or a preset bounce code) is received, the controller 180 can control a mode of the mobile terminal 100 to be changed into an audio output mode (FIG. 21B (a)). Further, the controller 180 can control sound data to be output through the mobile terminal 100 while changing the mode of the mobile terminal 100 into the audio output mode. In another instance, while the mobile terminal 100 is in audio output mode, if a preset bounce input (or a preset bounce code) is received, the controller 180 can control a mode of the mobile terminal 100 to be changed into a vibration mode (FIG. 21B (b)). Further, the controller 180 can control a vibration to be output through the mobile terminal 100 while changing the mode of the mobile terminal 100 into the vibration mode.

According to the examples shown in FIG. 21A and FIG. 21B, a user input for checking an audio setting of the mobile terminal 100 includes a bounce input of inclining a top end portion of the mobile terminal 100 and a user input for changing an audio setting of the mobile terminal 100 includes a bounce input of inclining a bottom end portion of the mobile terminal 100, by which the present invention is non-limited. In addition, the embodiment described with reference to FIG. 21A and FIG. 21B is applicable by a prescribed bounce input of a type different from that of the former bounce input shown in the drawing.

Figure 22B:
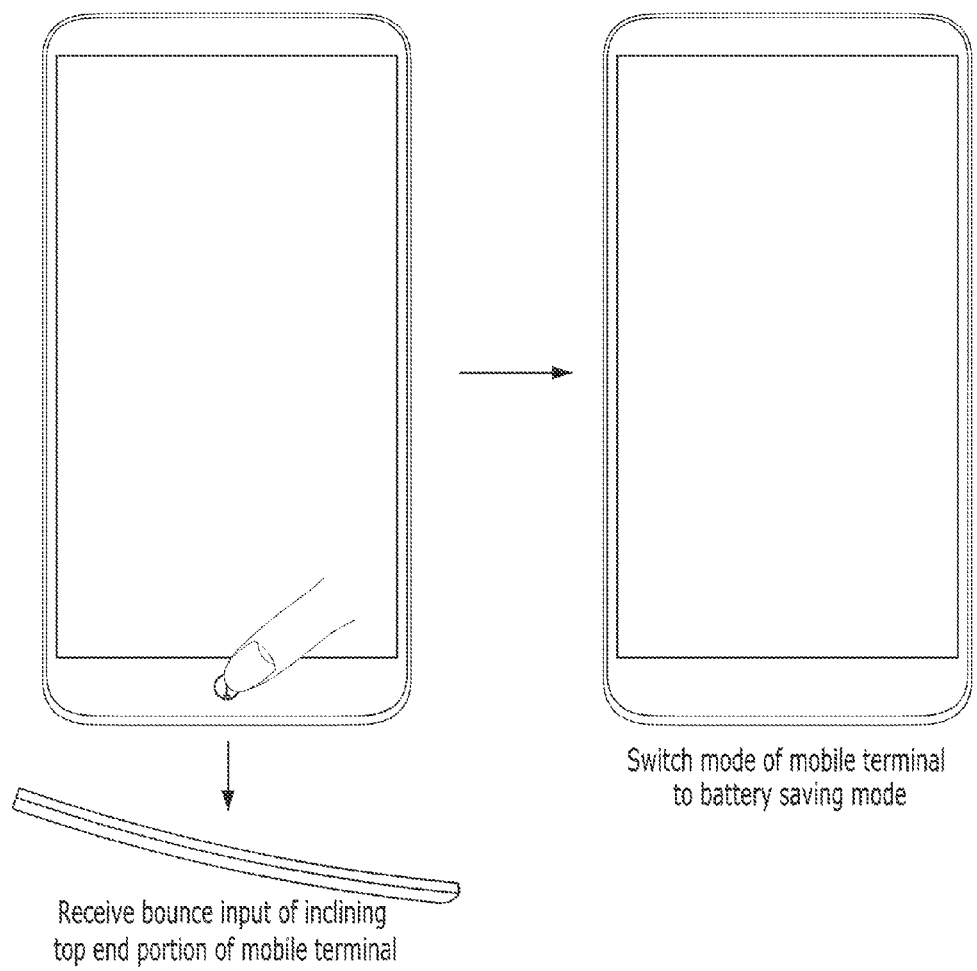

FIG. 22A and FIG. 22B are diagrams illustrating examples of outputting a battery status information of the mobile terminal 100 in response to a bounce input. While the mobile terminal 100 is in idle state, if a preset bounce input (or a preset bounce code) is received, the controller 180 can output a vibration to correspond to a remaining battery level of the mobile terminal 100. According to the example shown in FIG. 22A (a), if a battery remaining level is equal to or lower than 10%, a vibration is output once. According to the example shown in FIG. 22A (b), if a battery remaining level is equal to or lower than 5%, vibrations are output twice. Like the examples shown in the drawings, a count of vibration outputs can be adjusted in accordance with a remaining battery level. Besides, the controller 180 can be able to adjust a vibration output strength or a vibration output time in accordance with a remaining battery level.

In response to a bounce input, the controller 180 can control the mobile terminal 100 to enter a battery saving mode. For instance, while the mobile terminal 100 is in idle state, if a preset bounce input (or a preset bounce code) is received, referring to FIG. 22B, the controller 180 can control the mobile terminal 100 to enter a battery saving mode. If the battery saving mode is entered, the controller 180 turns off unnecessary communication modules (e.g., Wi-Fi communication module, NFC module, GPS communication module, etc.) and can set a brightness of the display unit 151 to a minimum brightness.

According to the examples shown in FIG. 22A and FIG. 22B, a user input for checking a remaining battery level of the mobile terminal 100 includes a bounce input of inclining a top end portion of the mobile terminal 100 and a user input for switching a mode of the mobile terminal 100 to a battery saving mode includes a bounce input of inclining a bottom end portion of the mobile terminal 100, by which the present invention is non-limited. In addition, the embodiment described with reference to FIG. 22A and FIG. 22B is applicable by a prescribed bounce input of a type different from that of the former bounce input shown in the drawing.

Although the mobile terminal 100 switches to an idle state, the controller 180 can play music. In particular, after the mobile terminal 100 has switched to the idle state, the controller 180 can continue to play the music, which had started to be played before the mobile terminal 100 entered the idle state. Further, if a bounce input is received, the controller 180 can raise or lower a volume in respond to the bounce input.

Figure 23:
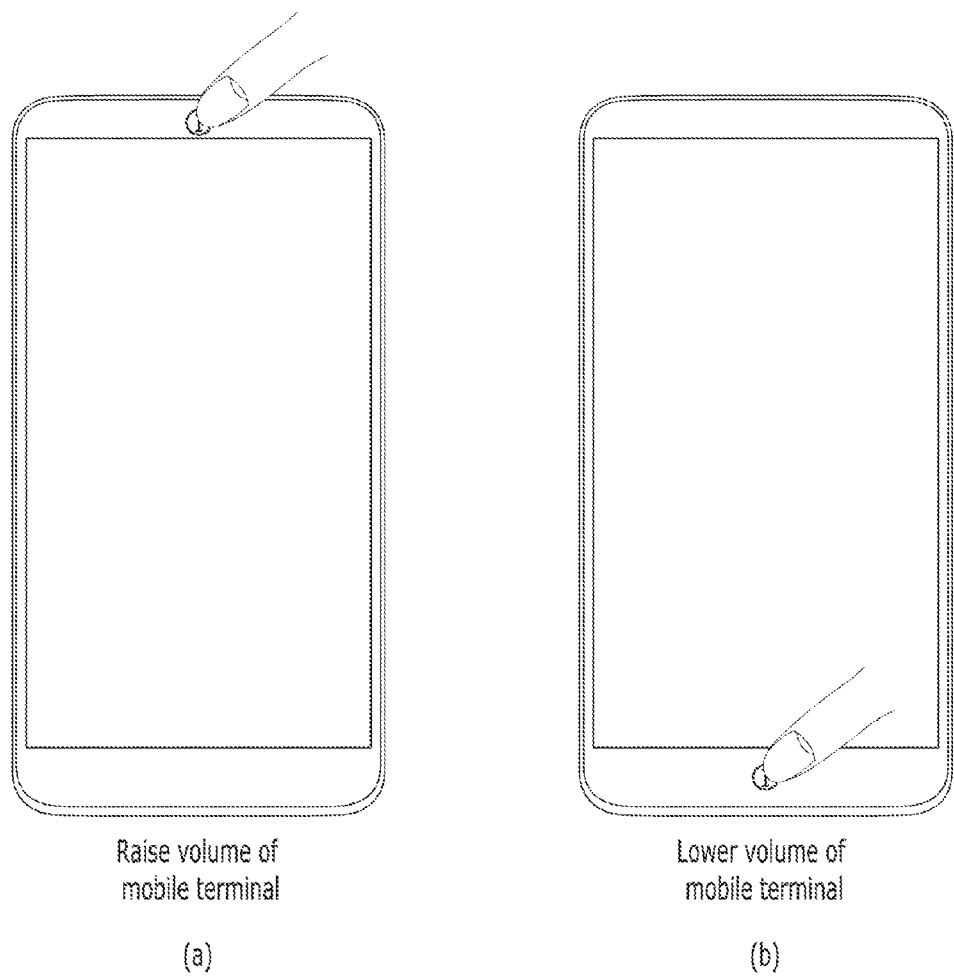
FIG. 23 is a diagram illustrating one example of increasing or decreasing a volume in response to a bounce input.

For instance, FIG. 23 is a diagram illustrating one example of increasing or decreasing a volume in response to a bounce input. Referring to FIG. 23 (a), while a music is played by the mobile terminal 100 in idle state, if a bounce input of pushing a top end portion of the mobile terminal 100 is received, the controller 180 can control a volume to be raised in response to the received bounce input.

Further, Referring to FIG. 23 (b), if a bounce input of pushing a bottom end portion of the mobile terminal 100 is received, the controller 180 can control a volume to be lowered in response to the received bounce input. Aside from the case that the mobile terminal is in the idle state, as the mobile terminal 100 is released from the idle state, although the display unit 151 is turned on, the volume can be raised or lowered by a bounce input.

While the mobile terminal 100 is in idle state, if a preset bounce input (or a preset bounce code) is received, the controller 180 can make a phone call to a preset user. In this instance, a call connecting screen may be displayed on the display unit 151.

Figure 24:
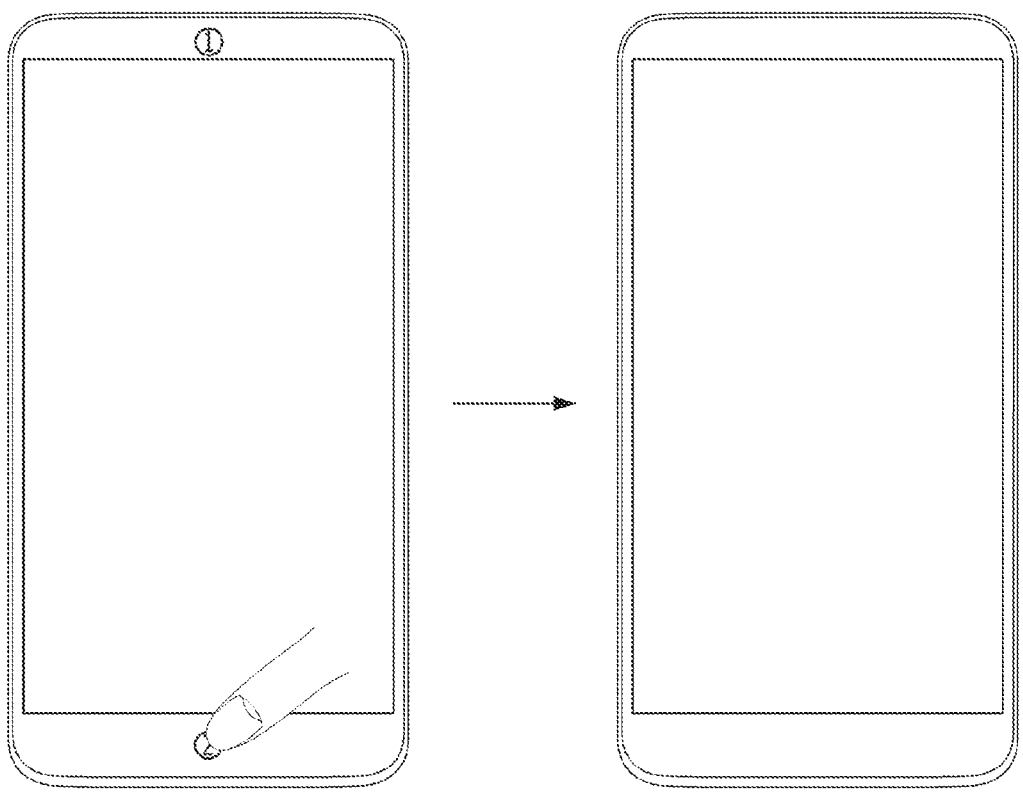
FIG. 24 is a diagram illustrating one example of making a phone call to a preset user in response to a bounce input.

For instance, FIG. 24 is a diagram illustrating one example of making a phone call to a preset user in response to a bounce input. Referring to FIG. 24 (a), while the mobile terminal 100 is in idle state, if a preset bounce input (or a preset bounce code) is received, the controller 180 can make a phone call to a preset user. Further, referring to FIG. 24 (b), a call connecting screen for making a phone call to the preset user may be output through the display unit 151.

Aside from the case that the mobile terminal is in the idle state, as the mobile terminal 100 is released from the idle state, when the display unit 151 is turned on, if a bounce input is received, the controller 180 can make a phone call to a preset user in response to the received bounce input.

According to the examples shown in FIGS. 8 to 11, in response to a bounce input received in the course of an idle state of the mobile terminal 100, a basic information or a notification information is output. Unlike the examples, in response to a touch input received in the course of an idle state of the mobile terminal 100, the controller 180 can control a basic information or a notification information to be output.

For instance, FIG. 25 is a diagram illustrating one example of outputting a basic information or a notification information in response to a bounce input received by the mobile terminal 100 in idle state. Referring to FIG. 25 (a), while the mobile terminal 100 is in idle state, if a preset touch input is received, the controller 180 terminates the idle state and can control such a basic information 2510 as a time information, a daily information and the like to be output.

Referring to FIG. 25 (b), if a newly occurred events exists in the mobile terminal 100, the controller 180 terminates the idle state and can control a notification information 2520 to be output. Like the example shown in FIG. 25 (b), the controller 180 can simultaneously output a basic information 2510 (e.g., a time information, a daily information, etc.) and a notification information 2510 or may output a notification information only.

For clarity, according to the example shown in FIG. 25, a touch input for terminating an idle state of the mobile terminal 100 includes an action of dragging a pointer in a bottom direction, by which the present invention is non-limited. In addition, the idle state of the mobile terminal 100 can be terminated by a prescribed touch input of a type different from that of the former touch input shown in the drawing.

According to an embodiment of the present invention, depending on a type of a user input applied to the mobile terminal 100 in idle state, the controller 180 can determine whether to output a basic information or a notification information together with the basic information. For instance, FIG. 26A and FIG. 26B are diagrams illustrating examples of an output change of the display unit 151 in accordance with a type of a user input.

Figure 26A:
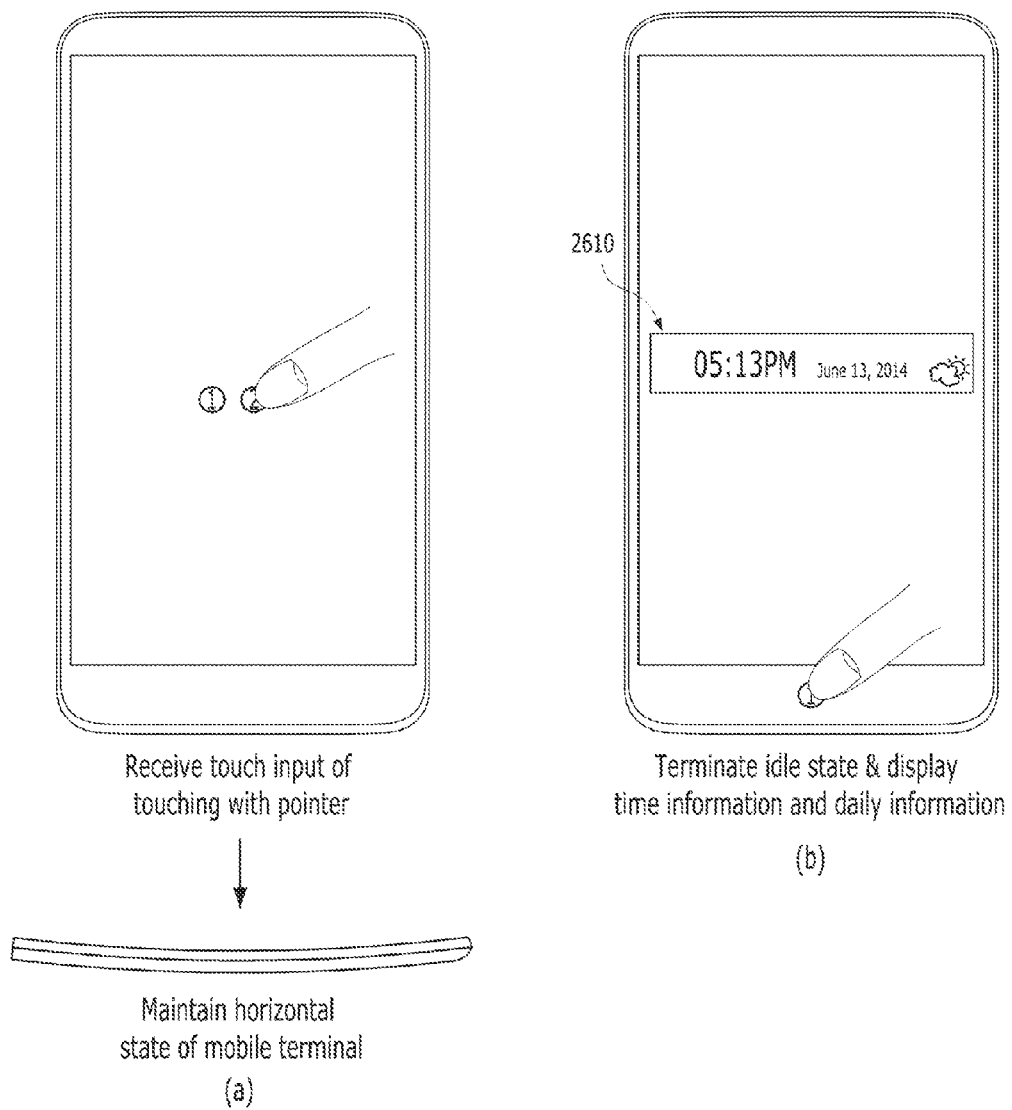
FIG. 26A and FIG. 26B are diagrams illustrating examples of an output change of a display unit in accordance with a type of a user input.

While the mobile terminal 100 is in idle state, if a preset touch input is received without applying a bounce input of inclining the mobile terminal 100 in a prescribed direction additionally, like the example shown in FIG. 26A (b), the controller 180 terminates the idle state of the mobile terminal 100 and can control such a basic information 2610 as a time information, a daily information and the like to be output (FIG. 26A (b)). For instance, while a user touches a center part of the display unit 151 or grips the mobile terminal 100, if a touch input is received, as shown in FIG. 26A (a), although the display unit 151 is pushed by a pointer, the mobile terminal 100 will not incline in a prescribed direction. Thus, if a touch input is applied but a bounce input is not applied additionally, like the example shown in FIG. 26A (b), the controller 180 can control such a basic information 2610 as a time information, a daily information and the like to be output.

Figure 26B:
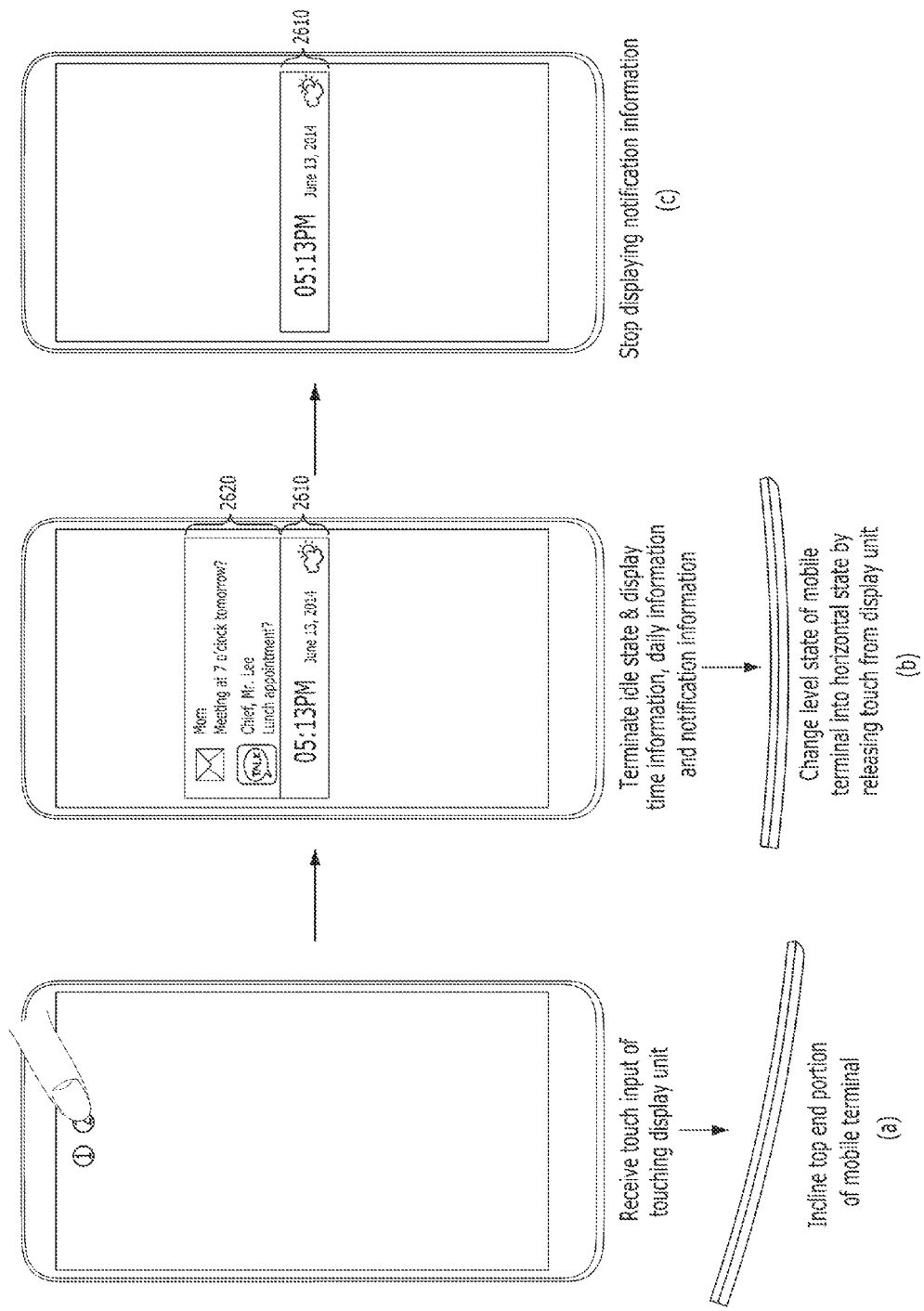

Further, as the mobile terminal 100 is pushed by a pointer for applying a preset touch input, if a bounce input for inclining the mobile terminal 100 in a prescribed direction is additionally applied (or a duration time of the bounce input is equal to or greater than a preset time), like the example shown in FIG. 26B (b), the controller 190 terminates the idle state of the mobile terminal 100 and can control a notification information 2620 to be output. For instance, while the mobile terminal 100 is put on a floor, if a touch drag input is applied toward a top end bezel of the mobile terminal 100 from the touchscreen, as shown in FIG. 26B (a), the pointer pushes a top end portion of the mobile terminal so that the mobile terminal 100 is inclined in a prescribed direction. Thus, when a touch input is applied, if a bounce input is additionally applied, like the example shown in FIG. 26B (b), the controller 180 can control a notification information 2620 to be output.

Further, as the pointer is detached from the mobile terminal 100, if a level state of the mobile terminal 100 inclined in the prescribed direction is changed into a horizontal state again or a preset touch input (e.g., a touch input of flicking a pointer in a preset direction, etc.) is received through the display unit 151, like the example shown in FIG. 26B (c), the controller 180 can control the notification information 2620 to stop being output.

According to the example shown in FIG. 26B (b) and FIG. 26B (c), while both of the basic information 2610 and the notification information 2620 are simultaneously output, if a level state of the mobile terminal 100 changes into the horizontal state, the notification information 2620 stops being output but the basic information 2610 continues to be displayed. Unlike the example shown in the drawing, if the level state of the mobile terminal 100 is changed into the horizontal state, the controller 180 can control the mobile terminal 100 to enter the idle state.

For clarity, according to the examples shown in FIG. 26A and FIG. 26B, depending on whether a bounce input of inclining the mobile terminal 100 in a prescribed direction is applied together with a touch input of touching the mobile terminal twice, an idle state is terminated and whether to output a notification information is determined, by which the present invention is non-limited. In addition, the embodiment described with reference to FIG. 26A and FIG. 26B can be applied by a user input different from the former user input shown in the drawing.

While the mobile terminal 100 is in idle state, if a preset touch input is applied, the controller 180 outputs a basic information (e.g., a time information, a daily information, etc.) in the first place. If the touch input is maintained over a prescribed time without being released, the controller 180 can control a notification information to be output for the first time.

Figure 27:
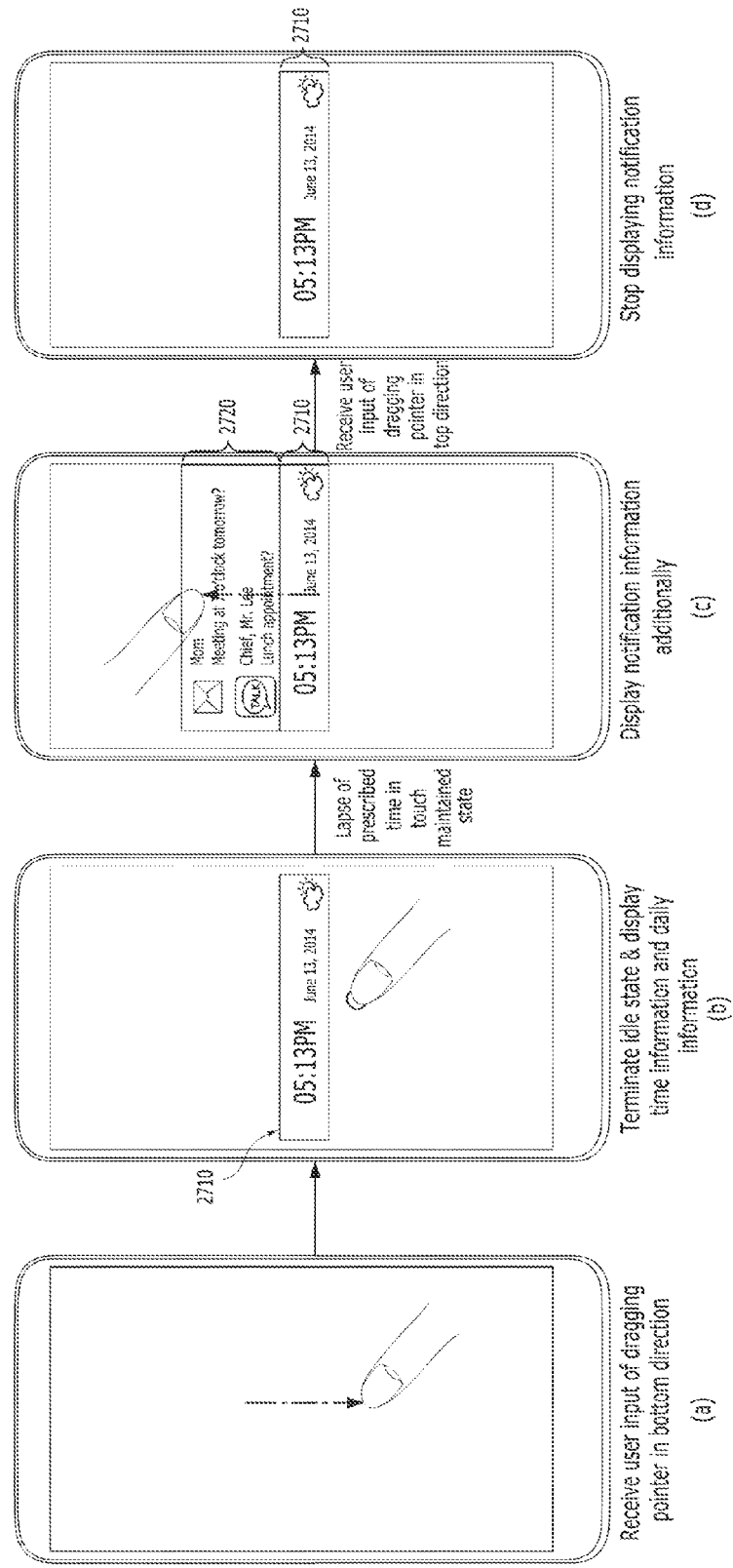
FIG. 27 is a diagram illustrating one example of outputting a basic information and a notification sequentially.

For instance, FIG. 27 is a diagram illustrating one example of outputting a basic information and a notification sequentially. Referring to FIG. 27, while the mobile terminal 100 is in idle state, if a preset touch input is received (FIG. 27 (a)), the controller 180 can control a basic information 2710 to be output (FIG. 27 (b)). Further, if a prescribed time lapses while a pointer with which the preset touch input is applied is not released from the display unit 151, like the example shown in FIG. 27 (c), the controller 180 can control a notification information 2720 to be additionally displayed.

Further, if the pointer is released from the touch or a preset touch input (e.g., a touch input of flicking the pointer in a preset direction, etc.) is received, like the example shown in FIG. 27 (d), the controller 180 can control the notification information 2720 to stop being output.

The user inputs shown in FIG. 27 are provided for clarity of the description, by which the present invention is non-limited. In addition, the embodiments shown in FIG. 27 can be applied by other inputs different from the former inputs shown in the drawing.

While a notification information is output, if a user input for selecting the notification information is received, the controller 180 can control a detailed information of an event, which is indicated by the selected notification information, to be output. Further, the controller 180 can run an application related to the event indicated by the selected notification information or may control a preview window, which is provided to check the detailed information of the event indicated by the selected notification information, to be output.

For instance, FIG. 28 is a diagram illustrating one example of outputting details of an event in response to a bounce input for selecting a notification information. For clarity of the description, while a bounce input of inclining the mobile terminal 100 in a prescribed direction is maintained, assume that the controller 180 can output a notification information.

Referring to FIG. 28, if a pointer currently pushing a bezel of the mobile terminal 100 is dragged to move to an inside of the display unit 151, the controller 180 can control a detailed information of an event, which is indicated by a notification information at the pointer dragged location (or a location from which the dragged pointer is touch-released), to be output. For instance, if a pointer is dragged to a notification information indicating a received text message (FIG. 28 (a)), the controller 180 can control details of the received text message to be displayed (FIG. 28 (b)). Further, the controller 180 can be able to run a text message application for checking the received text message.

While details of a prescribed notification in a notification information list are displayed, if a bounce input is applied, as mentioned in the foregoing description with reference to FIG. 11, details of a next event can be displayed. While the mobile terminal 100 is in idle state, if a preset touch input is applied, the controller 180 can control a memo or a memo composing screen to be output.

For instance, FIG. 29A and FIG. 29B are diagrams illustrating examples of outputting a memo compose screen or a memo in response to a preset touch input. Referring to FIG. 29A (a), while the mobile terminal 100 is in idle state, if a preset user input is received, the controller 180 terminates the idle state of the mobile terminal 100 and can also control a memo compose screen to be output. In particular, referring to FIG. 29A (b), the controller 180 controls a memo window 2910 to be displayed on a top end portion of the display unit 151 and can also control a keypad 2920 to be output through a bottom end portion of the display unit 151. If the keypad 2920 is touched, the controller 180 can be able to display characters corresponding to touched keys on the memo window 2910.

Once the memo composition is completed (e.g., a case that a save button shown in FIG. 29A (b) is touched), referring to FIG. 29A (c), the controller 180 stops displaying the keypad 2920 and can output a composition-completed memo. Thereafter, if a prescribed time lapses with receiving any user inputs, the controller 180 turns off the display unit 151 and can also enter the idle state.

While the mobile terminal 100 is in idle state, if a preset user input is received (FIG. 29B (a)), the controller 180 terminates the idle state of the mobile terminal 100 and can also control a composed memo to be output. In particular, like the example shown in FIG. 29B (b), the controller 180 can control a memo window 2930, which is provided to display a content of the composed memo, to be output. In addition, the memo window 2930 may include a title region 2932 for displaying a title of a memo and a text region 2934 for displaying a text content of the memo.

When a plurality of composed memos exist, if a preset user input is applied to the memo window 2930, the controller 180 can control a memo in order next or previous to that of a current memo to be output in response to a preset user input. For instance, if a touch input of dragging to move a pointer touching the title region 2932 of the memo window 2930 in a first direction is received (FIG. 29B (b), the controller 180 can control a memo in next order to be output (FIG. 29B (c)).

Further, if a touch input of dragging to move a pointer touching the title region 2932 of the memo window 2930 in a second direction is received (FIG. 29B (c), the controller 180 can control a memo in previous order to be output (FIG. 29B (b)).

The user input examples shown in FIG. 29A and FIG. 29B are provided for clarity of the description. In addition, a memo compose screen and a memo window can be output by a user input (e.g., a bounce input of inclining a top or bottom end portion of the mobile terminal 100, a combination of bounce inputs consecutively applied plural times, etc.) other than the former user inputs shown in the drawings.

Figure 30:
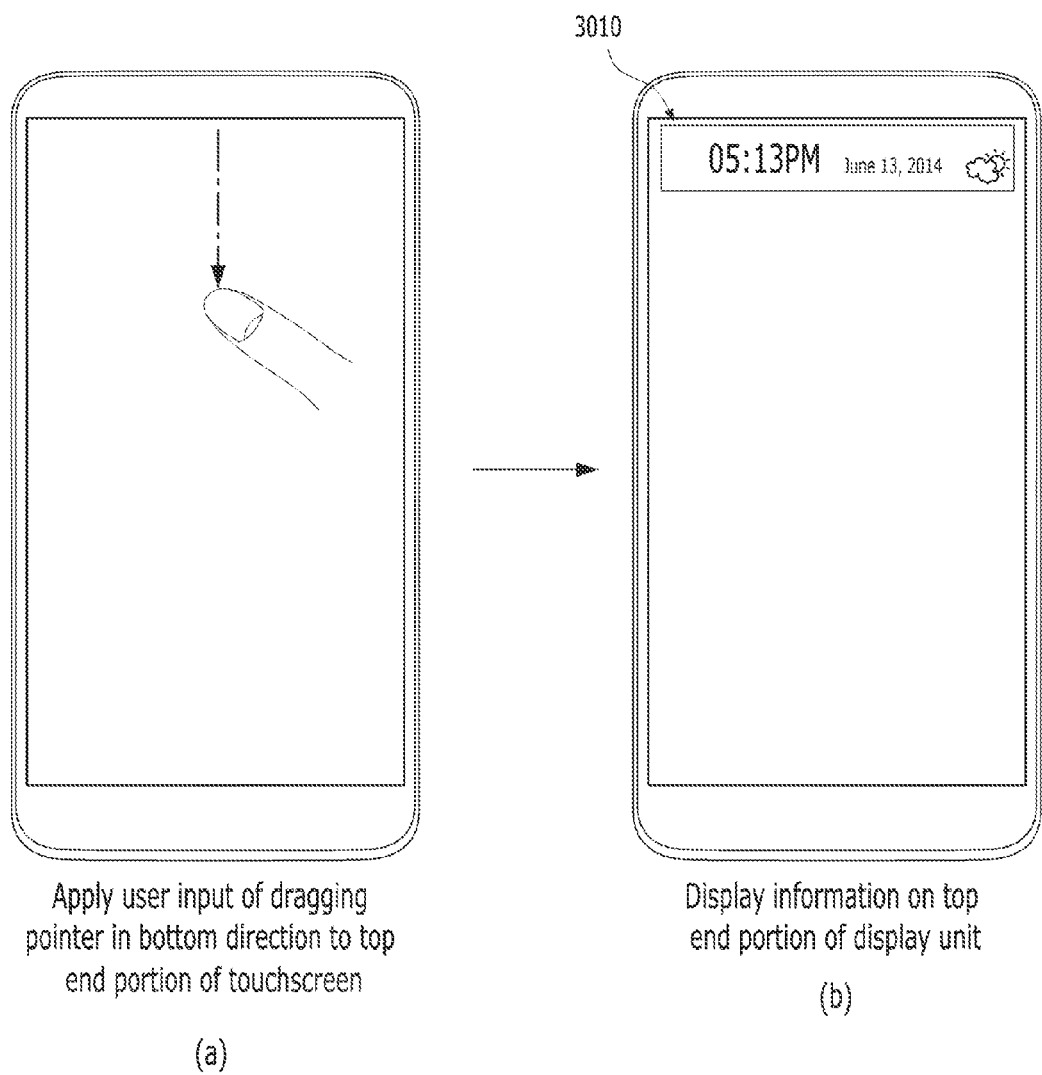
FIG. 30 is a diagram illustrating one example of adjusting a display location of an information in response to a user's touch input location.

If an idle state of the mobile terminal 100 is terminated by a user's touch input, the controller 180 releases the idle state of the mobile terminal 100 based on a location of the user's touch input and can also determine a display location of an information to display. For instance, FIG. 30 is a diagram illustrating one example of adjusting a display location of an information in response to a user's touch input location. For clarity of the following description, assume that a touch input for terminating an idle state of the mobile terminal 100 is an action of dragging the display unit 151.

Referring to FIG. 30, if a user input of dragging the display unit 151 is received, the controller 180 terminates an idle state of the mobile terminal 100 and can also control information (e.g., a time information, a daily information, a notification information, a memo, etc.) to be output.

Further, the controller 180 can determine display locates of information, which is to be output in accordance with the termination of the idle state of the mobile terminal 100, with reference to a drag input started location. For instance, if the drag input starts from a top end portion of the display unit 151 (FIG. 30 (a)), the controller 180 can control information 3010 to be displayed on the top end portion of the display unit 151 (e.g., a time information and a daily information are output in FIG. 30 (b)) (FIG. 30 (b)).

Besides, if the drag input starts from a middle or bottom end portion of the mobile terminal 100, the controller 180 can control the information to be displayed on the middle or bottom end portion of the display unit 151. For clarity, according to the example shown in FIG. 30, a user input for terminating an idle state includes a drag input, by which the present invention is non-limited. In addition, the embodiment described with reference to FIG. 30 can be applied by a user input other than the former user input shown in the drawing.

Figure 31:
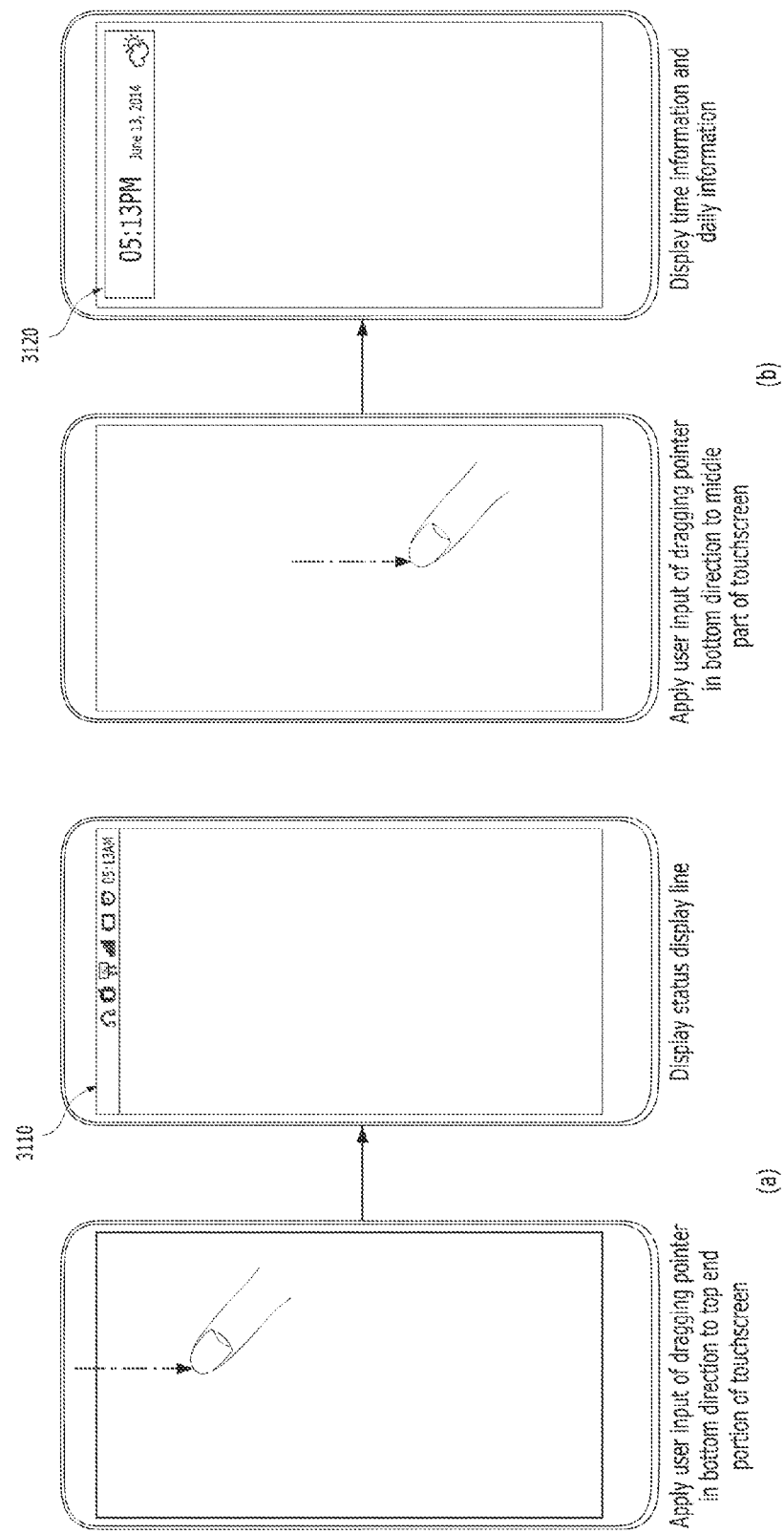
FIG. 31 is a diagram illustrating one example of adjusting a type of a displayed information in response to a user's touch input location.

The controller 180 can determine a type of information to display based on a user's touch input location while releasing an idle state of the mobile terminal 100. For instance, FIG. 31 is a diagram illustrating one example of adjusting a type of a displayed information in response to a user's touch input location. For clarity of the following description, assume that a touch input for terminating an idle state of the mobile terminal 100 is an action of dragging the display unit 151.

Referring to FIG. 31 (a), if a user input of dragging a pointer in a bottom direction starts from a most top end portion (i.e., a boundary with a bezel) of the display unit 151, the controller 180 releases the idle state of the display unit 151 and can control a status display line 3110 to be output.

Further, Referring to FIG. 31 (b), if a user input of dragging a pointer in a bottom direction starts from a middle part of the display unit 151, the controller 180 releases the idle state of the display unit 151 and can control an information 3120 (e.g., a time information, a date information, etc.) to be output.

For clarity, according to the example shown in FIG. 31, a user input for terminating an idle state includes a drag input, by which the present invention is non-limited. In addition, the embodiment described with reference to FIG. 31 can be applied by a user input other than the former user input shown in the drawing. Moreover, information, which is to be displayed by a user input, is non-limited by the example shown in FIG. 31.

The controller 180 divides the display unit 151 into N virtual regions and can control information to be displayed on the region to which a touch input is applied. For instance, FIG. 32 is a diagram illustrating another example of adjusting a display location of an information in response to a user's touch input location. For clarity of the following description, like the example shown in FIG. 32 (a), assume that the display unit 151 is partitioned into 4 virtual regions. In addition, the 4 virtual regions shall be named first to fourth regions by starting with a right top end region counterclockwise.

Referring to FIG. 32, if a touch input for terminating an idle state of the mobile terminal 100 is received, the controller 180 terminates the idle state of the mobile terminal 100 and can also control information to be displayed at a location to which the touch input is applied. For instance, if a drag input starts from the second region of the display unit (FIG. 32 (a)), the controller 180 can control information (e.g. a time information and a daily information in FIG. 32 (b)) to be output through the second region (FIG. 32 (b)). After the information has been displayed, the controller 180 can process a remaining region into a blank region.

If a touch input is applied to the remaining region, the controller 180 can control additional information to be displayed on the touch input applied remaining region. For instance, if a drag input starts from the first region of the display unit 151 (FIG. 32 (b)), the controller 180 can control additional information (e.g., a memo is output in FIG. 32 (c)) to be output through the first region (FIG. 32 (c)). If touch inputs are applied to the third region and the fourth region as well, different information may be output through the first to fourth regions, respectively.

Although FIG. 32 shows one example that the display unit 141 is partitioned into 4 virtual regions, the display unit 151 can be partitioned into virtual regions amounting to the number different from that of the example shown in the drawing. Further, the present embodiment can be applied by a user input other than the drag input of the example shown in FIG. 32.

While the mobile terminal 100 is in idle state, if a preset bounce input (or a preset bounce code) is applied, the controller 180 can activate a recording function in response to the bounce input. For instance, FIGS. 33A to 33D are diagrams illustrating examples of activating a recording function in response to a bounce input.

Referring to FIG. 33A (a), while the mobile terminal 100 is in idle state, if a bounce input of inclining the mobile terminal 100 is received and a duration time of the bounce input continues over a prescribed time, the controller 180 terminates the idle state and can also activate a recording function. Once the recording function is activated, referring to FIG. 33A (b), an indicator 3310 (e.g., an icon, a text, an image, etc.) indicating that the recording function is activated can be output through the display unit 151.

Thereafter, if a touch input of dragging to move a pointer currently pushing the mobile terminal 100 to an inside of the display unit 151 is received, the controller 180 can control the recording to start. Once the recording starts, referring to FIG. 33A (c), the controller 180 can control an indicator 3320, which indicates the recording is in progress, to be output.

Further, the controller 180 can record a sound input through the microphone from an outside of the mobile terminal 100 or may be able to record a sound (e.g., radio sound, music sound, etc.) generated from inside of the mobile terminal 100. If a bounce input of inclining the mobile terminal 100 is received in the course of the recording, referring to FIG. 33B, the controller 180 can control text data, which is created from STT (speech to text) converting a currently recorded content, to be output.

Figure 33B:
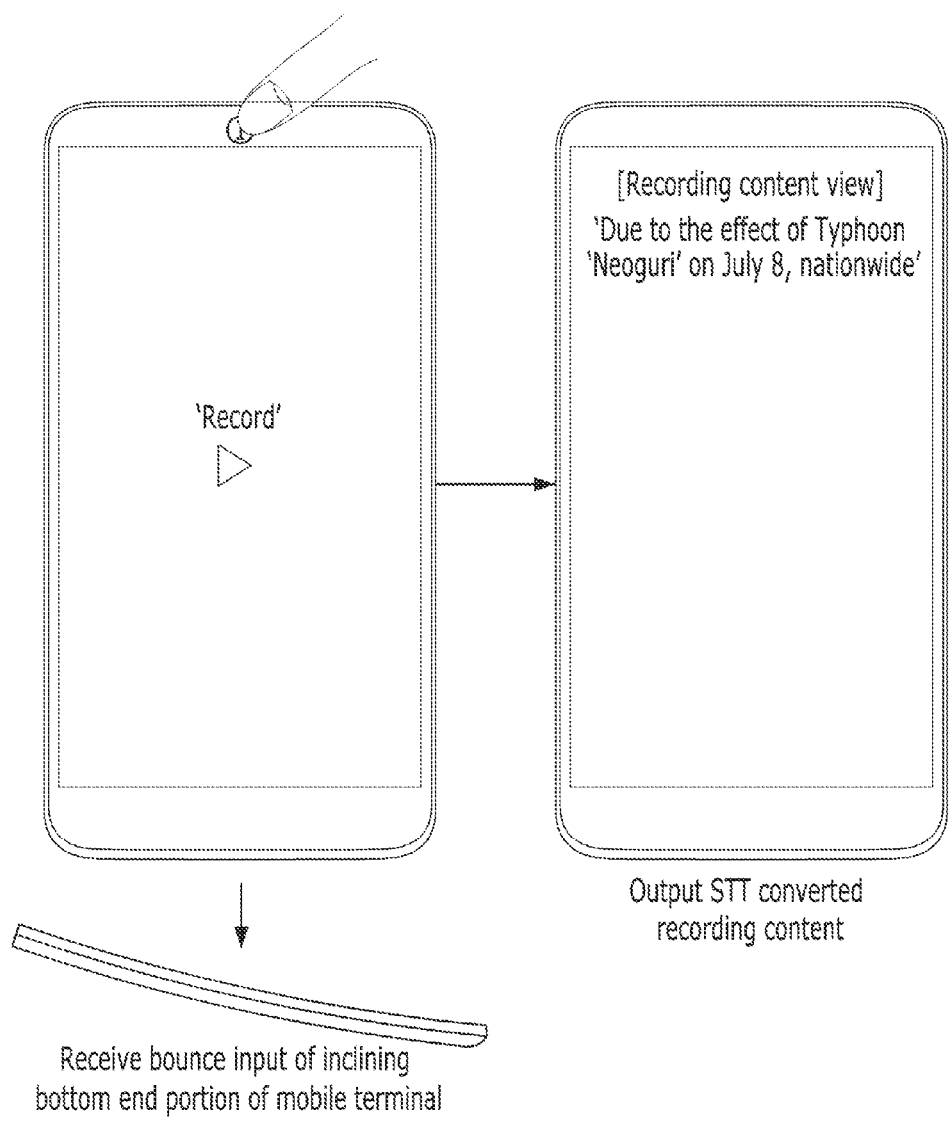
Figure 33C:
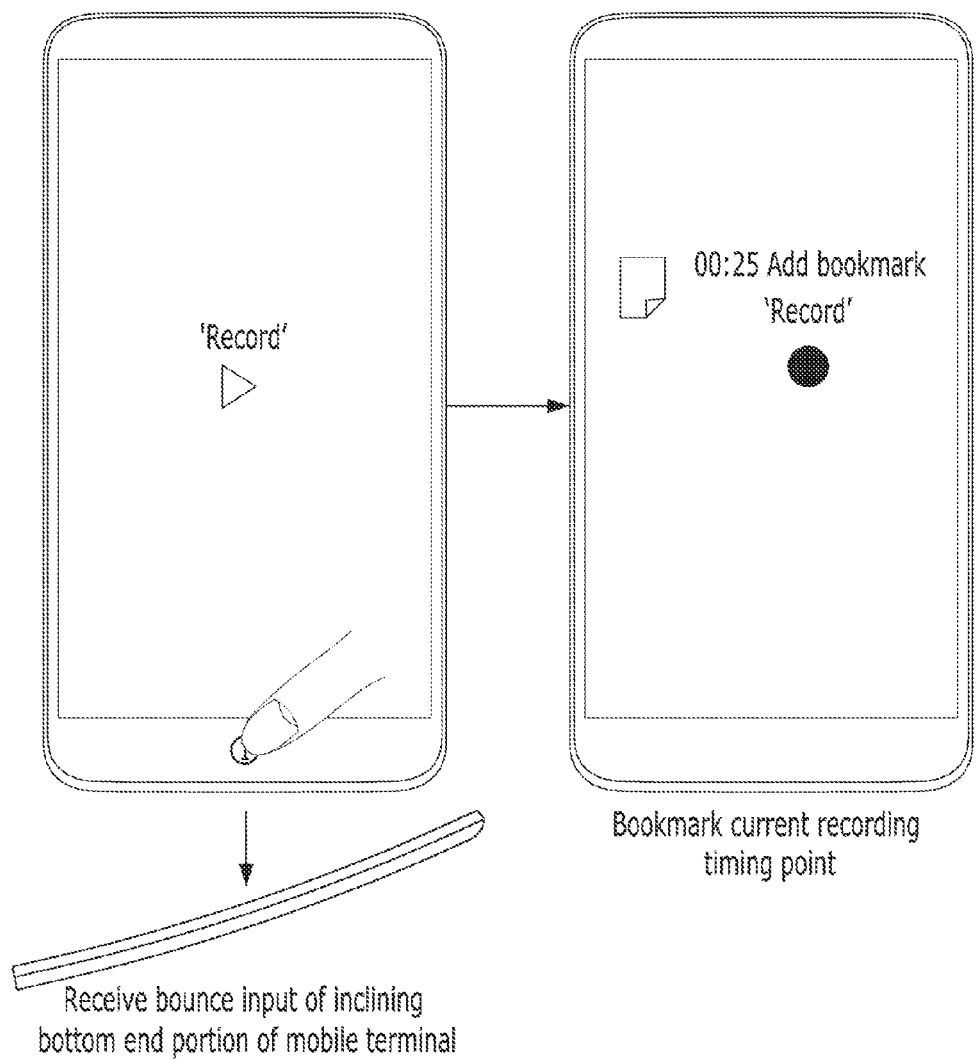

In another instance, if a bounce input of inclining the mobile terminal 100 is received in the course of the recording, referring to FIG. 33C, the controller 180 can bookmark a timing point of inputting the bounce input in a recording interval. In addition, information on the bookmarked timing point can be output through the display unit 151. After completion of the recording, when a recording file is played, a user can be provided with convenience in quickly accessing the bookmarked timing point.

In another instance, if a bounce input of inclining the mobile terminal 100 is received in the course of the recording, the controller 180 can raise or lower a recording volume. For example, if a bounce input of inclining a top end portion of the mobile terminal 100 is received in the course of the recording, referring to FIG. 33D (a), the controller 180 can raise the recording volume. In another example, if a bounce input of inclining a bottom end portion of the mobile terminal 100 is received in the course of the recording, referring to FIG. 33D (b), the controller 180 can lower the recording volume.

If a bounce input of inclining the mobile terminal 100 is received in the course of the recording, the controller 180 can control the recording of the mobile terminal 100 to be stopped. For example, if a bounce input of inclining a prescribed side of the mobile terminal 100 is received (FIG. 33A (c)), the controller 180 can control the recording of the mobile terminal 100 to be stopped (FIG. 33A (d)).

The user inputs shown in FIGS. 33A to 33D are provided for clarity of the description only, by which the present invention is non-limited. In addition, the above-described embodiments can be applied by user inputs other than the former user inputs shown in the drawings.

While the mobile terminal 100 is in idle state, if a preset bounce input (or a preset bounce code) is applied, the controller 180 can activate a timer function in response to the bounce input. For instance, FIGS. 34A to 34C are diagrams illustrating examples of activating a timer function in response to a bounce input.

Figure 34A:
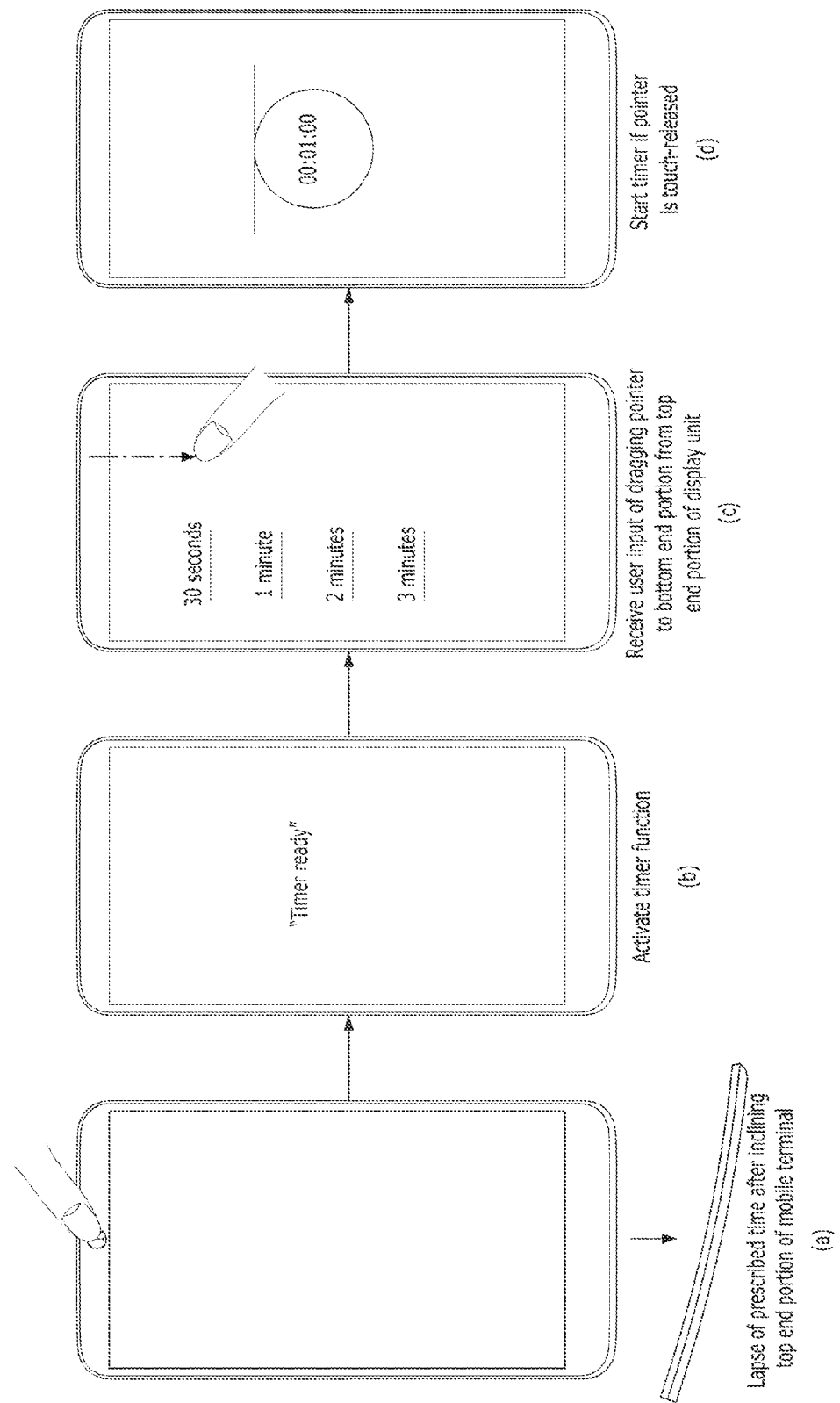

Referring to FIG. 34A (a), while the mobile terminal 100 is in idle state, if a bounce input of inclining the mobile terminal 100 is received and a duration time of the bounce input continues over a prescribed time, the controller 180 terminates the idle state and can also activate a timer g function. Once the timer function is activated, referring to FIG. 34A (b), an indicator (e.g., an icon, a text, an image, etc.) indicating that the timer function is activated can be output through the display unit 151.

Thereafter, if a touch input of dragging to move a pointer currently pushing the mobile terminal 100 to an inside of the display unit 151 is received, the controller 180 can set a timer time. In this instance, the controller 180 can set the timer time based on a location to which the pointer is dragged to move. In particular, if a drag moving length gets longer, the controller 180 can control the timer time to increase longer. For example, referring to FIG. 34A (c), if the pointer is dragged to move to a location '1 minute', the controller 180 can control the timer time to be set to 1 minute.

Thereafter, if the pointer is touch-released from the display unit 151, referring to FIG. 34A (d), the controller 180 can control a timer, which is counted with reference to the set timer time, to start. After the timer has started, if a bounce input of inclining the mobile terminal 100 is received, the controller 180 can pause or reset the timer.

For instance, referring to FIG. 34B (a), if a bounce input of inclining the mobile terminal 100 in a prescribed direction is applied, the controller 180 can control the timer to be paused. Further, the controller 180 can control the timer to be paused during a time of maintaining the bounce input (i.e., a period in which the mobile terminal 100 is inclined). As the bounce input is ended, if a level state of the mobile terminal 100 is changed into a horizontal state, referring to FIG. 34B (b), the controller 180 can control the timer to be resumed.

In another instance, referring to FIG. 34C (a), if a bounce input of inclining the mobile terminal 100 in a prescribed direction is applied, the controller 180 can reset the timer. Further, the controller 180 can control the timer not to start until the bounce input of inclining the mobile terminal 100 in the prescribed direction is released. As the bounce input is ended, if a level state of the mobile terminal 100 is changed into a horizontal state, referring to FIG. 34C (C), the controller 180 control the reset timer to start.

The user inputs shown in FIGS. 34A to 34C are provided for clarity of the description only, by which the present invention is non-limited. In addition, the above-described embodiments can be applied by user inputs other than the former user inputs shown in the drawings.

While the mobile terminal 100 is in idle state, if a preset bounce input (or a preset bounce code) is applied, the controller 180 can control the mobile terminal 100 to switch to a cover mode in which the mobile terminal 100 operates as if equipped with a flip cover. In this instance, the flip cover may be configured by covering the display unit 151 if a prescribed face of the flip cover is folded. In particular, if a hole is formed on a shield face that covers the display unit 151, the controller 180 can display information to fit a location and size of the hole.

Figure 35:
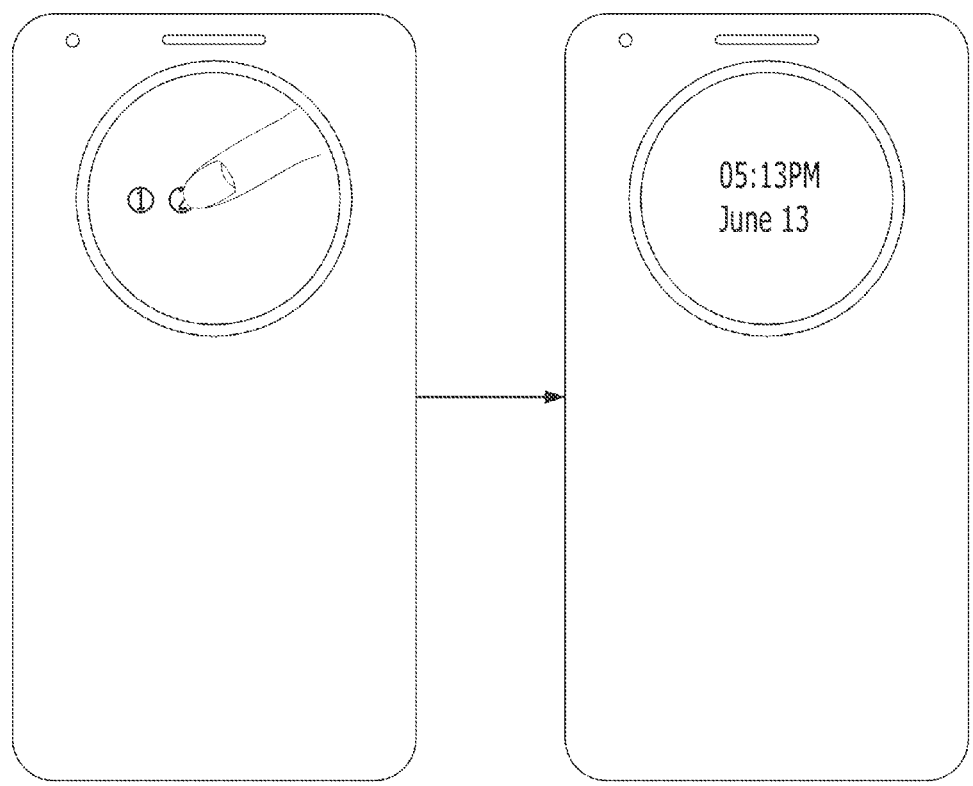
FIG. 35 is a diagram illustrating one example of an operation of a mobile terminal equipped with a flip cover.

For instance, FIG. 35 is a diagram illustrating one example of an operation of a mobile terminal equipped with a flip cover. Referring to FIG. 35, if the display unit 151 is touched through a hole formed in a shield face of a flip cover (FIG. 35 (a)), the controller 180 can control information to be output by fitting a location and size of the hole formed in the shield face (FIG. 35 (b)). Although FIG. 35 (b) shows that a watch is output to fit the location and size of the hole, at least one of a notification information, a message, a memo, a music player and the like can be output by fitting the location and size of the hole.

Once the mobile terminal 100 switches to a cover mode, the controller 180 can display information in the same configuration as the mobile terminal 100 is installed/equipped with the flip cover. For instance, FIG. 36 is a diagram illustrating one example for a mobile terminal to switch to a cover mode.

Figure 36:
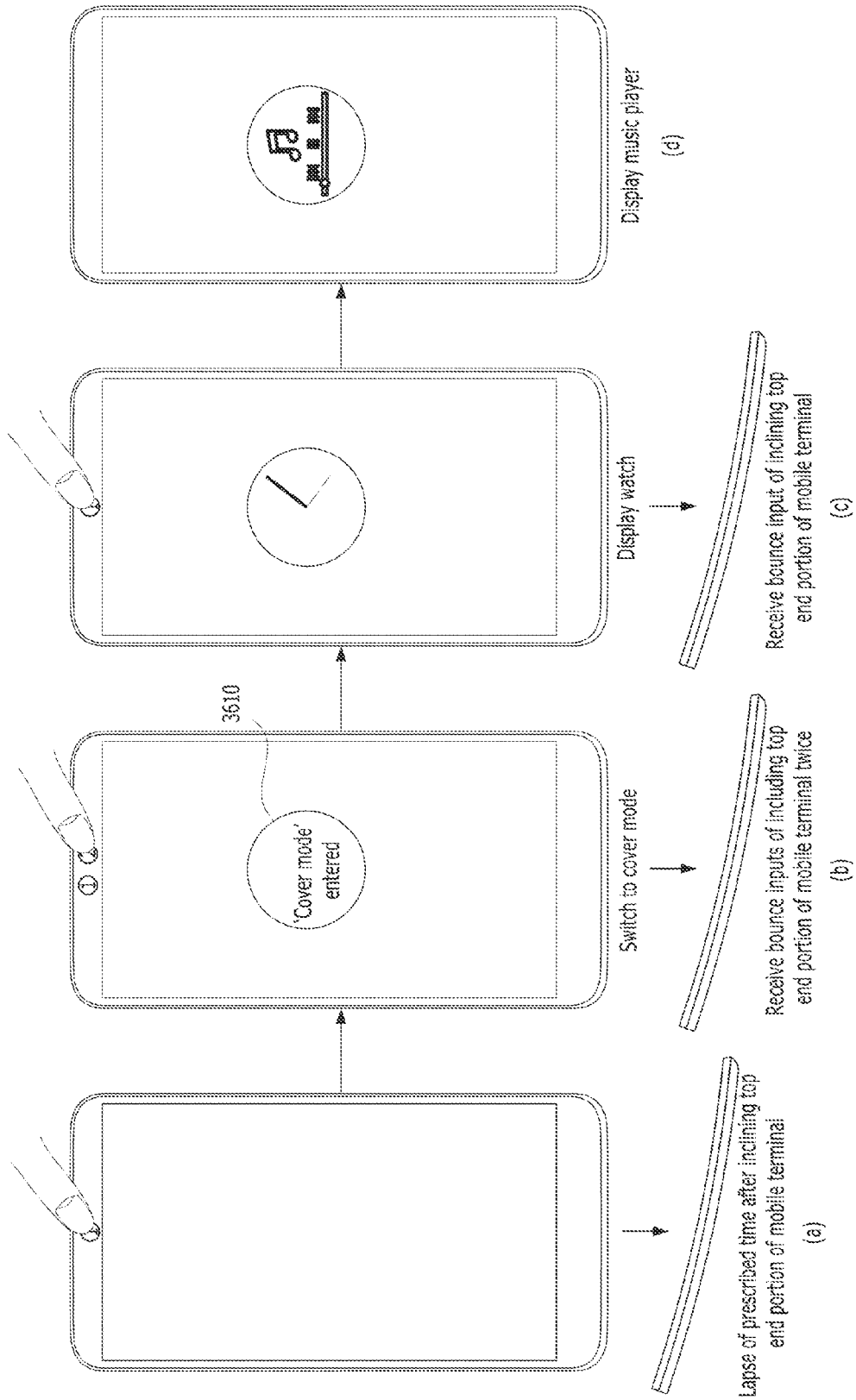
FIG. 36 is a diagram illustrating one example for a mobile terminal to switch to a cover mode.

Referring to FIG. 36 (a), while the mobile terminal 100 is in idle state, if a preset bounce input (or a preset bounce code) is applied, the controller 180 can control the mobile terminal 100 to enter a cover mode. If the mobile terminal 100 enters the cover mode, referring to FIG. 36 (c), the controller 180 can control an information, which indicates that the mobile terminal 100 has entered the cover mode, to be output.

While the mobile terminal 100 is in the cover mode, referring to FIG. 36 (c), if a user input (e.g., a bounce input, a touch input, etc.) for terminating the idle state of the mobile terminal 100 is received, the controller 180 can control information to be output through a partial region of the mobile terminal like the case that the mobile terminal 100 is installed with the flip cover. In particular, according to the example shown in FIG. 36 (c), a watch in a circle shape is output.

While the information is output, if a bounce input is applied, the controller 180 can change the currently displayed information in response to the bounce input. For instance, while a time information is output, if a bounce input of inclining the mobile terminal 100 in a prescribed direction is received, referring to FIG. 36 (d), the controller 180 can control a music player to be output. In this instance, the music player can be output in a circle shape through a partial region of the mobile terminal as well.

When an idle state of the mobile terminal 100 in a dark place is terminated, a user may be momentarily dazzled by the light of the display unit 151. Hence, if the idle state of the mobile terminal 100 is released, the controller 180 operates the display unit 151 in low brightness in the first place. If a bounce input is applied, the controller 180 can control the brightness of the display unit 151 to increase gradually.

Figure 37:
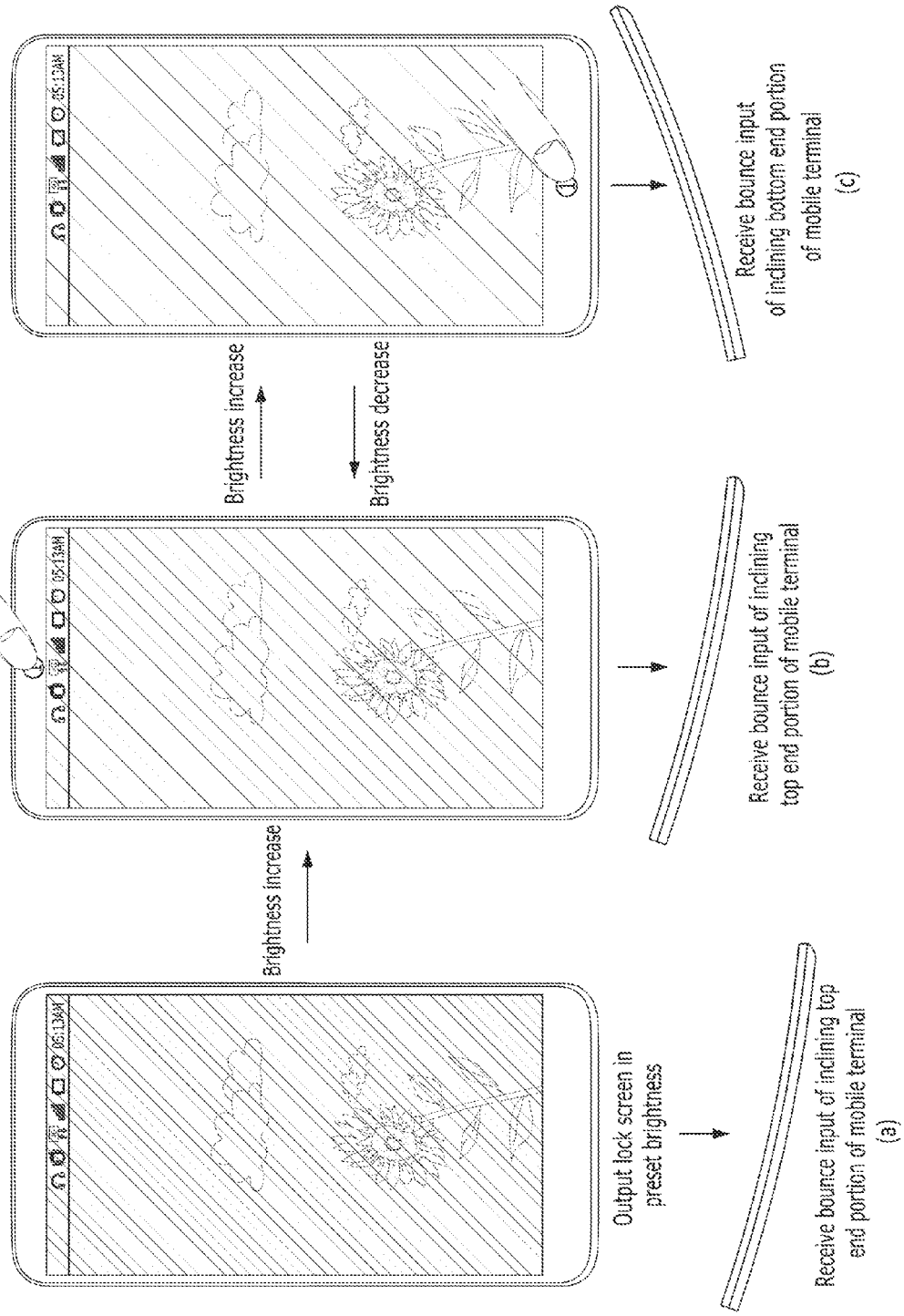
FIG. 37 is a diagram illustrating one example of increasing a brightness of a display unit gradually.

For instance, FIG. 37 is a diagram illustrating one example of increasing a brightness of a display unit gradually. Referring to FIG. 37, while the mobile terminal 100 is in idle state, if a preset bounce input (or a preset bounce code) is applied, the controller 180 can control the idle state of the mobile terminal 100 to be terminated. Once the idle state of the mobile terminal 100 is terminated, a preset information or a lock screen can be output. In this instance, like the example shown in FIG. 37 (a), the controller 180 can control a brightness of the display unit 151 to be set to a preset level of brightness.

Thereafter, if a bounce input is received through the mobile terminal 100, the controller 180 can control the brightness of the mobile terminal to increase or decrease. For instance, if a bounce input of inclining a top end portion of the mobile terminal 100 is received, referring to FIG. 37 (b) and FIG. 37 (c), the controller can control the brightness of the mobile terminal to increase. In another instance, if a bounce input of inclining a bottom end portion of the mobile terminal 100 is received, referring to FIG. 37 (b), the controller can control the brightness of the mobile terminal to decrease.

After a specific command has been executed through the mobile terminal, if a bounce input of inclining the mobile terminal 100 in a prescribed direction is received, the controller 180 can cancel (i.e. undo) the executed command in response to the bounce input. After the executed command has been cancelled, if a bounce input of inclining the mobile terminal 100 in a prescribed direction is received, the controller 180 can restore (i.e., redo) the cancelled command in response to the bounce input.

Figure 38:
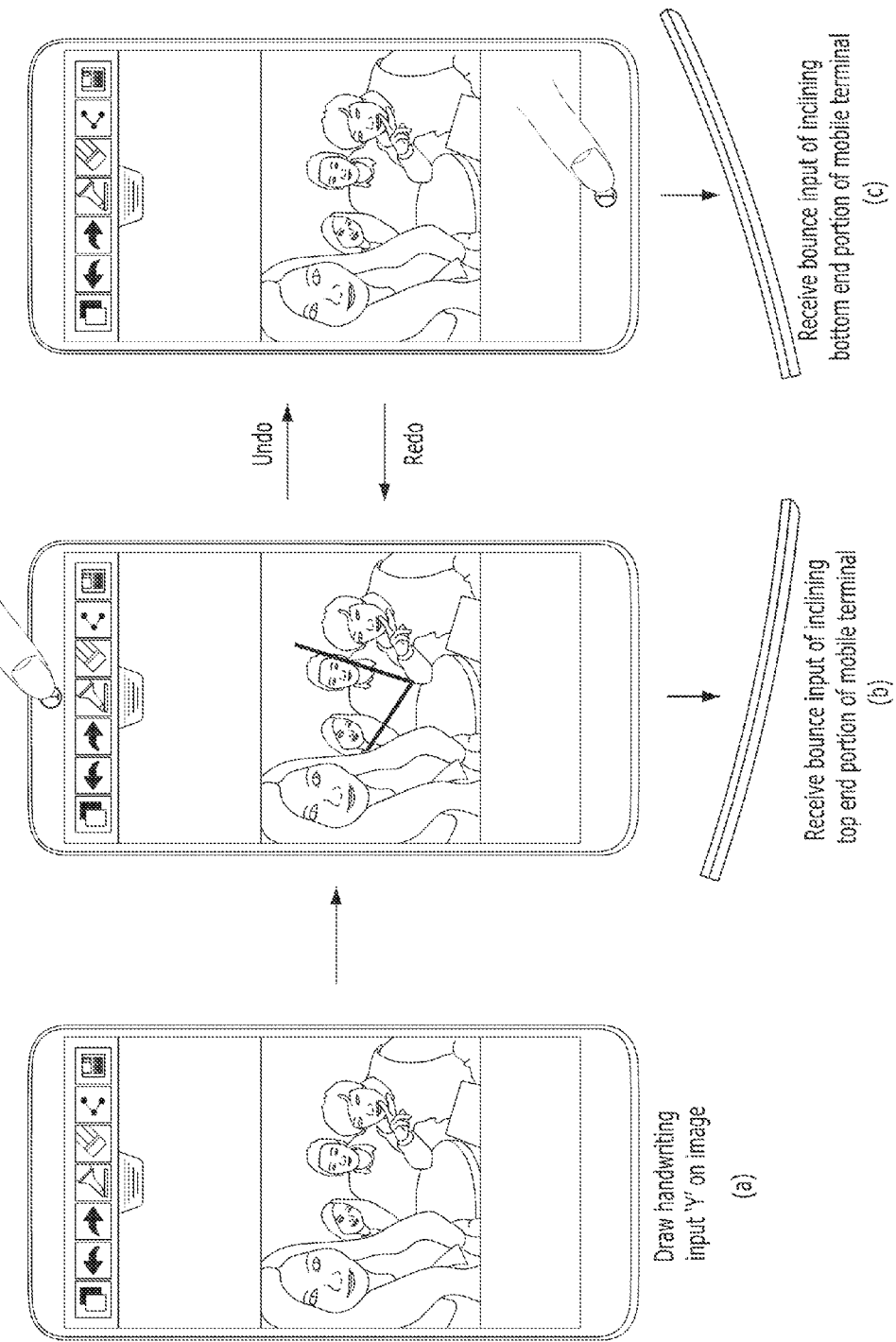
FIG. 38 is a diagram illustrating one example of executing an 'undo' action or a 'redo' action in response to a bounce input.

For instance, FIG. 38 is a diagram illustrating one example of executing an 'undo' action or a 'redo' action in response to a bounce input. For clarity of the following description, assume that an image editing application is running in the mobile terminal 100. Moreover, like the example shown in FIG. 38 (a) and FIG. 38 (b), assume that a command for applying a handwriting 'v' on a currently edited image is executed.

Further, if a bounce input of inclining one side of the mobile terminal 100 is received, referring to FIG. 37 (c), the controller 180 can cancel a most recently applied command. Hence, the handwriting 'v' can be deleted from the currently edited image. Thereafter, if a bounce input of inclining the other side of the mobile terminal 100 is received, referring to FIG. 37 (b), the controller 180 can restore a most recently applied command. Hence, the handwriting 'v' can be displayed again on the currently edited image.

According to the example shown in FIG. 5, after whether an applied bounce input matches a preset user input for terminating an idle state of the mobile terminal 100 has been determined, whether the applied bounce input matches a password for unlocking the mobile terminal 100 is determined. On the contrary, after whether an applied bounce input matches a password for unlocking the mobile terminal 100 has been determined, whether the applied bounce input matches a preset user input for terminating an idle state of the mobile terminal 100 can be determined.

In another instance, if a password for unlocking the mobile terminal 100 is set for the mobile terminal 100, the controller controls a lock screen to be output in response to a preset user input for terminating an idle state of the mobile terminal 100. If the password is not set, the controller 180 can control a preset information to be output for the first time in response to the preset user input for terminating the idle state of the mobile terminal 100. In this instance, in response to the preset user input for terminating the idle state of the mobile terminal 100, one of the preset information and the lock screen may be selectively output.

The above-mentioned embodiments are mainly described by taking one example that an idle state of the mobile terminal 100 is terminated by a bounce input, by which the present invention is non-limited. The mobile terminal 100 according to the present invention may be able to get out of the idle state by a touch input of touching the display unit 151.

Meanwhile, a touch sensor configuring a mutual layer structure with the display unit 151 can be periodically activated to detect a touch input. In doing so, an activation period of the touch sensor may vary depending on the on/off state of the display unit 151.

For instance, if the display unit 151 is in on-state, in order to instantly respond to a user input, the touch sensor may always maintain an activated state or may be repeatedly activated in each short interval (i.e., entering an activated state in every $1^{st}$ period). On the other hand, if the display unit 151 is in on-state, in order to reduce unnecessary power consumption, the touch sensor may be repeatedly activated in every longer interval (i.e., entering an activated state in every $2^{nd}$ period (i.e., $2^{nd}$ period>$1^{st}$ period).

If the touch sensor is activated in every short interval, the possibility of a touch input recognition error is lowered but it may cause a problem that a power consumed by the touch sensor is raised. On the other hand, if the touch sensor is activated in every long interval, a power consumed by the touch sensor is reduced but the possibility of the touch input recognition error is raised.

Hence, in order to the touch sensor to be activated in every long interval basically in the off-state of the display unit 151, if a touch input of touching the display unit 151 is detected, the controller 180 can control the activation period of the touch sensor to be shortened. For instance, while the controller 180 controls the touch sensor to be activated about 30 times (i.e., 30 Hz) in 1 second, if the controller 180 detects a touch input of touching the display unit 151, the controller 180 can control the touch sensor to be activated about 120 times (i.e., 120 Hz) in 1 second.

Meanwhile, if an additional touch input is not detected within a prescribed time from a timing point of recognizing a touch input of touching the display unit 151, the controller 180 can control the activation period of the touch sensor to return to an original state again. In this case, the additional touch input may include one of an action of maintaining a state of touching the display unit 151, an action of dragging to move a pointer currently touching the display unit 151, an action of re-touching the display unit 151 within a prescribed time after releasing a pointer from a touch, and the like. By increasing the activation period of the touch sensor, it is able to prevent the terminal from malfunctioning by a touch input unintended by a user.

In the following description, one example of terminating an idle state of the mobile terminal 100 is explained in detail.

Figure 39:
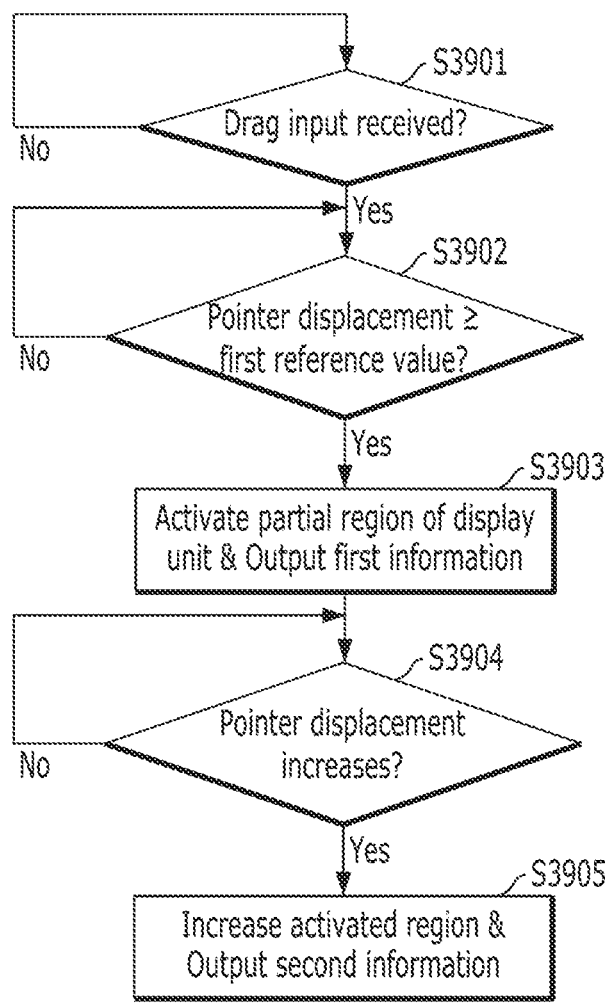
FIG. 39 is a diagram illustrating an operating flowchart of a mobile terminal according to one embodiment of the present invention.

FIG. 39 is a diagram illustrating an operating flowchart of a mobile terminal according to one embodiment of the present invention. For clarity of the following description, assume that the mobile terminal is in idle state initially. Hence, the display unit 151 of the mobile terminal may maintain an off-state and any information may not be outputted through the display unit 151.

Referring to FIG. 39, a pointer touching the display unit 151 is dragged to move [S3901]. If a displacement of the pointer in a $1^{st}$ direction becomes a $1^{st}$ reference value [S3902], the controller 180 controls the mobile terminal to wake up (i.e., terminate an idle state of the mobile terminal) and is also able to control a portion of the display unit 151 to enter an activated state (i.e., the display unit 151 enters a semi-activated state). In particular, the controller 180 controls the mobile terminal to enter a normal state and is also able to control the display unit 151 to enter the semi-activated state. The controller activates the portion of the display unit 151 and is also able to control a $1^{st}$ information to be outputted through the activated region [S3903].

Figure 40:
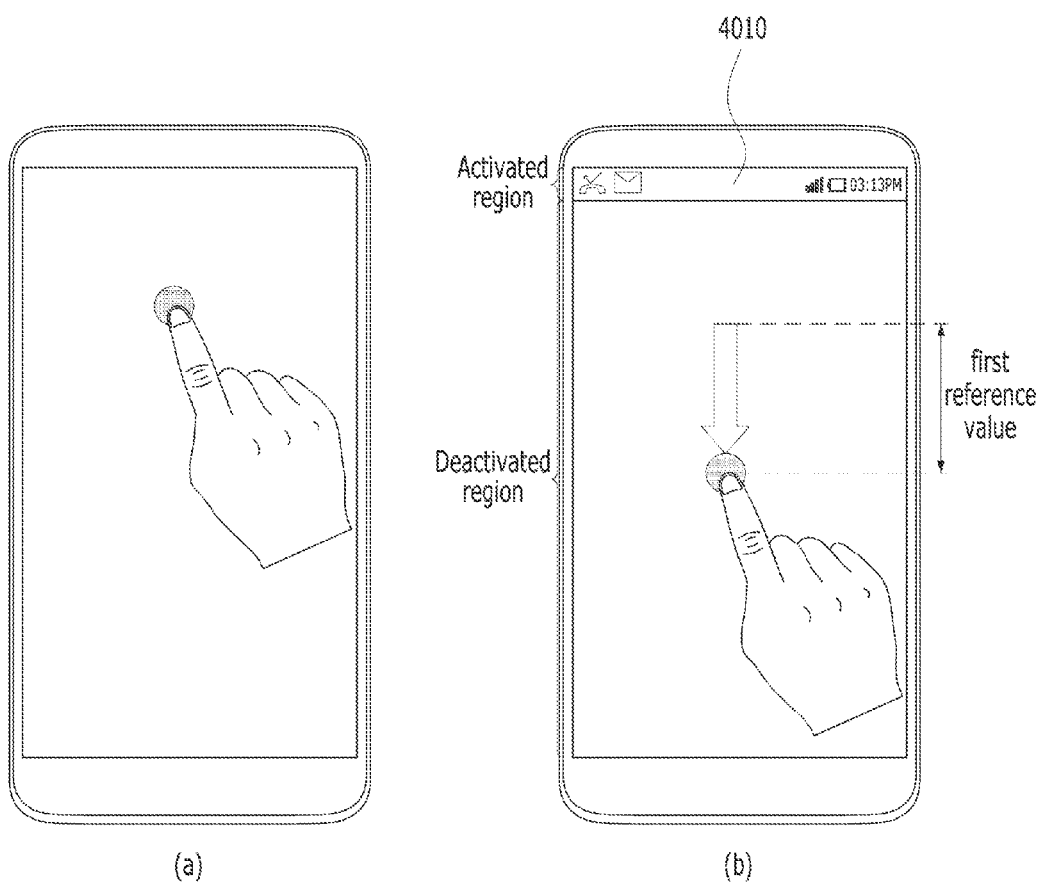
FIG. 40 is a diagram illustrating one example of outputting a $1^{st}$ information in response to a drag input.

For instance, FIG. 40 is a diagram illustrating one example of outputting a 1st information in response to a drag input.

Referring to FIG. 40 (a) and FIG. 40 (b), if a pointer touching the display unit 151 is dragged to move in a $1^{st}$ direction and a displacement of the pointer in the $1^{st}$ direction becomes a $1^{st}$ reference value, the controller 180 can control a portion of the display unit 151 to enter an activated state. Once the portion of the display unit 151 enters the activated state, the controller 180 can control a $1^{st}$ information 4010 to be outputted through the activated region. In FIG. 40 (a), the $1^{st}$ direction is a bottom direction for example.

According to the example shown in FIG. 40 (b), a state display line 4010 for displaying an operating state of the mobile terminal is outputted through the activated region of the display unit 151. On the state display line 4010, an indicator indicating an event occurrence in the mobile terminal, an indicator indicating a current state of the mobile terminal and the like can be displayed.

For instance, if there occurs such an event as a reception of a push message through an application, a reception of an instance message, a reception of a text message (e.g., MMS, LMS, MMS, etc.), a reception of an email, an occurrence of a non-responded call (i.e., an occurrence of a missed call, etc.) or the like, the controller 180 can control an indicator, which indicates the occurrence of the event, to be outputted through the state display line 4010. Moreover, an indicator indicating a remaining power level of a battery, an indicator indicating an audio output mode (e.g., a sound mode, a vibration mode, a mute mode, etc.), an indicator indicating a received electric field strength, an indicator indicating an activated state of a communication module (e.g., Wi-Fi, Bluetooth, GPS, NFC, etc.) and the like may be outputted through the state display line 4010.

If the displacement for the $1^{st}$ direction of the monitor dragged to move by the $1^{st}$ reference value increases [S3904], the controller 180 can control the activated region of the display unit 151 to be increased (or extended) gradually [S3905]. Moreover, the controller 180 can control a $2^{nd}$ information to be outputted through the increment of the activated region [S3905]. In an embodiment mentioned in the following description, as the displacement of the pointer exceeds the $1^{st}$ reference value, an additionally activated region on the display unit 151 shall be named an extension region.

Figure 41:
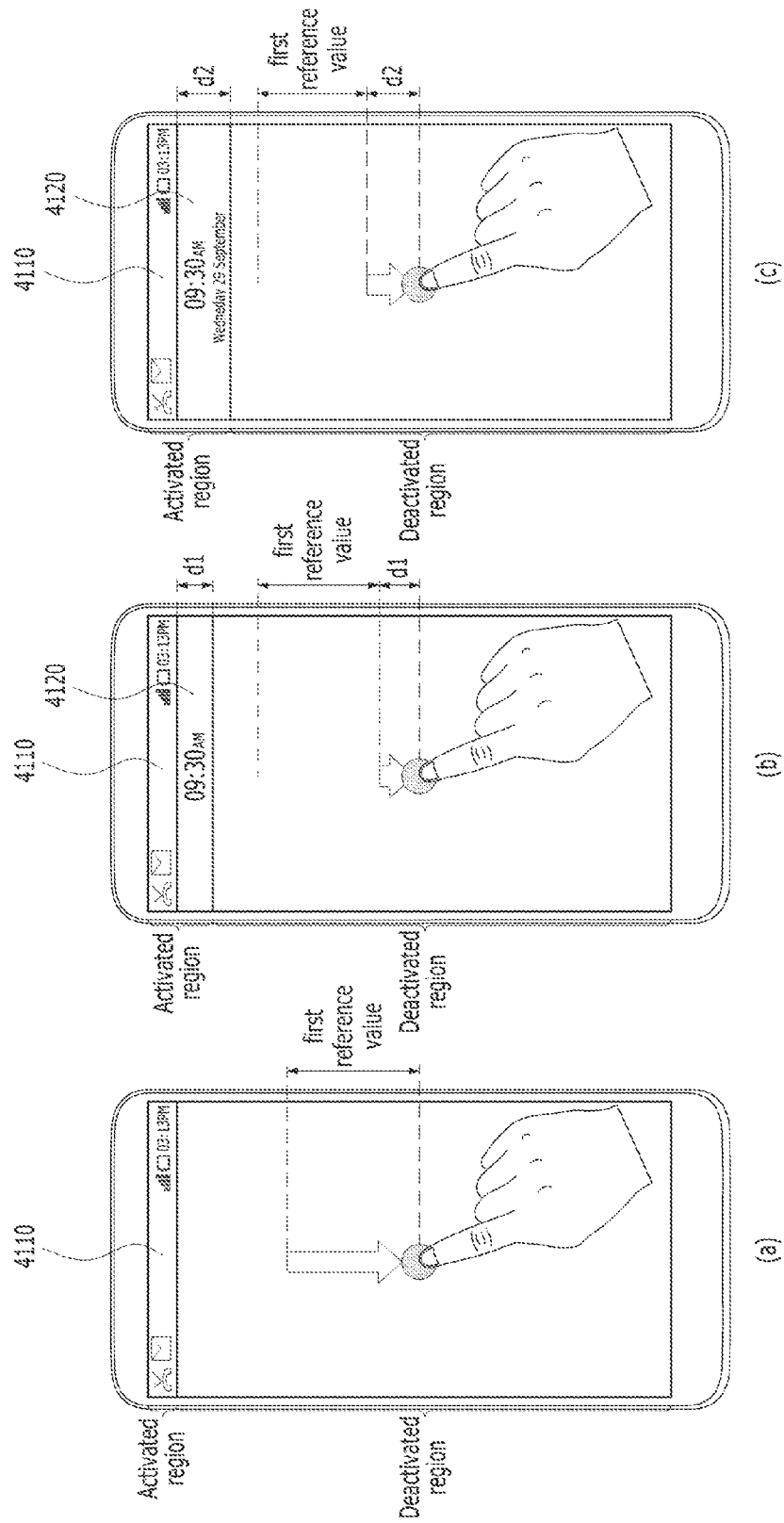
FIG. 41 is a diagram illustrating one example of gradually increasing an activated region of a display unit in proportion to an increase of a drag moving distance of a pointer.

For instance, FIG. 41 is a diagram illustrating one example of gradually increasing an activated region of the display unit 151 in proportion to an increase of a drag moving distance of a pointer.

Referring to FIG. 41, if the displacement of the pointer currently touching the display unit 151 in the $1^{st}$ direction reaches the $1^{st}$ reference value, as mentioned in the foregoing description with reference to FIG. 40, a partial region of the display unit 151 is activated and a $1^{st}$ information can be then outputted through the activated region. Thereafter, if the displacement of the pointer currently touching the display unit 151 in the $1^{st}$ direction further increases, the controller 180 can control the activated region of the display unit 151 to be further increased. In doing so, the controller 180 can control the extension region to be increased in proportion to the displacement increment.

For instance, according to the example shown in FIG. 41 (a) and FIG. 41 (b), as the pointer increases by dl, a height of the extension region increases by dl as well. Although FIG. 41 (a) and FIG. 41 (b) show the example that a ratio of the displacement increment to the extension region increment is 1:1, a ratio of a numerical value different from that of the example shown in the drawing may apply thereto.

Besides, the controller 180 may adjust an increment of an extension region by reflecting a drag speed of a pointer. For instance, although an increment of a displacement is constant, a size of an increased part of an extension region in case of a high moving speed of a pointer may be greater than that of an increased part of an extension region in case of a low moving speed.

The controller 180 can control a $2^{nd}$ information 4120 to be outputted through the extension region. For instance, according to the example shown in FIG. 41 (c), a time information 4120 indicating a current hour and a date of today is outputted through the extension region. In doing so, if there is an event occurring in the mobile terminal, the controller 180 may control a detailed information of the event to be outputted through the extension region together with or instead of the time information 4120.

While the controller 180 displays a portion of the $2^{nd}$ information 4120, if a size of an activated region increases, the controller 180 can control an output amount of the $2^{nd}$ information 4120 to be increased gradually.

For instance, according to the example shown in FIG. 41 (b) and FIG. 41 (c), as a size of an extension region increases, an output amount of the time information 4120 is gradually increased.

FIG. 41 (b) and FIG. 41 (c) show the output of a roll-down mode. Particularly, in the roll-down mode, after a top portion of the time information 4120 has started to be outputted, if a size of an extension region increases gradually, a bottom portion of the time information 4120 is gradually outputted as well.

On the other hand, unlike the above-mentioned example, the controller 180 may employ a roll-up mode. Particularly, in the roll-up mode, after a bottom portion of the time information 4120 has started to be outputted, if a size of an extension region increases gradually, a top portion of the time information 4120 is gradually outputted as well.

Figure 42:
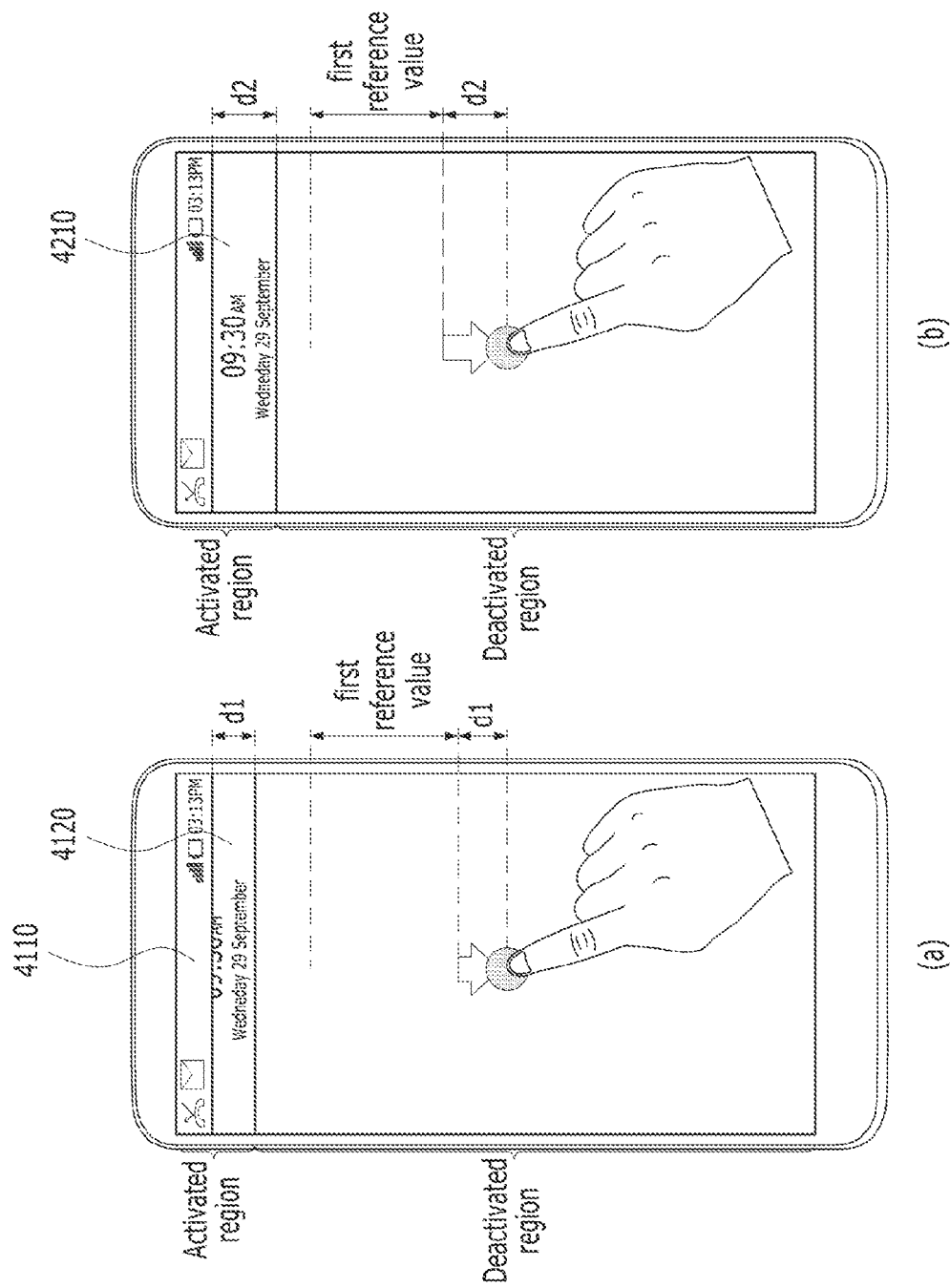
FIG. 42 is a diagram illustrating another example of outputting a $2^{nd}$ information.

For instance, FIG. 42 is a diagram illustrating another example of outputting a $2^{nd}$ information. Referring to FIG. 42 (a) and FIG. 42 (b), the controller 180 initially displays a bottom portion of a $2^{nd}$ information 4210. In doing so, if a size of an activated region increases, the controller 180 can control a top portion of the $2^{nd}$ information 4210 to be outputted.

Contrary to the descriptions with reference to FIG. 41 and FIG. 42, if a displacement of a pointer in a $1^{st}$ direction decreases, the controller 180 can control a size of an extension region to be decreased by a displacement decrement.

Figure 43:
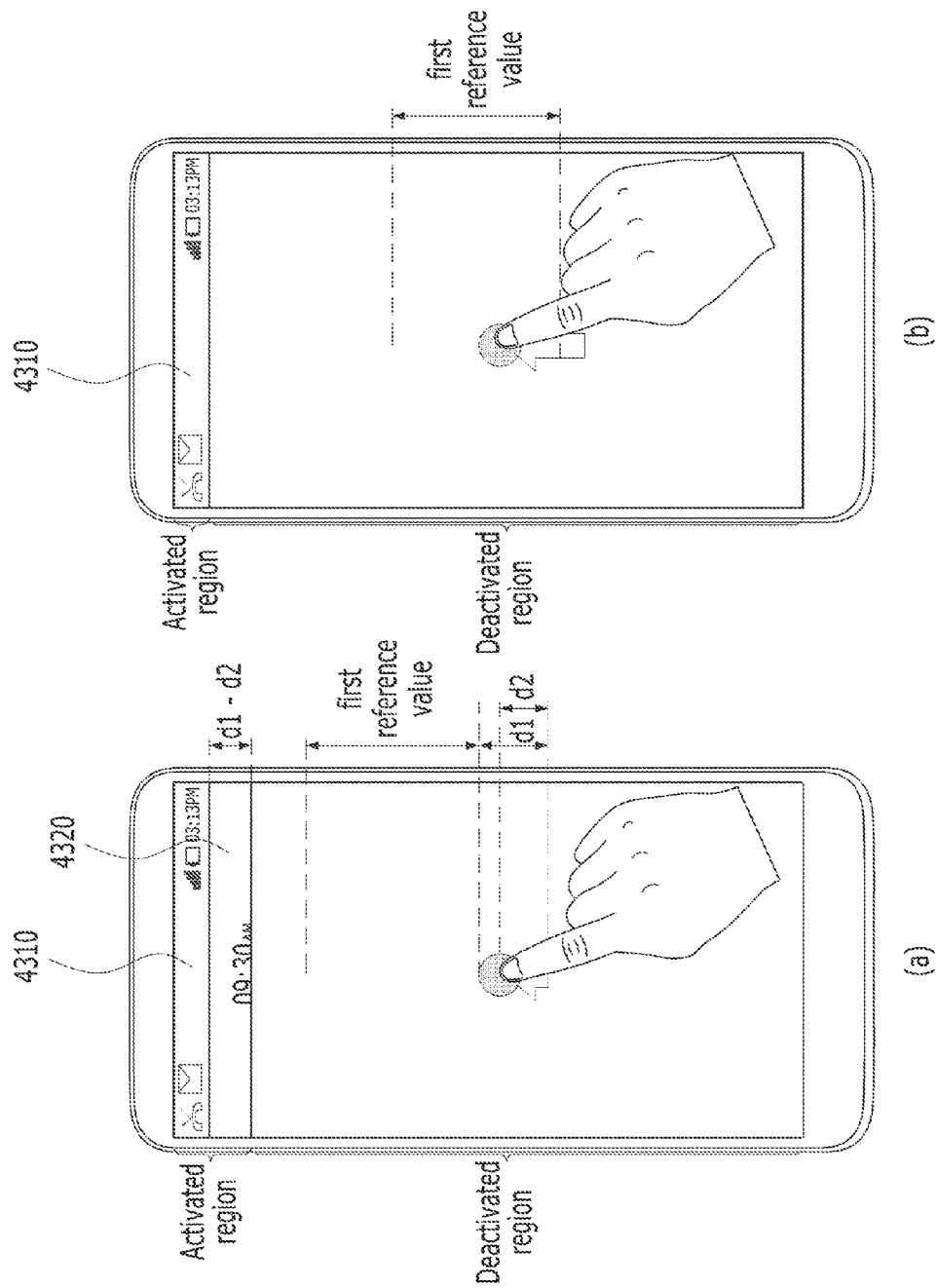
FIG. 43 is a diagram illustrating one example of decreasing a size of an extension region.

For instance, FIG. 43 is a diagram illustrating one example of decreasing a size of an extension region. If a pointer currently touching the display unit 151 moves in a direction opposite to a $1^{st}$ direction (i.e., if a displacement in the $1^{st}$ direction decreases), like the example shown in FIG. 43 (a) and FIG. 43 (b), the controller 180 can control a size of an extension region to be decreased. As the size of the extension region is decreased, an output amount of a $2^{nd}$ information 4320 displayed through the extension region may be gradually decreased.

In doing so, although the displacement of the pointer becomes smaller than a $1^{st}$ reference value, the controller 180 can control a $1^{st}$ information 4310 to be outputted by maintaining an activated state of a partial region of the display unit 151. For instance, referring to FIG. 43 (c), as the pointer is dragged to move in a direction opposite to the $1^{st}$ direction, a displacement of the pointer is decreased. Hence, although the displacement of the pointer becomes smaller than the $1^{st}$ reference value, the controller 180 control the $1^{st}$ information 4310 to be outputted by maintaining the activated state of the partial region of the display unit 151.

Therefore, while the pointer is maintained on the touchscreen, the display unit 151 is deactivated, whereby the mobile terminal is prevented from entering an idle state.

According to the examples described with reference to FIGS. 40 to 42, the $1^{st}$ information includes the state display line and the $2^{nd}$ information includes the time information. Unlike the examples, each of the $1^{st}$ information and the $2^{nd}$ information may include informations of various types such as a schedule information, an alarm information, a weather information, a detailed information of an event, and the like.

The schedule information can include a schedule registered as toady's date among the schedules registered at the mobile terminal (or a schedule supposed to start at the earliest hour from a current hour). The alarm information can include an information on an alarm supposed to start at the earliest hour from a current hour. The weather information may include a weather information at a current location. And, the detailed information of event can include an information related to an event occurring in the mobile terminal. For instance, if the mobile terminal receives an instant message, an email or a text message, an information on a corresponding sender and a corresponding content can be included in the detailed information of the event. For another instance, if there is a missed call, the detailed information of the event may include an information on a caller, a missed call received hour and the like.

As the pointer is dragged to move in the $1^{st}$ direction, a displacement of the pointer increases and then reaches a $2^{nd}$ second reference value. Even if the displacement of the pointer increases over the $2^{nd}$ reference value, the controller 180 can control a size of the extension region not to be further increased. In particular, if an area of the extension region reaches a preset maximum value, the controller 180 can control the size of the extension region to maintain a constant state despite that the displacement of the pointer increases.

Figure 44:
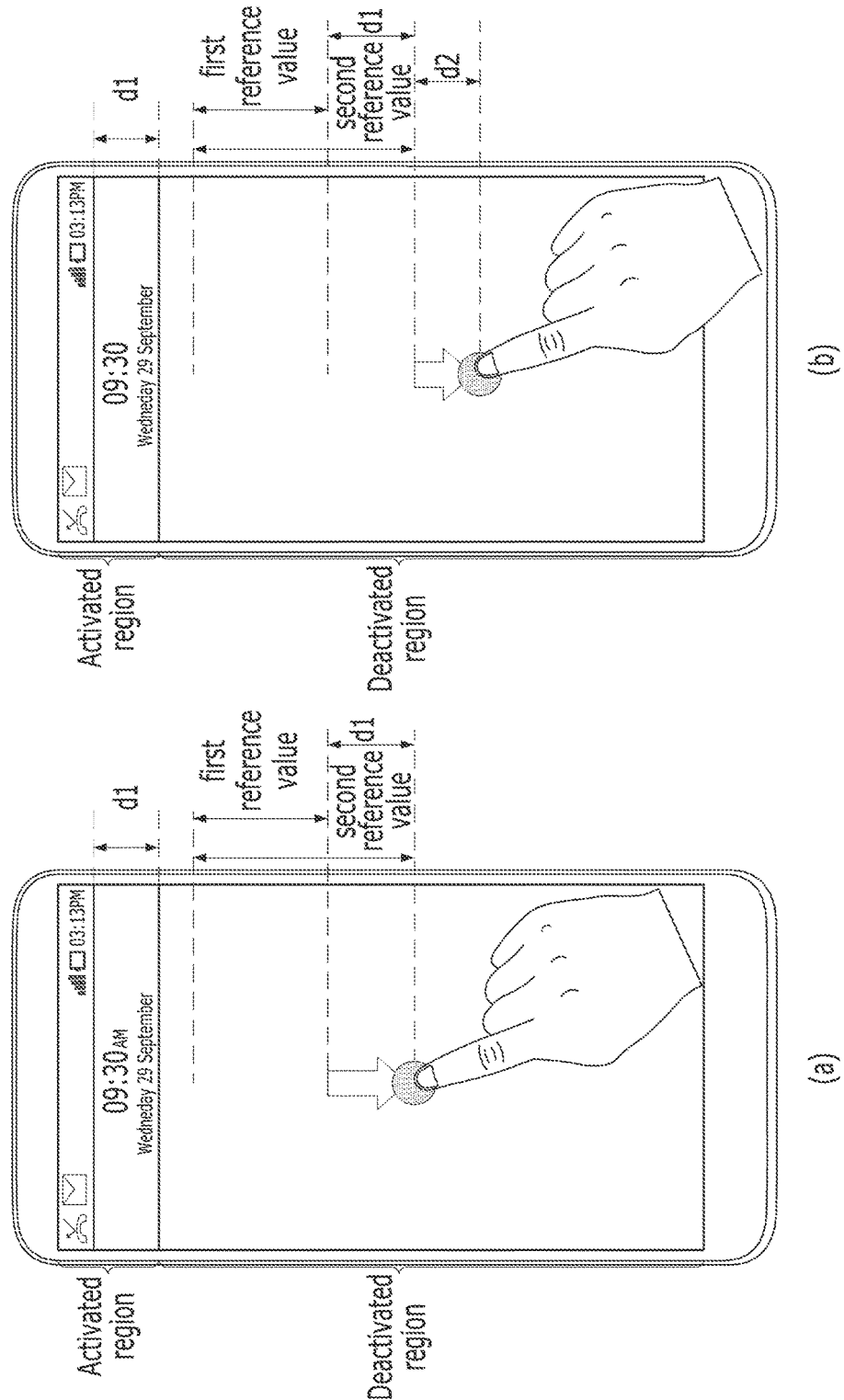
FIG. 44 is a diagram illustrating one example of maintaining a size of an extension region.

For instance, FIG. 44 is a diagram illustrating one example of maintaining a size of an extension region. If a displacement of a pointer in a $1^{st}$ direction exceeds a $1^{st}$ reference value, as mentioned in the foregoing description with reference to FIG. 41 and FIG. 7, a size of an extension region of the display unit 151 can be increased by a displacement increment. According to the example shown in FIG. 44 (a), as the displacement of the pointer in the $1^{st}$ direction increases, the size of the extension region of the display unit 151 is increased as well.

The longer the displacement of the pointer in the $1^{st}$ direction gests, the more the size of the extension region is increased by the controller 180. In doing so, if the displacement of the pointer in the $1^{st}$ direction reaches a $2^{nd}$ reference value, the controller 180 can control the size of the extension region not to be further increased despite the displacement of the pointer in the $1^{st}$ direction further increases. For instance, referring to FIG. 44 (b), if the displacement of the pointer in the $1^{st}$ direction exceeds the $2^{nd}$ reference value, the controller 180 can control the size of the extension region not to be further increased despite that the displacement of the pointer in the $1^{st}$ direction increases.

While at least one of a $1^{st}$ information and a $2^{nd}$ information is being outputted, if a pointer touching the display unit 151 is released from the display unit 151, the controller 180 deactivates the display unit 151 and is able to control the mobile terminal to enter an idle state.

For instance, FIG. 45 is a diagram illustrating one example for a mobile terminal to enter an idle state. Referring to FIG. 45 (a), while a $1^{st}$ information 4510 is outputted through a partial region of the display unit 151, if a pointer currently touching the display unit 151 is released, the controller 180 deactivates the display unit 151 and is able to control the mobile terminal to enter an idle state.

Referring to FIG. 45 (b), while a $1^{st}$ information 4510 and a $2^{nd}$ information 4520 are outputted through a partial region of the display unit 151, if a pointer currently touching the display unit 151 is released, the controller 180 deactivates the display unit 151 and is able to control the mobile terminal to enter an idle state.

In particular, the controller 180 controls the mobile terminal to maintain a normal state only if the pointer is touching the display unit 151. If the touch with the pointer is cancelled, the controller 180 can control the mobile terminal to re-enter the idle state.

For another instance, like the example shown in FIG. 45, if the dragged pointer is released from the touch without moving in any directions, the controller 180 controls the mobile terminal to enter the idle state. After the pointer has been dragged to move in a prescribed direction, if the pointer is released from the touch, the controller 180 can control the display unit 151 to enter an activated state by maintaining the normal state of the mobile terminal. When the display unit 151 enters the activated state, the controller 180 can control a home screen or a running screen of a preset application to be outputted.

For instance, FIG. 46 is a diagram illustrating one example of an operation of a mobile terminal if a pointer is touched and dragged in a prescribed direction and then touch-released.

Referring to FIG. 46 (a), if a pointer currently touching the display unit 151 is dragged to move in a $2^{nd}$ direction and then released from the touch, the controller 180 can control a home screen to be outputted through the display unit 151. According to the example shown in FIG. 46 (a), the $2^{nd}$ direction includes a right direction.

Referring to FIG. 46 (b), if a pointer currently touching the display unit 151 is dragged to move in a $3^{rd}$ direction and then released from the touch, the controller 180 can control a running screen of a prescribed application to be outputted through the display unit 151. According to the example shown in FIG. 46 (b), the $3^{rd}$ direction includes a left direction.

In this case, the prescribed application may include at least one of an application pre-designated by a user, an application last run through the mobile terminal, an application having a highest run frequency, and the like.

Besides, each of the $2^{nd}$ direction and the $3^{rd}$ direction may be perpendicular to the $1^{st}$ direction, by which the present invention is non-limited.

Unlike the example described with reference to FIG. 46, if the pointer is dragged to move in the $2^{nd}$ direction and then touch-released or if the pointer is dragged to move in the $3^{rd}$ direction and then touch-released, the controller 180 can control a running screen of a prescribed application to be outputted through the display unit 151. In doing so, if the pointer is dragged to move in the $2^{nd}$ direction and then touch-released, the controller 180 can control a running screen of a $1^{st}$ application to be outputted. If the pointer is dragged to move in the $3^{rd}$ direction and then touch-released, the controller 180 can control a running screen of a $2^{nd}$ application to be outputted.

Unlike the example shown in FIG. 46, if the pointer is dragged to move in the $2^{nd}$ or $3^{rd}$ direction and then touch-released, the controller 180 controls the display unit 151 to enter an activated state and is also able to make a phone call to a prescribed person. In this case, the prescribed person may include at least one of a person previously registered by a user, a person last contacting a user (e.g., a person last making a call to a user, a person last sending a message to a user, etc.), a person having a highest frequency of contact with a user, and the like.

According to the example shown in FIG. 46, while a displacement of the pointer in the $1^{st}$ direction becomes equal to or greater than the $1^{st}$ reference value or the $2^{nd}$ reference value, only if the pointer is dragged in the $2^{nd}$ direction or the $3^{rd}$ direction, the controller 180 can control the display unit 151 to enter the activated state. While the displacement of the pointer in the $1^{st}$ direction fails to reach the $1^{st}$ reference value or the $2^{nd}$ reference value, if the pointer is dragged in the $2^{nd}$ direction or the $3^{rd}$ direction and then touch-released, the controller 180 can control the mobile terminal to maintain the idle state or can control the mobile terminal to ether the idle state.

For another instance, if a pointer currently touching the display unit 151 draws a prescribed pattern (or if the pointer draws a prescribed pattern and is then touch-released), the controller 180 can control the display unit 151 to enter an activated state. When the controller 180 activates the display unit 151, like the former example shown in FIG. 46 (a) or FIG. 46 (b), the controller 180 can control a home screen or a running screen of a prescribed application to be outputted or can control a call screen, which is provided to make a phone call to a prescribed person, to be outputted.

For instance, FIG. 47 is a diagram illustrating one example of an operation of a mobile terminal if a pointer draws a prescribed pattern. If a pointer currently touching the display unit 151 draws a prescribed pattern (or if the pointer draws a prescribed pattern and is then touch-released), the controller 180 can control the display unit 151 to enter an activated state and is able to control a home screen, a running screen of a prescribed application, or a call screen, which is provided to make a phone call to a prescribed person, to be outputted.

For instance, according to the example shown in FIG. 47, if a pointer draws a picture of a star pattern, a call screen for making a phone call to a prescribed person is outputted through the display unit 151. In doing so, the controller 180 can determine a person, to which a phone call will be made, depending on the pattern drawn by the pointer. For instance, if a pattern of a $1^{st}$ shape is drawn by the pointer, the controller 180 controls the display unit 151 to enter the activated state and is able to control a call screen for making a phone call to a $1^{st}$ person to be outputted. For another instance, if a pattern of a $2^{nd}$ shape is drawn by the pointer, the controller 180 controls the display unit 151 to enter the activated state and is able to control a call screen for making a phone call to a $2^{nd}$ person to be out[putted.

With reference to FIGS. 40 to 47, the operations of the mobile terminal during the touch to the display unit 151 with a single pointer are described. The aforementioned embodiments are identically applicable to a case of touching the display unit 151 with a plurality of pointers. In this case, if a displacement of a prescribed one of a plurality of pointers in a $1^{st}$ direction or displacements of a plurality of the pointers in the $1^{st}$ direction become a $1^{st}$ reference value, the controller 180 outputs a $1^{st}$ information. If a displacement of a prescribed one of a plurality of pointers in a $1^{st}$ direction or displacements of a plurality of the pointers in the $1^{st}$ direction become a $2^{nd}$ reference value, the controller 180 can control a size of an extension region not to be further increased.

Moreover, if at least one or all of a plurality of pointers are dragged to move in a $2^{nd}$ or $3^{rd}$ direction and then touch-released, the controller 180 can control the display unit 151 to enter an activated state. In doing so, the controller is able to determine an application to run depending on the number of the pointers, with which the display unit 151 is touched, by controlling the display unit 151 to enter the activated state. For instance, if a single pointer is dragged to move in the $2^{nd}$ direction and then touch-released, the controller 180 controls a running screen of a $1^{st}$ application to be outputted through the display unit 151. For instance, if two pointers are dragged to move in the $2^{nd}$ direction and then touch-released, the controller 180 controls a running screen of a $2^{nd}$ application to be outputted through the display unit 151.

Besides, although the idle state of the mobile terminal is terminated in response to the touch input, as mentioned in the foregoing descriptions with reference to FIGS. 40 to 47, the idle state of the mobile terminal may be terminated in response to a bounce input.

For instance, after a bounce input of inclining the mobile terminal in one direction has been applied, if the applied bounce input is maintained during a $1^{st}$ time, the controller 180 can control a $1^{st}$ information to be outputted by activating a portion of the display unit 151. If the time taken to maintain the bounce input increases, the controller 180 controls a size of an extension region to be increased. Thereafter, if the bounce input is further maintained during a $2^{nd}$ time, the controller 180 may be able control the size of the extension region not to be further increased.

Accordingly, embodiments of the present invention provide various effects and/or features. First of all, the present invention can provide a mobile terminal and controlling method thereof, by which user's convenience can be enhanced. In particular, the present invention can provide a mobile terminal and controlling method thereof, by which an idle state of the mobile terminal can be terminated through a user input of inclining the mobile terminal.

Moreover, the present invention can provide a mobile terminal and controlling method thereof, by which a locked mobile terminal can be unlocked through a combination of user inputs of inclining the mobile terminal.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display unit configured to switch between an On state and an Off state;
   a touch sensor configured to sense touch on the display unit in the On or Off state; and
   a controller configured to:
   sense a drag input in a first direction,
   switch at least a portion of the display unit to the On state when a displacement of the drag input reaches a first reference value,
   output first information in a first area of the display unit, wherein the first area corresponds to the at least the portion of the display unit in the On state,
   control a size of the first area to be increased, when the displacement in the first direction increases beyond the first reference value,
   adjust an increment of the size of the first area based on a moving speed of the drag input,
   switch the display unit to the Off state from the On state when the drag input is released from the display unit while the display unit displays the first information in the first area after the display unit is switched to the On state,
   wherein the display unit is maintained in the On state after the display unit is switched to the On state and displays the first information while the drag input is touching the display unit,
   switch an entirety of the display unit to the On state when the displacement of the drag input in the first direction reaches a second reference value,
   display a different screen window based on a direction of releasing the drag input when the drag input in the first direction becomes equal to or greater than the first reference value or the second reference value,
   control the touch sensor to wake up with a first activation period to sense the touch on the display unit in the Off state,
   control the touch sensor such that the activation period of the touch sensor is changed to a second activation period shorter than the first activation period when a pointer touches the display unit in the Off state, and
   control the activation period of the touch sensor to be resumed to the first activation period when an additional touch input is not sensed within a predetermined time since the pointer touches the display unit.

2. The mobile terminal according to claim 1, wherein the controller is further configured to control the size of the first area to be increased in proportion to an increment of the displacement in the first direction.

3. The mobile terminal according to claim 2, wherein, when the displacement in the first direction increases beyond a third reference value greater than the first reference value, the controller is further configured to control the size of the first area to be maintained even if the displacement in the first direction increases.

4. The mobile terminal according to any one of claim 1, wherein, when the size of the first area increases, the controller is further configured to control second information to be additionally output through the first area.

5. The mobile terminal according to claim 4, wherein the first information and the second information comprises a different one of a status bar, time information, schedule information, alarm information and detailed information on an event.

6. The mobile terminal according to claim 1, wherein the controller is further configured to control a remaining area of the display unit other than the first area to maintain in the Off state.

7. The mobile terminal according to claim 1, wherein, the controller is further configured to:
control a remaining area of the display unit other than the first area to output a background in a preset single color.

8. The mobile terminal according to claim 1, wherein, when the displacement in the first direction decreases below the first reference value, the controller is further configured to control a size of the first area to be decreased.

9. The mobile terminal according to claim 8, wherein the controller is further configured to control at least a portion of the first information to be output through the decreased first area.

10. The mobile terminal according to claim 1, wherein, when the drag input is released from the display unit after dragged in a second direction perpendicular to the first direction, the controller is further configured to control the display unit to display a home screen window.

11. The mobile terminal according to claim 1, wherein, when the drag input is released from the display unit after dragged in a second direction perpendicular to the first direction, the controller is further configured to control the display unit to display an execution window of a predetermined application.

12. The mobile terminal according to claim 1, further comprising:
a wireless communication unit for wireless communication,
wherein, when the drag input draws a predetermined pattern, or the touch is released after the predetermined pattern is drawn, the controller is configured to make a call to a predetermined person using the wireless communication unit.

13. The mobile terminal according to claim 1, wherein the additional touch input comprises an input from the pointer maintained on the display unit or a drag input from the pointer on the display unit.

14. A method for controlling a mobile terminal, the method comprising:
sensing a drag input in a first direction on a display unit in an Off state;
switching, when a displacement of the drag input in the first direction reaches a first reference value, at least a portion of the display unit to an On state;
outputting first information in a first area of the display unit, wherein the first area corresponds to the at least the portion of the display unit in the On state;
controlling a size of the first area to be increased, when the displacement in the first direction increases beyond the first reference value;
adjusting an increment of the size of the first area based on a moving speed of the drag input;
switching the display unit to the Off state from the On state when the drag input is released from the display unit while the display unit displays the first information in the first area after the display unit is switched to the On state;
maintaining the display unit in the On state after the display unit is switched to the On state and displaying the first information while the drag input is touching the display unit;
switching an entirety of the display unit to the On state when the displacement of the drag input in the first direction reaches a second reference value;
displaying a different screen window based on a direction of releasing the drag input when the drag input in the first direction becomes equal to or greater than the first reference value or the second reference value;
controlling the touch sensor to wake up with a first activation period to sense the touch on the display unit in the Off state;
controlling the touch sensor such that the activation period of the touch sensor is changed to a second activation period shorter than the first activation period when a pointer touches the display unit in the Off state; and
controlling the activation period of the touch sensor to be resumed to the first activation period when an additional touch input is not sensed within a predetermined time since the pointer touches the display unit.

15. The method according to claim 14, wherein, when the drag input is released from the display unit after dragged in a second direction perpendicular to the first direction, one of a home screen window and an execution window of a predetermined application is output through the display unit.

* * * * *